(12) United States Patent
Kesterson

(10) Patent No.: US 7,619,511 B2
(45) Date of Patent: Nov. 17, 2009

(54) DIRECTIONAL LAMP DAYTIME RUNNING LIGHT MODULE, FOG LIGHT SYSTEM AND VEHICULAR TURN SIGNAL CONTROL SYSTEM

(76) Inventor: Raymond Kesterson, P.O. Box 1474, Kennesaw, GA (US) 30156

( * ) Notice: Subject to any disclaimer, the term of this patent is extended or adjusted under 35 U.S.C. 154(b) by 0 days.

(21) Appl. No.: 10/595,457

(22) PCT Filed: Oct. 20, 2004

(86) PCT No.: PCT/US2004/034535

§ 371 (c)(1),
(2), (4) Date: Apr. 20, 2006

(87) PCT Pub. No.: WO2005/042303

PCT Pub. Date: May 12, 2005

(65) Prior Publication Data

US 2007/0273495 A1    Nov. 29, 2007

(51) Int. Cl.
*B60Q 1/26* (2006.01)
(52) U.S. Cl. .................. 340/468; 340/469; 315/82; 315/83
(58) Field of Classification Search ............. 340/468, 340/469; 315/82, 83
See application file for complete search history.

(56) References Cited

U.S. PATENT DOCUMENTS

| | | | |
|---|---|---|---|
| 3,277,442 A | 10/1966 | Kearney | |
| 3,341,736 A | 9/1967 | Fortney | |
| 3,397,342 A | 8/1968 | Dill, Jr. | |
| 3,430,100 A | 2/1969 | Dill, Jr. | |
| 3,603,840 A * | 9/1971 | DuRocher | 315/82 |
| 3,832,597 A | 8/1974 | Mitchell | |
| 4,684,819 A | 8/1987 | Haag et al. | |
| 4,723,095 A | 2/1988 | Svazas et al. | |
| 4,808,968 A | 2/1989 | Caine | |
| 4,928,036 A | 5/1990 | Abboud | |
| 4,949,012 A | 8/1990 | Irick et al. | |
| 4,983,883 A | 1/1991 | Roland | |
| 5,030,884 A | 7/1991 | Roussey et al. | |
| 5,081,565 A | 1/1992 | Nabha et al. | |
| 5,438,237 A | 8/1995 | Mullins et al. | |
| 5,614,788 A | 3/1997 | Mullins et al. | |
| 5,760,546 A | 6/1998 | Pabla et al. | |
| 5,780,974 A * | 7/1998 | Pabla et al. | 315/82 |
| 5,796,094 A | 8/1998 | Schofield et al. | |

(Continued)

*Primary Examiner*—Benjamin C. Lee
*Assistant Examiner*—Ojiako Nwugo
(74) *Attorney, Agent, or Firm*—Smith, Gambrell & Russell LLP

(57) ABSTRACT

A vehicular light control system for controlling the illumination of a vehicle's external directional/turn signaling and/or hazard warning lights, by controlling continuous illumination of pairs of the brightest signal filaments of either dual or single filament bulb designed vehicles, where such bulbs were previously flash only and underutilized. The system operates to control the brightest filaments when the operator wishes to draw attention to the vehicle for safety, or for visibility and utility purposes, without the same system negatively affecting normal operation of existing turn signal/hazard warning systems. The system automatically and manually controls the light output as desired by the vehicle operator, incorporates the vehicle's internal turn signal bulb-out indication subsystem to continuously monitor the target bulbs for an open circuit/burn out event, and employs an automatic safety reconnect feature, a failsafe which reconnects all factory wiring with factory bulbs instantaneously with any accidental or intentional system power loss.

24 Claims, 30 Drawing Sheets

U.S. PATENT DOCUMENTS

| | | |
|---|---|---|
| 5,909,084 A | 6/1999 | Fu et al. |
| 5,912,534 A | 6/1999 | Benedict |
| RE37,677 E | 4/2002 | Irie |
| 6,452,337 B1 | 9/2002 | Murata et al. |
| 6,483,246 B2 | 11/2002 | Sugimoto et al. |
| 6,734,634 B2 | 5/2004 | Kim |
| 2006/0091817 A1 | 5/2006 | Herrig et al. |
| 2008/0007180 A1 | 1/2008 | Kesterson |

\* cited by examiner

US 7,619,511 B2

DIRECTIONAL LAMP DAYTIME RUNNING LIGHT MODULE, FOG LIGHT SYSTEM AND VEHICULAR TURN SIGNAL CONTROL SYSTEM

REFERENCE TO RELATED APPLICATIONS

This application is a U.S. National Phase application under 35 U.S.C. § 371 of PCT Application No. PCT/US04/34535, filed Oct. 20, 2004, which claims priority under 35 U.S.C. § 119 from U.S. application Ser. No. 10/690,044 filed Oct. 21, 2003.

TECHNICAL FIELD

The present invention is a multiple application device that relates to automotive lighting and external directional/warning lamp arrangements, and more particularly to a module/system for generating high-intensity daytime running lights on a vehicle utilizing existing warning/turn signal lamps, yet still retaining the vehicle's internal turn signal 'bulb-out' detection system. This same vehicular collision avoidance system may further become a fog/inclement weather lighting system such that also uses a vehicle's built-in factory directional lamps. Additionally, the utilization of this device in some motorcycle safety applications deem that the present invention is a general-purpose vehicular turn signal control system.

BACKGROUND ART

It is relatively well known and somewhat accepted on a global scale that automobiles which possess some form of lights illuminated during daytime operation provide a safer means of transportation than vehicles operating during the day with no lights at all. Hundreds of thousands of buses, both school and mass transit types, currently travel with their headlights on at all times to improve their vehicle's collision avoidance characteristics with respect to other vehicles, and thereby increasing vehicle occupant safety. Additionally, millions of people drive with their headlights on every day, choosing to do so as a defensive safety precaution. It is a matter of fact that the governments of seven nations have made it mandatory for some form of daytime running lights on automobiles to be continuously lit whenever the vehicle is in operation, either as lights dedicated to that function, or for the headlights of that vehicle itself to be activated during daytime vehicle operation. Numerous foreign studies spanning more than a quarter of a century have statistically proven either single digit or double-digit percentage improvements in the reduction of multi-vehicle daytime accidents through the use of some form of daytime running lights, even if this is as simple as mandatory legislated headlights being illuminated during the daytime. In addition, studies have also shown that when accident reports are analyzed specifically with respect to head-on, front corner, and especially left turn collisions occurring between vehicles during daytime hours, a reduction of accidents statistically occur in study groups of vehicles with daytime running lights over control groups of similar vehicles not equipped with such a collision avoidance feature. Moreover, in a comparison between rental car vehicles both having daytime running lights and not having daytime running lights, it has been shown that the costs of collision repairs for vehicles with such safety lighting are almost 70% lower than the collision repair bills of vehicles not having daytime running lights.

If it were presumed that these collisions were 'unavoidable', then such results indicate that daytime running lights aid drivers in the mechanism of observing emergency multi-vehicle situations sooner, and therefore reacting faster to such situations. Faster reaction on the other driver's part leads to less damage inflicted upon the daytime running light equipped vehicles by the other drivers actions, specifically applying their brakes sooner or turning away more quickly, and thereby lessening impact damage during such an unavoidable collision. These results point to the fact that this type of vehicular collision avoidance day lighting system, at a minimum, significantly reduces the severity of the impact of daytime multi-vehicle collisions, as gauged by the reductions of repair costs of vehicles equipped with the safety lighting devices when compared to vehicles without such devices.

The science and logic behind how daytime running lights help with collision avoidance is that having lights illuminated during daytime hours makes a vehicle much more conspicuous. The more conspicuous a vehicle is in effect reduces the chances of that same vehicle being involved in a daytime multi-vehicle accident. This is because the earlier a vehicle operator detects another vehicle on the road, and can estimate its speed and distance, the less likely that the first vehicle operator will be involved in a crash with that other second vehicle. This type of collision avoidance system further reduces the chances of being in a multi-vehicle accident at dusk, dawn, and on overcast days, with all of these being times when environmental visibility is low. Some sources estimate that just less than half of all multi-vehicle accidents occur because of perception and recognition errors. Therefore, the presence of daytime running lights on a vehicle improves daytime vehicle detection, with respect to how other vehicle operators visually notice such vehicle during driving. This same logic is why many states have mandated that a vehicle's headlights must be illuminated during rainy weather.

The National Highway Traffic Safety Administration ("NHTSA"), a department of the U.S. Department of Transportation, wrote a battery of daytime running light ("DRL") laws for U.S. roadways in 1993, but did not require daytime running light usage by law for cars sold in America. One event that helped spur such laws was that Canada began requiring daytime running lights as mandatory on all vehicles sold within its borders starting Dec. 1, 1989. NHTSA says any voluntary DRL systems integrated into vehicles by the auto manufacturers selling in the U.S. should follow the guidelines below: 1) any such system should switch "on" automatically when the vehicle cranks during daytime hours, and should switch "off" when the vehicle is turned off; 2) DRL's must switch off when the parking or headlights come on; 3) eligible bulbs on the front of a vehicle that are to be used as DRL's are a) headlights, b) directional/turn signal lamps, or c) lights dedicated to DRL usage only; 4) fog lights and parking lights are not permitted to be used as DRL's, as one is deemed too bright, causing glare; and the other is deemed to be too dim to be effective during bright daytime hours, respectively; 5) low beam headlights can be used for DRL at full output, or 'as is'; 6) if high beam headlights are to be used as DRL's, they must have a decreased output equaling 80% of normal brightness or less, to reduce or limit glare; 7) since DRL's themselves are not mandatory, service centers and shops may add switches to factory DRL systems to turn them on or off, but may not modify such DRL's as to change their output with respect to brightness.

Vehicular lighting laws, some based on standards dating back to more than 30 years ago, also govern how turn signals and other vehicle lighting should function. Basically, in regular automobiles, turn signal bulb-out indication should occur to alert the vehicle operator via the dashboard indicator that a turn signal bulb has burned out. Such bulb-out indication is deemed as essential feedback to the vehicle operator, but is not required or practical on vehicles that tow trailers or other vehicles. Such turn signal bulb failure indication is typically accomplished by the turn signal/dashboard indicator system flashing faster than normal when the turn signal switch is activated; this 'fast flashing' mode registering on whichever side of the vehicle that such bulb failure has occurred. Other modes of bulb-out indication permissible are such as turn signals flashing not at all, with either a no flash—constant on, or no flash—constant off operation. Light coming from the front turn signals of a vehicle must be amber, but light emitted from front parking lights may be either white or amber. Additionally, output of turn signal lamps should be two and one half to three times that of parking lamps, to provide high contrast between both light sources at night.

Over the years various designs for DRL systems have utilized the automobile headlights almost exclusively. The present invention disclosed herein focuses on using the amber directional/turn signal lamps of a vehicle as the output device of the DRL system, in contrast to using white headlights. Advantages to such a directional lamp DRL system as described in the present invention, when compared to daytime headlight usage or headlight driven DRL systems, are: 1) Lower comparative energy consumption, 2) Lower comparative replacement bulb costs, 3) Higher environmental contrasting amber light DRL output when compared to white light output DRL systems, and 4) Resultant lower comparative lifetime vehicle emissions of pollutants via reduced relative fuel consumption.

Such white output headlight driven DRL systems waste energy when contrasted to such an invention of the present disclosure, as directional bulbs simply draw less current or amperage than headlight bulbs, yet still have a relatively high light output. Since headlights are high current devices singularly, or headlights plus external resistance both consume energy cumulatively, a reduction of the gas mileage of a vehicle to some degree is the net effect of daytime headlight operation and/or headlight driven DRL systems. From an engineering standpoint, energy is not free for such safety lighting, and does not come from the vehicle battery, as many people believe. The cost for any DRL energy is fuel, gasoline or diesel, spent by a 15 to 20% efficient engine that supplies shaft work via an alternator belt to a 25% efficient alternator. A lower electrical current consuming DRL device saves money over time when compared to it replacing a higher electrical current consuming headlight driven factory or aftermarket DRL system. Saved fuel dollars from a turn signal driven DRL system over a headlight driven DRL system also means lower overall carbon dioxide and other emissions entering into the atmosphere, incremental but significant when looking at a vehicle's 10 to 20 year lifecycle. Even more savings and lower emissions are incurred when the present invention is contrasted to driving with headlights on during the day.

Directional lamps in the front of a motor vehicle are required to be amber in output, when the vehicle is sold new to its first U.S. owner. A DRL system on a vehicle that uses these directional lamps is distinctly different in appearance than a vehicle that utilizes headlamps for the same effect. This visual difference between an amber high output DRL system and a white output DRL system is such that the more economical system offers a significant output advantage; white DRL's are sometimes not as visually noticeable during 'white' daytime hours, when contrasted with amber high intensity output DRL turn signal driven systems. Since a vehicle's daytime operating environment is a white daylight-flushed world, the present invention yields a distinctive high intensity amber DRL output from any vehicle's built in factory lighting arrangements that is more attention grabbing and noticeable than any equivalent white output DRL system operating on the headlights of an identical vehicle. The present invention adds DRL's to all vehicles with a brilliant and more distinct amber output, a color of light by which humans both notice and see very well. Additionally, amber light tends to seize human attention. It is a fact that most all of modern society has been conditioned throughout the 20th century to interpret amber or yellow lighting as 'caution!'. Hence, this is part of the reason that amber lamps and lenses are employed in the front turn signal lighting systems of vehicles in general. Four way intersections are sometimes marked on the highway with flashing caution lights that are yellow, and traffic signals utilize a yellow caution staging period while turning from green to red. Flashing yellow also alerts automotive vehicle operators to roadway problems, construction activities, slow moving vehicles, roadway maintenance equipment, and vehicles on the roadside in need of repair.

This same system of the present invention also offers a 'consumable' part costs savings over headlight driven DRL or daytime headlight operation. Such a system of the present device employs bulbs, already built into the vehicle, which cost about $1/4^{th}$ to $1/5^{th}$ as much as headlight bulbs, making such a system economical from a bulb replacement—vehicle maintenance viewpoint. For any DRL system, the bulbs cannot last forever, and any bulbs employed as such are therefore viewed as a consumable. These directional lamp bulbs are also comparatively robust, as these same exact type of bulbs are also employed as a vehicle's rear brake light bulbs, and are engaged in a much more heavy-duty service condition when utilized in that location.

The present invention is designed to be very flexible with respect to installation, by being both configurable and expandable. The current device can also be installed in such a manner to automatically switch off any factory headlight driven DRL system during this same device's activation and operation, leaving the factory system in waiting, as a backup system. The result is that the lower consumption system of the present invention will alternately power down the higher consumption factory-installed system when present invention is activated, offering incremental but real fuel savings by reducing overall holistic electrical DRL system consumption for the life of the vehicle.

It is interesting to note that fog lights are currently covered by individual state laws, while automotive headlights, turn signals, brake lights and parking lights are covered by U.S. law. The present invention harnesses and controls the previously mentioned turn signal lamps, and can potentially allow these to be used as auxiliary fog lamps during times of reduced visibility such as fog, rain, snow, or during off-road conditions. This could prove to be highly advantageous to vehicle operators in dangerous weather conditions, provided that vehicle operators have sufficient control over such lighting to keep such auxiliary fog lighting from causing glare and visibility problems for other drivers during high visibility times, and provided that these applications conform to individual state laws. An exception to the rule is when such lighting is utilized during vehicle off-road use situations, where no legal requirements exist.

Also, there is concern in the automotive world that motorcycles are at an ever-increasing disadvantage on the roadway, as more and more automobiles gain 'white light output' headlight-driven DRL systems. Motorcycles, which have been equipped with headlight driven DRL's for years, no longer distinctly stand out in traffic as they once did. Two applications of the present invention with respect to motorcycles are shown, helping to increase the safety of such two wheel vehicles making them more visible to other drivers on the roadway in driving or stopping situations.

A low current consuming, high intensity amber output directional lamp DRL system with universal installation applications and no vehicle age limits, ranging from existing semi-tractor trailers, buses, and fleet vehicles, to personal and recreational-use private vehicles, could be highly beneficial to automotive safety in general. Additional advantages might be realized in terms of fleet liability and insurance coverage with respect to medium and large corporations, should same corporate fleets be equipped with the present invention. And finally, a system incorporating a vehicle's own internal bulb-outage indication systems, to monitor bulb 'burn out' with respect to turn signal bulbs themselves, is highly beneficial. Since the present invention uses the vehicle's internal bulb-out safety system to monitor the turn signal/new DRL bulbs for 'burn out', the bottom line effect is that the overall safety of the system as a whole is increased.

DISCLOSURE OF INVENTION

The present invention provides a daytime running light module for controlling the illumination of conventional domestic and imported vehicle front directional turn signal lamps. The daytime running light module/system includes a multiple pole switch or pair of switches that are to be interconnected between the front vehicular directional lights and a power source to control the light emitted from the directional lights of the vehicle. That is, the module operates to control when one filament of a two-filament bulb or system is illuminated, such that the brighter filament or bulb will be illuminated when the operator wishes to draw attention to the vehicle for safety purposes. The module may automatically control the light output as desired in the daytime running light mode, and may be manually switched on or off during daytime operational hours by the vehicle's driver. Such DRL lighting is turned off automatically by the vehicle's main headlight switch, when the main vehicular headlight switch is actuated into either one of it's two vehicular illumination modes, namely the parking light position or the headlight plus parking light position. Because any U.S. vehicle's front directional lamps are expectedly amber in output, as required by law, employment of such bulbs as daytime running lights yields a distinctive high intensity amber output that is more noticeable than white output DRL's in a white daylight-flushed world. The present invention is designed to allow the vehicle's internal turn signal bulb-out indication system to monitor these same bulbs for bulb failure due to 'burn out'. These same directional lamp bulbs are highly efficient, allowing the present invention to offer comparative fuel economy savings over that of the more common headlight driven DRL systems. Compared to a vehicle with its headlights on, the present invention is very frugal with respect to electrical current consumption. Any loss of module/system power, for any reason, causes all vehicle lighting wiring to revert back to its factory connections. This automatic safety reconnect feature occurs instantaneously, and is a failsafe that is designed into the module at the module's most basic operational level. The present invention also has motorcycle applications, as a turn signal control system, making same motorcycles safer by making them more visible on the roadways during both driving and stopping conditions.

BRIEF DESCRIPTION OF DRAWINGS

A daytime running light module and system embodying the features of the present invention is depicted in the accompanying drawings which form a portion of this disclosure and wherein.

MODES FOR CARRYING OUT THE INVENTION

Figure 1:
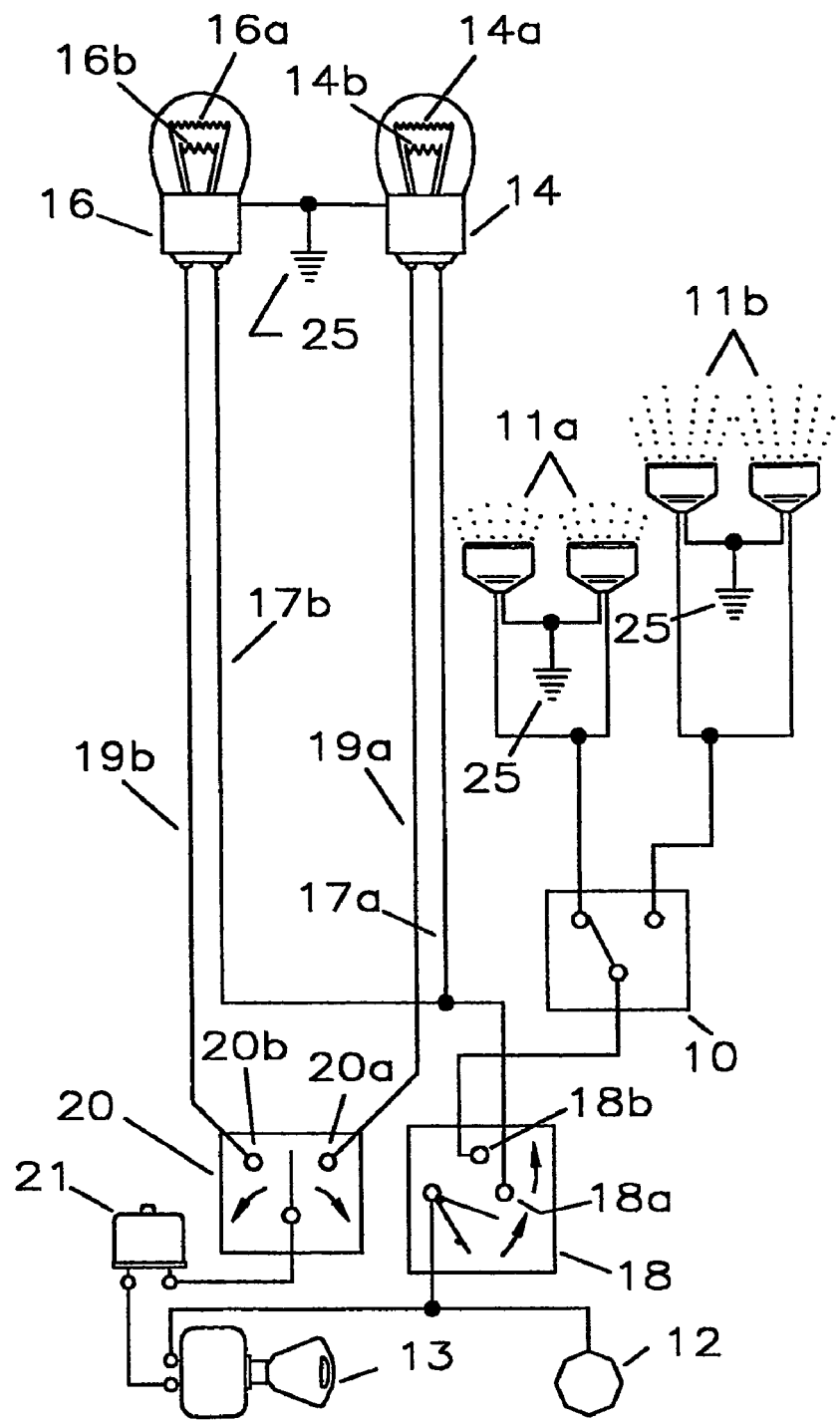
FIG. 1 is a schematic drawing of a connection of the front parking lights/turn signal lights and headlights of a conventional domestic vehicle of the prior art.

Referring now to FIG. 1, a conventional connection between a power source 12 and sets of automotive lights 11, 14, and 16 commonly found in most typical motor vehicles is illustrated. The power source 12 is a conventional vehicular power source, such as a 12-volt battery. The set of lights includes either one or two pair of headlights 11 (shown as two pair), and a pair of front vehicular lights 14, 16 having dual filament bulbs. Headlights 11 typically consist of a pair of low beam bulbs or components 11a, and a pair of high beam bulbs or components 11b, where switching between low and high beams is controlled by the headlight high/low beam dimmer switch 10. Traditional domestic and some newer import vehicle designs include a pair of front dual filament vehicular lights 14, 16 that are considered the front parking/tuning lights. These front vehicular lights 14, 16 are typically integrated into the vehicle generally at the front right corner and the front left corner of the vehicle. The position of the front vehicular lights 14, 16 allow the operator to provide visible signals in traffic to other vehicles in close proximity to same vehicle concerning the operator's directional intentions in operation of that vehicle. For example, the right front vehicle light 14 is visible on the right side of the vehicle and the left front vehicle light 16 is visible on the left side of the vehicle, as seen from facing the front of that same vehicle.

The first vehicular light 14 corresponds to the right side of the vehicle, and includes filaments 14a and 14b. The second vehicular light 16 corresponds to the left side of the vehicle, and includes filaments 16a and 16b. Each filament 14a, 14b, 16a, and 16b of the respective bulbs 14, 16 has a unique brightness corresponding to either a low intensity light or a high intensity light. In particular, the respective first filaments 14a, 16a have a brighter illumination than the second filaments 14b, 16b since the first filaments are conventionally used as turn signal directional lights, and the respective second filaments 14b, 16b having a softer illumination than the first filaments 14a, 16a since the second filaments are conventionally used as parking lights. The energized turn signal filament 14a, 16a in a conventional dual filament vehicle bulb 14, 16 is characteristically designed to be approximately three times as bright as an energized parking light filament 14a, 16a of that same bulb 14, 16. Consequently, the flashing turn signal light 14a, 16a has a high contrast, greater than the energized parking light during night operation of a vehicle. This is necessary during nighttime vehicle operation, since in the case of the dual filament bulb 14, 16 both light sources are emitting light from the same relative location and the same lamp housing.

Continuing to view FIG. 1, the power source 12 is connected to the headlights 11 and second dim filaments 14b, 16b of the vehicular lights 14, 16 via a parking/headlight switch 18 of such vehicle. That is, the parking/headlight switch 18 of the vehicle will determine when the headlights 11 and the dim filaments 14b, 16b are connected to the power source 12. On the other hand, the power source 12 is connected to the first bright filaments 14a, 16a of the vehicular lights 14, 16 via a turn signal switch 20, an ignition key switch 13, and a bulb out indication flasher 21. The negative connectors of lights 11, 14, 16 are grounded at vehicle chassis ground 25.

The ignition key switch 13 is the same that typically starts the engine of the vehicle. With respect to the power source 12, the first bright filaments 14a, 16a of the vehicular lights 14, 16, will only connect to voltage if the ignition key switch 13 of the vehicle is energized, or in an "on" position (i.e., when the ignition key of the vehicle is in the "run" position).

The first filament 14a, 16a of each vehicular light 14, 16 is connected to the turn signal switch 20 via a respective turn signal connector 19a, 19b, while the second filament 14b, 16b of each vehicular light 14, 16 is connected to the conventional parking/headlight switch 18 via a respective parking light connector 17a, 17b. The turn signal switch 20 is a single pole, double throw switch that has a center "off" or rest position. The turn signal switch 20 may complete the circuit at turn signal connector 20a for a right directional signal, or may complete the circuit at turn signal connector 20b for a left directional signal, as desired by the vehicle operator. The parking/headlight switch 18 is a single pole, double throw switch with an "off" or rest position. In operation, when the parking/headlight switch 18 is closed to either a parking light only position 18a or a headlight-plus-parking light position 18b, the parking/headlight switch 18 will connect the second filaments 14b and 16b with the power source 12 such that the second filament 14b, 16b will be energized. Also, when the turn signal switch 20 is activated for a right direction turn through connector 20a, the first filament 14a of the right vehicular light 14 is connected with the power source 12, through the bulb out indication flasher 21 and ignition key switch 13, such that the first filament 14a will be alternately energized and de-energized, in a pulsing on/off fashion. Similarly, when the turn-signal switch 20 is activated for a left directional turn through connector 20b, the first filament 16a of the vehicular light 16 is connected with the power source 12 through bulb out indication flasher 21 and ignition key switch 13 such that the first filament 16a will be alternately energized and de-energized, in a pulsing on/off fashion. The bulb out indication flasher 21 generates the alternating on/off flashing voltage sent to the first filament 14a when the turn signal switch 20 is actuated to indicate a right turn directional signal, and the bulb out indication flasher 21 generates an identical but redirected alternating on/off flashing voltage to the first filament 16a when the turn signal switch 20 is actuated to indicate a left turn directional signal.

The bulb out indication flasher 21 is considered a variable load device, and accomplishes the on/off flashing 12-volt output due to its electrical current or load carrying and subsequent load transferring capabilities. The primary conventional flasher design has only two contacts, one contact is connected to the power source 12 through the ignition key switch 13, while the other contact will not initiate "flashing" without current being drawn from the output connector of the bulb out indication flasher 21, via connection to the input of the turn signal switch 20, and connecting to either right turn connector 20a or left turn connector 20b. Some modern electronic bulb out indication flashers have a third terminal, which simply supplies a 12-volt ground connection to the flasher. Without any resistive load for the bulb out indication flasher 21 to draw current from or "sense", the bulb out indication flasher 21 will not flash at all. As the current flow rate out of the flasher 21 changes, the rate of flash of a conventional flasher usually also changes. Typically, when both front and rear turn signal bulbs on one side of a vehicle are functional and not burned out, the flash rate is typically one second on, and one second off, and then repeating. If one bulb burns out, this bulb becomes open circuit with respect to circuit continuity, and the bulb out indication flasher 21 typically goes into a fast-flash mode, to indicate to the vehicle operator that a bulb has burned out. This bulb out indication flasher 21 "senses" less current being drawn from it than its normal load of two bulbs per vehicle side, and this triggers the bulb out indication characteristics from the same flasher on whichever side of the vehicle the bulb out event occurs. Bulb out indication can actually be accomplished by three modes of operation: fast-flash, constant on, or constant off, as signaled to the vehicle operator by the right or left directional indicators at the dashboard of the vehicle.

Figure 2:
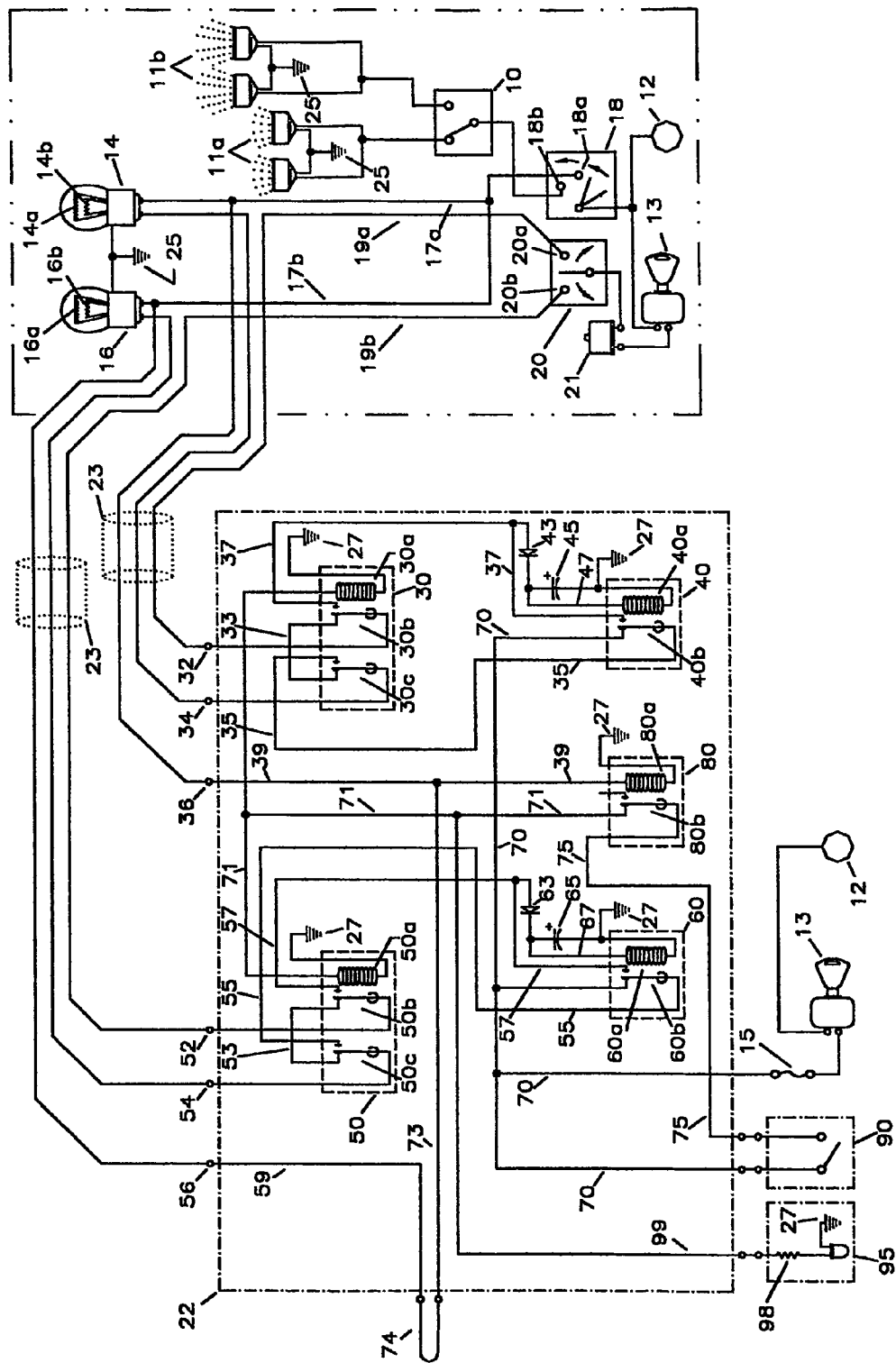
FIG. 2 is a schematic drawing of one embodiment of the daytime running light module of the present invention, incorporating the vehicle's internal bulb outage indication safety system.

Referring now to FIG. 2, a schematic diagram of one embodiment of the present invention of a daytime running light ("DRL") module 22 is illustrated. The daytime running module 22 is electrically connected between the vehicular lights 14, 16 and the turn signal connectors 19a, 19b, and is also connected to the parking light connectors 17a, 17b, to vehicular power source 12, and to vehicle chassis ground 27. As a result, the DRL module 22 controls the intensity of the light produced by the vehicular lights 14, 16. In particular, the DRL module 22 includes a pair of light intensity switches 30, 50 that are interconnected between the front vehicular directional lights 14, 16 and the power source 12, controlling the light emitted from the vehicular lights 14, 16 during various times and conditions of operation of same vehicle.

Each light intensity switch 30, 50 preferably comprises a relay, and more specifically a two pole, double throw relay. The first light intensity switch 30 is connected between the first vehicular light 14 and the right hand connector 20a of turn signal switch 20. Likewise, the second light intensity switch 50 is connected between the second vehicular light 16 and the left hand connector 20b of turn-signal switch 20. Each light intensity switch 30, 50 has an electromagnetic coil 30a, 50a, with one end of each coil connected to ground 27. Energizing the electromagnetic coil 30a, 50a causes the respective light intensity switch 30, 50 to energize and switch two sets or poles of internal moving contacts, subsequently connected to relay terminals. Such contacts 'relay' or switch continuity between terminals conventionally described as "common", "normally closed", and "normally open". The switch sets 30b, 30c and 50b, 50c typically connect the "common" terminals to matching "normally closed" terminals when the corresponding switch is not energized. When a voltage trigger is applied and maintained at the coil 30a, 50a of the corresponding light intensity switch 30, 50, the switch's electromagnetic coils 30a, 50a are energized, and a steel plate attached to the switch contacts are magnetically drawn to said coil 30a, 50a, causing the contacts to move toward the electromagnetic coil due to magnetic attraction forces. These internal contacts move in tandem with the coil energizing, and subsequently connect a "common" terminal to a corresponding "normally open" terminal when the respective switch coil is energized. When the coil 30a, 50a is no longer energized, the contacts are spring loaded to relax and move back to their original 'at rest' positions, causing the switching contacts to cycle back to their relaxed "normally closed" switching connections. Stated another way, the moving contact switching is characterized such that switched contacts that were closed in the relay's relaxed state are now open during the relay's energized state, and switched contacts that were open in the relay's relaxed state are now closed during the relay's energized state.

In the embodiment shown in FIG. 2, the first light intensity switch 30 is a two pole, double throw switch such that is able to make and/or break potentially two connections between the first vehicular light 14 and the right turn connector 20a of the directional turn signal switch 20. The connections between the front lights 14, 16 and the light intensity switch 30, 50 of the DRL module 22 may be made using a three-strand, 18-gauge shielded cable 23. The DRL module 22 is connected to the parking/headlight switch 18 via parking light connector 17a and parking light input connector 36. The first light intensity switch 30 is connected to the right turn connector 20a of the turn signal switch 20 through turn signal input connector 32 and turn signal connector 19a, and first light intensity switch 30 is also connected to the first brighter filament 14a through turn signal output connector 34. When the first light intensity switch 30 is not energized (i.e., turned "off"), the first light intensity switch 30 connects the turn signal input connector 32 with the turn signal output connector 34 via circuit path connector 33 and the "normally closed" switched contact sets 30b and 30c of first light intensity switch 30. As a result, the first light intensity switch 30 in the non-energized state connects the first brighter light filament 14a to its original turn signal connector 19a. Hence, right vehicle light 14 is reconnected to its former vehicle factory connections while the first intensity light switch 30 is not energized.

Note that there is conventionally a right rear bulb with parking light, turn signal, and also brake light duties (rear bulbs not shown) wired in parallel with the front bulb. The bulb out indication flasher 21 also sees the resistive load of the rear turn signal (brighter) filament in parallel with the first brighter filament 14a when turn signal switch 20 is actuated to signal a right turn and when first intensity light switch 30 is non-energized (i.e. is 'off'). In this manner the typical twin bulb type bulb out indication flasher 21 will correctly "sense" the combined bulb current load of the normal front and normal rear right turn signal filaments, causing normal right turn signal operation, provided neither of the vehicle's right bulb filaments are open circuit or "blown". Should only one right bulb draw current from bulb out indication flasher 21 when right turn signaling is activated, the bulb out indication flasher 21 will "sense" an incorrect (less than normal) current load being drawn from it, such that the bulb out indication flasher 21 triggers bulb out indication internally and changes its rate of flashing to indicate a bulb out condition has occurred.

When the first light intensity switch 30 is energized (i.e., turned "on"), the turn signal output connector 34 is connected to the power source 12 in the following manner: through ignition key switch 13 and module fuse 15, then through main power circuit connector 70, through the "normally closed" switched contact set 40b of turn signal rerouting switch 40, then through circuit path connector 35 and finally through the "normally open" switched contact set 30c of energized first light intensity switch 30. As a result, when light intensity switch 30 is energized, the first brighter filament 14a, which is connected to turn signal output connector 34, will be constantly powered "on" as long as the ignition key switch 13 is energized, and the turn signal rerouting switch 40 remains non-energized (i.e. stays "off").

Likewise, the second light intensity switch 50 of the embodiment shown in FIG. 2 is a two pole, double throw switch such that is able to make and/or break potentially two connections between the second vehicular light 16 and the left turn signal connector 20b of the directional turn-signal switch 20. The DRL module 22 is connected to the parking/headlight switch 18 via parking light connector 17b and parking light input connector 56. The second light intensity switch 50 is connected to the left turn connector 20b of the turn signal switch 20 through turn signal input connector 52 and turn signal connector 19b, and second light intensity switch 50 is also connected to the second brighter filament 16a through turn signal output connector 54. When the second light intensity switch 50 is not energized (i.e., turned "off"), the second light intensity switch 50 connects the turn signal input connector 52 with the turn signal output connector 54 via circuit path connector 53 and the "normally closed" switched contact sets 50b and 50c of second light intensity switch 50. As a result, the second light intensity switch 50 in the non-energized state connects the second brighter light filament 16a to its original turn signal connector 19b. Hence, left vehicle light 16 is reconnected to its former vehicle factory connections while the second intensity light switch 50 is not energized.

Note that there is conventionally a left rear bulb with parking light, turn signal, and also brake light duties (not shown) wired in parallel with the front bulb. The bulb out indication flasher 21 also sees the resistive load of the rear turn signal (brighter) filament in parallel with the first brighter filament 16a when turn signal switch 20 is actuated to signal a left turn and when second intensity light switch 50 is non-energized (i.e. is 'off'), In this manner the typical twin bulb type bulb out indication flasher 21 will correctly "sense" the combined bulb current load of the normal front and normal rear left turn signal filaments, causing normal left turn signal operation, provided neither of the vehicle's left bulb filaments are open circuit or "blown". Should only one left bulb draw current from bulb out indication flasher 21 when left turn signaling is activated, the bulb out indication flasher 21 will "sense" an incorrect (less than normal) current load being drawn from it, such that the flasher triggers bulb out indication internally and changes its rate of flashing to indicate a bulb out condition has occurred.

When the second light intensity switch 50 is energized (i.e., turned "on"), the turn signal output connector 54 is connected to power source 12 in the following manner: through ignition key switch 13 and module fuse 15, then through main power circuit connector 70, through the "normally closed" switched contact set 60b of turn signal rerouting switch 60, then through circuit path connector 55 and finally through the "normally open" switched contact set 50c of energized second light intensity switch 50. As a result, when light intensity switch 50 is energized, the second brighter filament 16a, which is connected to turn signal output connector 54, will be constantly powered "on" as long as the ignition key switch 13 is energized, and the turn signal rerouting switch 60 remains non-energized (i.e. stays "off"). Note that when intensity light switches 30, 50 are energized, the module 22 is considered to be "on", as discussed herein.

In FIG. 2, the DRL module 22 additionally includes a first and second turn signal rerouting switch 40, 60 that operate in conjunction with turn signal switch 20 and bulb out indication flasher 21 to oscillate the brightness of the respective vehicular lights 14 and 16 in vehicular turning situations. Each turn signal rerouting switch 40, 60 is preferably a single pole, double throw switch, such as a relay.

Looking to the first turn signal rerouting switch 40, both the electromagnetic coil 40a and the "normally open" contact of switched contact set 40b are connected to the turn signal input connector 32, through the "normally open" switched contacts 30b of first intensity light switch 30 (which are closed when the module is energized or "on"), and through to circuit connector 37. Additionally, the connection to the electromagnetic coil 40a from circuit connector 37 passes through the right rerouting diode 43, connects to the positive end of right rerouting capacitor 45, and then through circuit connector 47. The negative end of right rerouting capacitor 45 is connected to ground 27, as is the other end of coil 40a. The "common" contact of turn signal rerouting switch 40 is connected to turn signal output connector 34 and to first bright filament 14a via circuit connector 35 and the "normally open" contact set 30c of energized first intensity light switch 30 (which is closed when the module is "on"). Hence, when the DRL module 22 is "on" (and therefore first intensity light switch 30 is energized) and the turn signal switch 20 is actuated to indicate a right directional signal by completing the circuit at connector 20a, the turn signal input connector 32 connects pulsed right turn signal input (or "signal") to the coil 40a of first turn signal rerouting switch 40. The right turn signal pulsed output from turn signal switch 20 causes the first turn signal rerouting switch 40 to initially energize; thus disconnecting the "normally closed" connection of contact set 40b between the power source 12 via main circuit power connector 70, and the turn signal output connector 34 via circuit connector 35 and the "normally open" contact set 30c of energized first intensity switch 30, whereas the turn signal output connector 34 is connected to first brighter filament 14a. The right rerouting capacitor 45 acts as a storage battery, storing up voltage to keep the electromagnetic coil 40a constantly energized, and both remains charged and recharges with each positive pulse of the right turn signal pulsed output. Right rerouting capacitor 45 should be sized to keep first turn signal rerouting switch 40 energized as long as the turn signal is on. When the right hand pulsed signal disappears and reappears one second later (which is typical when the turn signal switch 20 is actuated for a right hand turn), the stored energy in the right rerouting capacitor 45 discharges positive voltage towards the coil 40a to keep the coil 40a constantly energized until the next positive pulse appears. Also, the right rerouting diode 43, typically sized to minimize voltage losses across same diode, acting as a one-way current valve, operates to keep the right rerouting capacitor 45 from discharging its stored energy backwards towards first intensity light switch 30. When both the pulsed signal is present and first intensity light switch 30 is "on", the electromagnetic coil 40a of first turn signal rerouting switch 40 stays energized due to the storage effect of the right rerouting capacitor 45, instead of pulsing on and off in unison with the pulsed signal. Energized turn signal rerouting switch 40 then routes turn signal output from circuit connector 37 through its "normally open" contacts 40*b* (now "closed") of first turn signal rerouting switch 40 to first bright filament 14*a* via circuit connector 35, through the "normally open" contact set 30*c* of first intensity switch 30 (now "closed"), and through turn signal output connector 34. The bulb out indication flasher 21 then internally alternates between opening and closing a connection between the ignition key switch 13 and the turn signal switch contact 20*a* of turn signal switch 20. Thus, the first brighter filament 14*a* is on, then pulses off, then on, and then repeats while the turn signal switch 20 is energized or "on". This "rerouting" of the output from the bulb out indication flasher 21 back to the first bright filament 14*a* while the right turn signal is in operation allows for bulb out indication, as provided by the bulb out indication flasher 21 to be functionally maintained as long as the right turn signal is in operation. Stated another way, rerouting of the right turn signal output of the vehicle back to the first bright turn signal filament 14*a* when the first intensity light switch 30 is energized and the turn signal switch 20 is actuated for a right turn allows the vehicle's existing bulb out indication flasher 21 to monitor for any right side open circuit or "burned out" bulb occurrences. Additionally, the vehicle's rear right turn signal bulb filament (not shown in FIG. 2) is also fed a signal from bulb out indication flasher 21 through its normal connections (not shown), and operates to signal a right turn in unison with first bright filament 14*a* in the front of same vehicle.

When the actuated turn signal switch 20 turns off, which is typical when a turn is complete and the steering wheel cancels the connection at turn signal switch 20, the right rerouting capacitor 45 no longer receives pulsed signal, and can no longer remain constantly charged. In about ½ of 1 second or less, the right rerouting capacitor 45 discharges its stored energy completely to the electromagnetic coil 40*a*. The right rerouting switch 40 no longer remains energized, and when it relaxes it reconnects first bright filament 14*a* to power source 12 via ignition key switch 13, through module fuse 15, main power circuit connector 70, and through the "normally closed" switched contact set 40*b* of turn signal rerouting switch 40, as previously detailed above. This reconnection again allows for daytime running light operation by first bright filament 14*a*, which now is again powered "on" in DRL operational mode after the right turn signal operation is over, provided the first intensity light switch 30 is still "on", and hence the module 22 is still "on".

Looking to the second turn signal rerouting switch 60, both the electromagnetic coil 60*a* and the "normally open" contact of switched contact set 60*b* are connected to the turn signal input connector 52, through the "normally open" switched contacts 50*b* of energized second intensity light switch 50 (which are closed when the module 22 is "on"), and through to circuit connector 57. Additionally, the connection to the electromagnetic coil 60*a* from circuit connector 57 passes through the left rerouting diode 63, connects to the positive end of left rerouting capacitor 65, and then through circuit connector 67. The negative end of left rerouting capacitor 65 is connected to ground 27, as is the other end of coil 60*a*. The "common" contact of turn signal rerouting switch 60 is connected to turn signal output connector 54 and to second bright filament 16*a* via circuit connector 55 and the "normally open" contact set 50*c* of second intensity light switch 50 (which is closed when the module is energized or "on"). Hence, when the DRL module 22 is "on", (and therefore second intensity light switch 50 is energized) and the turn signal switch 20 is actuated to indicate a left directional signal by completing the circuit at connector 20*b*, the turn signal input connector 52 connects pulsed left turn signal input (or "signal") to the coil 60*a* of second turn signal rerouting switch 60. The left turn signal pulsed output from turn signal switch 20 causes the second turn signal rerouting switch 60 to initially energize; thus disconnecting the "normally closed" connection of contact set 60*b* between the power source 12 via main circuit power connector 70, and the turn signal output connector 54 via circuit connector 55 and the "normally open" contact set 50*c*, of energized second intensity switch 50, whereas the turn signal output connector 54 is connected to second brighter filament 16*a*. The left rerouting capacitor 65 acts as a storage battery, storing up voltage to keep the electromagnetic coil 60*a* constantly energized, and both remains charged and recharges with each positive pulse of the left turn signal pulsed output. Left rerouting capacitor 65 should be sized to keep second turn signal rerouting switch 60 energized as long as the turn signal is on. When the left hand pulsed signal disappears and reappears one second later (which is typical when the turn signal switch 20 is actuated for a left hand turn), the stored energy in the left rerouting capacitor 65 discharges positive voltage towards the coil 60*a* to keep the coil constantly energized until the next positive pulse appears. Also, the left rerouting diode 63, typically sized to minimize voltage losses across same diode, acting as a one-way current valve, operates to keep the left rerouting capacitor 65 from discharging its stored energy backwards towards second intensity light switch 50. When both the pulsed signal is present and second intensity light switch 50 is "on", the electromagnetic coil 60*a* of second turn signal rerouting switch 60 stays energized due to the storage effect of the capacitor 65, instead of pulsing on and off in unison with the pulsed signal. Energized turn signal rerouting switch 60 then routes turn signal output from circuit connector 57 through its "normally open" contacts 60*b* (now "closed") of second turn signal rerouting switch 60 to second bright filament 16*a* via circuit connector 55, through the "normally open" contact set 50*c* of second intensity switch 50 (now "closed"), and through turn signal output connector 54. The bulb out indication flasher 21 then internally alternates between opening and closing a connection between the ignition key switch 13 and the turn signal switch contact 20*a* of turn signal switch 20. Thus, the second brighter filament 16*a* is on, then pulses off, then on, and then repeats while the turn signal switch 20 is energized or "on". This "rerouting" of the output from the bulb out indication flasher 21 back to the second bright filament 16*a* while the left turn signal is in operation allows for bulb out indication, as provided by the bulb out indication flasher 21 to be functionally maintained as long as the right turn signal is in operation. Stated another way, rerouting of the left turn signal output of the vehicle back to the second bright turn signal filament 16*a* when the second intensity light switch 50 is energized and the turn signal switch 20 is actuated for a left turn allows the vehicle's existing bulb out indication flasher 21 to monitor for any left side open circuit or "burned out" bulb occurrences. Additionally, the vehicle's rear left turn signal bulb filament (not shown in FIG. 2) is also fed signal from bulb out indication flasher 21 through its normal connections (not shown), and operates to signal a left turn in unison with second bright filament 16*a* in the front of same vehicle.

When the actuated turn signal switch 20 turns off, which is typical when a turn is complete and the steering wheel cancels the connection at turn signal switch 20, the left rerouting capacitor 65 no longer receives the pulsed signal, and can no longer remain constantly charged. In about ½ of 1 second or less, the capacitor 65 discharges its stored energy completely to the electromagnetic coil 60a. The left rerouting switch 60 no longer remains energized, and when it relaxes it reconnects second bright filament 16a to power source 12 via ignition key switch 13, through module fuse 15, main power circuit connector 70, and through the "normally closed" switched contact set 40b of turn signal rerouting switch 40, as previously detailed above. This reconnection again allows for daytime running light operation by second bright filament 16a, which now is again powered "on" in DRL operational mode after the left turn signal operation is over, provided the second intensity light switch 50 is still "on", and hence the module 22 is still "on".

In summary, the functions of right and left rerouting switches 40, 60 inside the energized DRL module 22 are to feed the brighter front turn signal filaments 14a, 16a of a vehicle one of two signals; either a default DRL constant output voltage, or, when appropriate and actuated by the turn signal system, normal turn signal pulsed output voltage which is delivered by and through a switching logic system, such that is triggered by the turn signal system itself. These rerouting switches 40, 60 provide the proper turn signal operation of the module 22 and allow the vehicle to continue to comply with federal vehicular turn signal guidelines and regulations. This feature gives the present invention a competitive advantage when compared to other DRL devices in that it allows the vehicles onboard systems to constantly monitor for bulb 14, 16 failure, provided same vehicle is so equipped with a bulb out indication system. Additionally, pulsed hazard light signals are also rerouted to the appropriate bulb filaments in the same manner, except now both sides operate in unison, allowing the vehicle's dual hazard lighting system to also operate correctly while the DRL module 22 is in operation. All functions again work as originally designed when the DRL module 22 is not operational.

The DRL module 22 additionally includes an automatic override switch 80 that automatically deactivates first and second light intensity switches 30, 50 when the parking light/headlight switch 18 is in either the parking light only position 18a or the headlight-plus-parking light position 18b. The automatic override switch 80 is desirable to override or defeat the module 22 operationally, reducing the illumination of the vehicular lights 14, 16 during nighttime hours when brighter vehicle lights are not desired or needed.

The embodiment of the DRL module 22 such as shown in FIG. 2 includes the automatic override switch 80, preferably a single pole, double throw switch, such as a relay. The "normally closed" contact set 80b of automatic override switch 80 allows the power supply 12 to energize the respective coil inputs 30a, 50a of the first and second light intensity switches 30, 50, as long as automatic override switch 80 remains "off". Still looking at FIG. 2, the power supply 12 connects to the ignition key switch 13, through module fuse 15 and to main power circuit connector 70, then through main module power switch 90 (provided same switch is closed, further discussed herein), through circuit connector 75, through the "normally closed" contact set 80b of automatic override switch 80, and then to auxiliary power circuit connector 71, which in turn is connected simultaneously to both coil inputs 30a, 50a of the first and second light intensity switches 30, 50. As mentioned above, the other end of each electromagnetic coil 30a, 50a is connected to ground 27. This connection causes the module 22 to turn "on" when both the ignition key switch 13 is energized and the main module power switch 90 is closed, as light intensity switches 30, 50 being energized is the state where the module 22 is considered to be "on". The electromagnetic coil 80a of automatic override switch 80 is connected to parking light/headlight switch 18 in the following manner: through parking light connector 17a, parking light input connector 36, then circuit connector 39, and then to coil 80a of automatic override switch 80. The other side of coil 80a is connected to ground 27. Alternately, the electromagnetic coil 80a of automatic override switch 80 is also connected to parking light/headlight switch 18 in the following manner: through parking light connector 17b, parking light input connector 56, then to circuit connector/output 59, then parking light loop 74, then circuit connector/input 73, then circuit connector 39, and then to coil 80a of automatic override switch 80. Activation of the parking light/headlight switch 18 will energize the coil 80a of the automatic override switch 80. When the parking lights are turned on, the automatic override switch 80 energizes and breaks the connection between circuit connector 75 and auxiliary power circuit connector 71 by opening the "normally closed" contacts of contact set 80b of automatic override switch 80. This in turn breaks the connection between ignition key switch 13 and the coils 30a, 50a of the first and second light intensity switches 30, 50. As a result, the first and second light intensity switches 30, 50 are not energized, and both of these switches are effectively turned "off". Consequently, the DRL module 22 will be deactivated when the vehicle parking lights energize, and the vehicular turn signal filaments 14a, 16a return to normal non-daytime running light operation, and function as originally connected by the vehicle manufacturer. Conventional factory-installed daytime running light systems currently operate this way, turning "off" as the vehicle parking lights and/or headlights turn "on". Most conventional exterior parking light systems in vehicles are wired in common or parallel throughout the vehicle, which means that the two connections from parking light input connectors 36, 56 which connect to the electromagnetic coil 80a of automatic override switch 80 are electrically identical. Certain cars, such as German vehicles, have independent parking light wiring. That is, they have distinctly separate parking light wiring for the right side of the vehicle that is unique from the left side of the vehicle. In such cars, the parking light loop 74 is available to be cut upon the installation of the module 22 without affecting operation of the module 22. In such a case, power for automatic nighttime override, caused by the energizing of automatic override switch 80, is then only supplied by right parking light input 36.

Looking to FIG. 2, a main module power switch 90 may be included as an option in the present invention to allow the user to control the operation of the first and second light intensity switches 30, 50. In particular, the main module power switch 90 is preferably a conventional single pole, single throw switch, with an "off" or rest position, that connects between the ignition key switch 13 and the first and second light intensity switches 30, 50. Thus, when the main module power switch 90 is closed, the connection between the ignition key switch 13 and the electromagnetic coils 30a, 50a of the first and second light intensity switches 30, 50 is maintained, and the module 22 is "on". The connection itself is from the ignition key switch 13 and through module fuse 15, to main power circuit connector 70, then through main module power switch 90 (provided same switch is closed), through circuit connector 75, through the "normally closed" contact set 80b of automatic override switch 80, and then to auxiliary power circuit connector 71, which in turn is connected simultaneously to both coil inputs 30a, 50a of the first and second light intensity switches 30, 50. Conversely, when the main module power switch 90 is open, the electrical connection between the ignition key switch 13 and the electromagnetic coils 30a, 50a of first and second light intensity switches 30, 50 is broken or disconnected. In this case the DRL module 22 will not control the vehicular lights 14, 16, allowing them to reconnect to their original factory connections and resulting in the normal operational functioning of vehicular lights 14, 16 without the control of the DRL module 22. Many factory daytime running light systems lack this operator control functionality, and such a control feature is particularly advantageous to a game hunter, who uses their vehicle to enter the woods during early morning hours, and is trying not to draw attention to their vehicle upon arrival.

There also exists an extremely important and significant safety advantage to the present invention with respect to module's main power wiring and switching. This advantage is such that if the module 22 loses power for any reason, then any and all of the vehicle's factory lighting wiring is reconnected instantaneously to its respective bulbs 14, 16, so that the vehicle's turn signal system is never defeated by any module power supply malfunction. This occurs when first and second light intensity switches 30, 50 de-energize or relax, such that DRL module 22 becomes essentially invisible to the vehicle, as all factory wiring is reconnected with its normal bulbs as a safety failsafe. This automatic safety reconnection feature, which is designed into the module 22 at its most basic operational level, occurs instantaneously under all of the following scenarios: anytime the vehicular ignition key 13 is turned off, if module fuse 15 were to become open circuit or 'blow', if main module power switch 90 were to be turned "off" during vehicle operation, or if the single wire supplying the main ignition keyed power feed coming from the vehicle's factory fuse box (not shown) were to become inadvertently disconnected for any reason.

FIG. 2 of the present invention optionally includes an operational indicator 95, such as a one positive voltage input, one color light emitting diode ("LED"). The operational indicator 95 provides feedback or notice to the user concerning the operational state of the DRL module 22. The operational indicator 95 includes one dropping resistor 98, and has a negative terminal that is connected to ground 27. Resistor 98 is connected in-line or in series with the positive input of the indicator and the circuit connector/output 99, thus causing the LED to illuminate when 12 volts is present at circuit connector/output 99. The resistor 98 functions to reduce or "drop" the 12-volt output from the module circuit connector/output 99 to about 2 volts, such as is the voltage requirement of most all LEDs.

When the operational indicator 95 is illuminated, the DRL module 22 is "on". This occurs only if both the vehicle's ignition key switch 13 and the module 22 itself are both "on". The ensuing connection, referring to FIG. 2 again, is from ignition key switch 13, through module fuse 15, to main power circuit connector 70, then through main module power switch 90, through circuit connector 75, through the "normally closed" contacts of contact set 80b of automatic override switch 80, then through circuit connector 71, then through circuit connector/output 99, then to resistor 98 and on to operational indicator 95. Such can occur only if the module 22 is "on", as the completed circuit supplying voltage to circuit connector/output 99 is disconnected when any one of four conditions happen: when the ignition key switch 13 is off, when module fuse 15 is "blown" or open circuit, or when the main module power switch 90 is switched "off", or when the automatic override switch 80 energizes and breaks the automatic override switch's 80 "normally closed" connections between circuit connector 75 and circuit connector 71 as a result of the parking light/headlight switch 18 being switched to either the parking light only position 18a or the headlight-plus-parking light position 18b. Although any color LED could be chosen for operational indicator 95, green is chosen as the preferred color and is chosen as such to represent that the safety system module 22 is operational.

Figure 3:
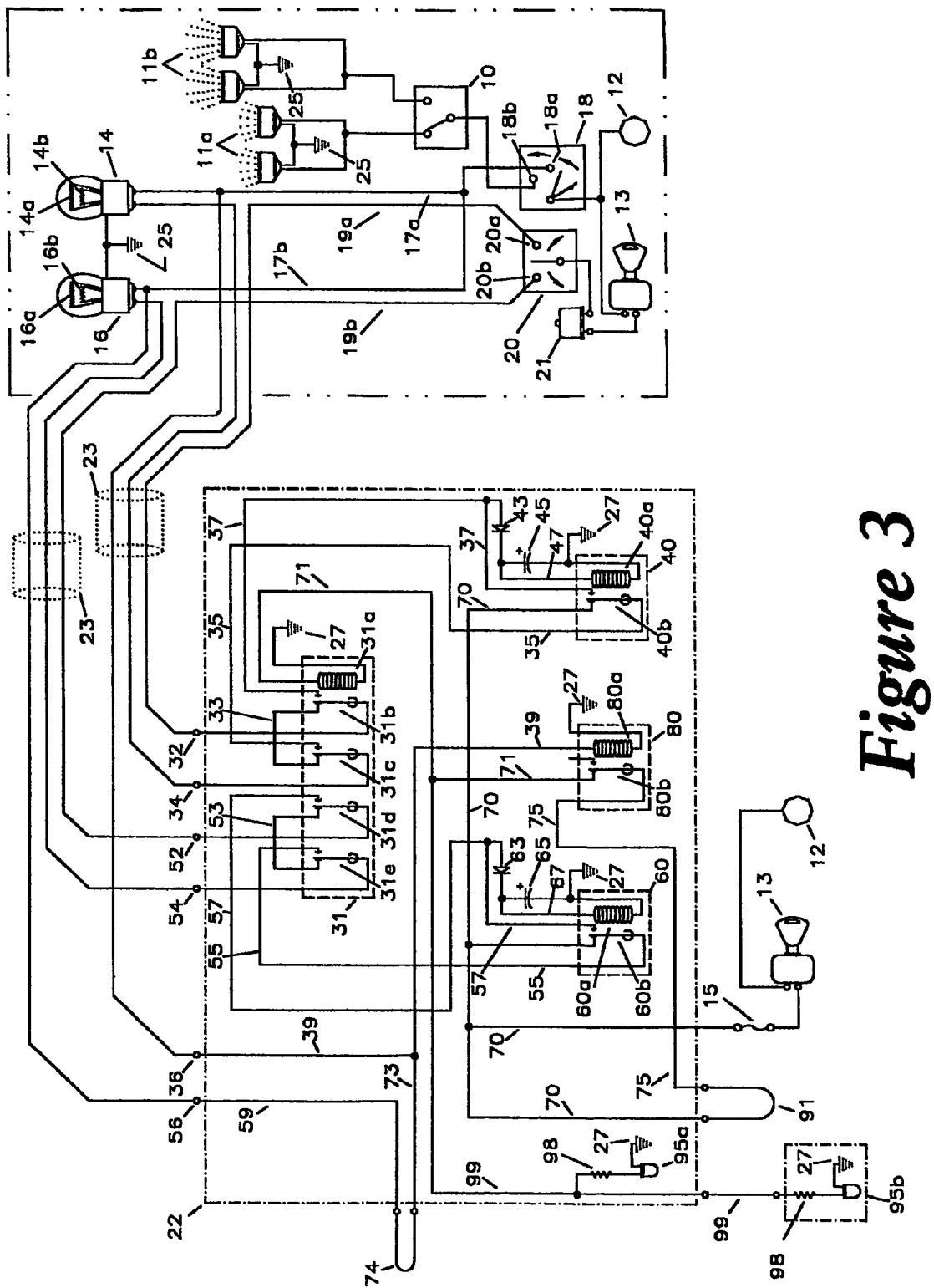
FIG. 3 is a schematic drawing of an embodiment of the economy or fleet version of the daytime running light module of the present invention.

In the embodiment of the DRL module 22 illustrated in FIG. 3, the design of the DRL module 22 has been simplified to include only one main intensity light switch 31. This main light intensity switch 31 preferably comprises a relay, and, more specifically, a four pole, double throw relay. The operation of this present invention is identical to that of FIG. 2, with the exception that internal contact sets 31d and 31e of main intensity light switch 31 now perform the switching functions previously performed by second light intensity switched contacts 50b and 50c, as formerly shown in FIG. 2. This economy version of the DRL module 22 is designed potentially for fleet or rental car applications, where the vehicle operator would have no control over the operation of the module 22. The previous optional main module power switch 90, shown in FIG. 2, is replaced by main power loop 91. This main power loop 91 allows for continuous operation of the DRL module 22, without the operator's ability to turn such a device "off" during daytime hours, as might be found advantageous by automotive insurance carriers. In theory, this is similar to insurance carrier's policies on automatic arming automotive burglar alarms, where the vehicle in question would be always protected without any action required by the vehicle operator. Absence of a vehicle operator's ability to turn the module 22 "off" at will may allow an insurance company to offer a discount should the device be in "guarantzeed" operation all of the time during daytime hours.

The embodiment of the invention illustrated in FIG. 3 includes two separate operational indicators. Operational indicator 95a is included at the circuit board level of the DRL module 22 and used for installation troubleshooting, and such indicator is referred to as built-in. Note that the DRL module 22 is typically mounted behind the dashboard of a vehicle, on the driver's side. Optional remote operational indicator 95b gives the vehicle operator indication and confidence that the module is "on", and is to be mounted under the vehicle dashboard, typically on the drivers side and within view of the operator. Both operational indicators 95a, 95b illustrated in FIG. 3 would operate in unison, illuminating "green" when the module 22 is operational. In the most basic installation application, the optional remote operational indicator 95b would not be included.

If the DRL module 22 is to be utilized as a fog light module for vehicles with front dual filament directional turn signal bulbs, then the heat from such bulbs should be kept to a minimum at night when both filaments can potentially be powered. At night, both the parking light filaments 14b 16b and the turn signal filaments 14a, 16a could be on simultaneously if a condition such as the module 22 was operating in night-energized mode while the parking lights were simultaneously activated. Previously, as a vehicle is typically designed from the manufacturer, the turn signal lights have only a pulsed on-off mode of operation, while the parking lights normally operate in a constant "on" mode, so the turn signal lights and the parking lights never competed directly with each other during normal vehicle nighttime operation. The present invention configured as a DRL module 22 only, as shown in FIGS. 2 and 3, is automatically turned off every time the parking lights or headlights are energized, so both bright and dim filaments powered at the same time in this case never an issue. Since the turn signal filaments 14a, 16a, if constantly energized by the module 22, are typically approximately three times brighter than the nighttime parking light filaments 14b, 16b, and since both filaments reside inside the same bulb and inside the same lamp housing in the dual filament bulb situation, the need for both filaments to be on continuously at the same time is non-existent. The parking light filaments, if they were powered at the same time the turn signal filaments were continuously energized, could not be seen due to the dominance of the brightness of the turn signal filaments. But the heat load that continuously powered parking light filaments add to the lamp housing should to be controlled when the brighter turn signal filaments are continuously powered at the same time, since the parking lights cannot add additional brightness but can only add unnecessary heat to the internal lamp housing temperatures if both filaments were to be constantly energized simultaneously.

Figure 4:
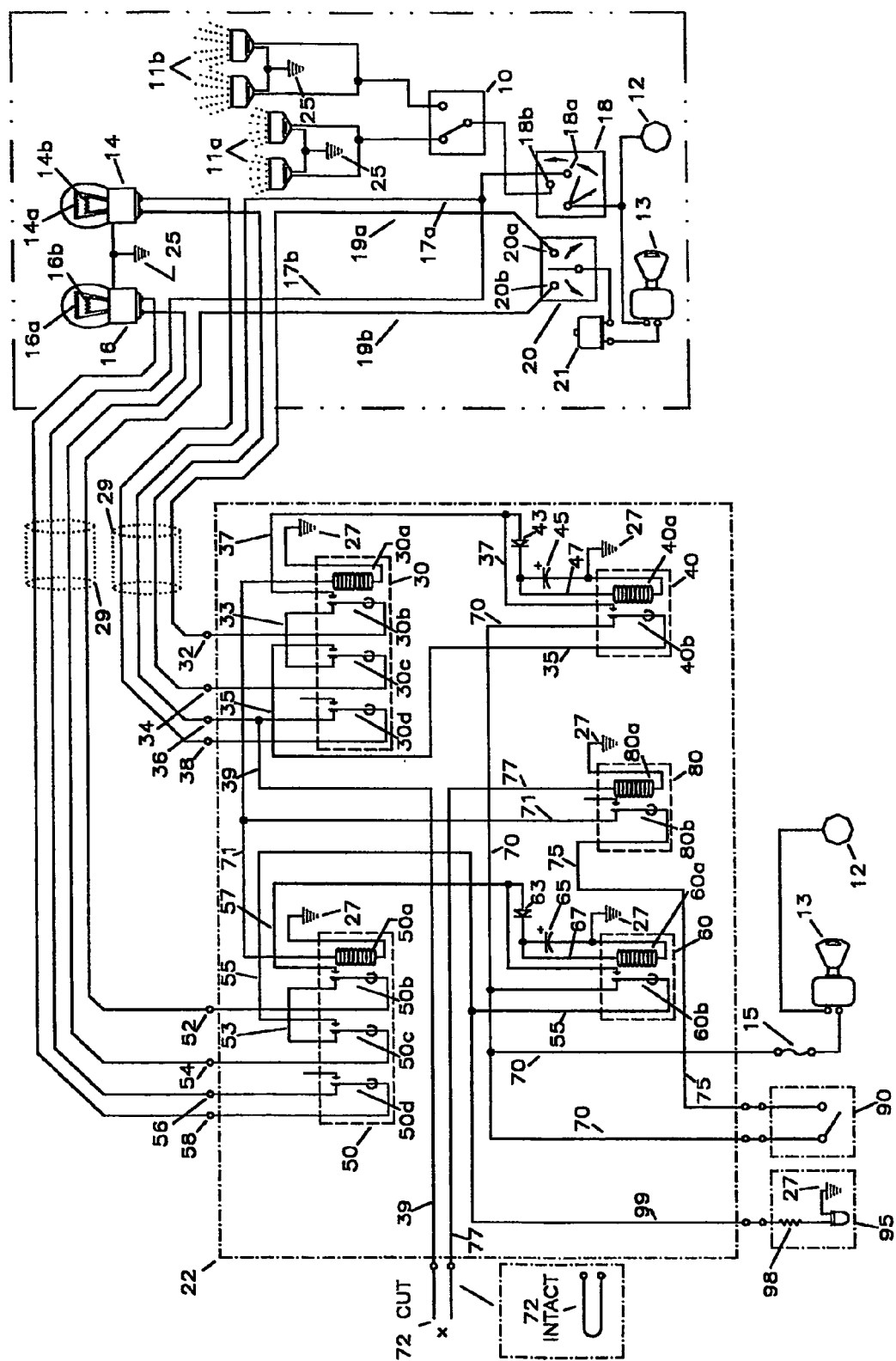
FIG. 4 is a schematic drawing of another embodiment of a 'fog light only' version of the daytime running light module of the present invention.

Looking now to FIG. 4, a schematic diagram of one embodiment of the present invention of the DRL module 22 that can be configured strictly as fog light only operation is illustrated. Fog light only operation is herein defined as what happens operationally when under bumper fog lights are purchased from an auto parts store and installed aftermarket onto a vehicle. Specifically, an aftermarket fog light system typically becomes ready to operate if the vehicle's ignition switch 13 is "on", and one main power switch turns said fog lights either on or off. In the embodiment shown in FIG. 4, the first and second light intensity switches 30, 50 are now three pole, double throw switches such that are able to make and/or break potentially three connections between both pairs of filaments 14*a*, 14*b* and 16*a*, 16*b* of the first and second vehicular lights 14, 16 and both the turn signal connectors 20*a*, 20*b* of the directional turn signal switch 20 as well as the both of the parking light connectors 17*a*, 17*b* of headlight switch 18. All connections from the front lights 14, 16 and the light intensity switches 30, 50, of the fog light only module 22 in FIG. 4 may be made using twin four-strand, 18-gauge shielded cables 29. In the embodiment of the present invention shown in FIG. 4, the first and second intensity switches 30, 50 continue to control connections between first and second bright filaments 14*a*, 16*a* and both turn signal switch 20 and ignition keyed power source 13, as outlined earlier and shown in FIG. 2. Additionally, the first and second intensity switches 30, 50 now also control connections between first and second dimmer filaments 14*b*, 16*b*, and parking/headlight switch 18.

Looking at FIG. 4, the first light intensity switch 30 is now additionally connected between the parking/headlight switch 18, via a parking light input connector 36 and parking light connector 17*a*, and between the first dimmer filament 14*b* via a parking light output connector 38. When the first light intensity switch 30 is "off", the light intensity switch 30 now also connects the parking light input connector 36 with the parking light output connector 38 using the "normally closed" switched contact set 30*d* of first light intensity switch 30. As a result, the first light intensity switch 30 in the non-energized state connects the first dimmer light filament 14*b* to its original parking light connector 17*a*. Hence, when this is combined with the operations of first intensity light switch 30 previously described in FIG. 2, both connections to right dual filament vehicle light 14, namely connections with parking light filament 14*b* and turn signal filament 14*a*, are reconnected to their former vehicle connections while the first intensity light switch 30 is "off". Also, when the first light intensity switch 30 is energized (when the module 22 is "on"), the connection between parking light output input connector 36 and parking light output connector 38 is broken (or disconnected) via the switching of the contact set 30*d* of first intensity light switch 30 from "normally closed" to "normally open". Yet at the same time, the first bright filament 14*a* is powered constantly when the first intensity light switch 30 is energized or "on", as previously discussed. This results in the first dimmer filament 14*b* being disconnected anytime the fog light only module 22 in FIG. 4 is operational, and the module 22 being operational means the first brighter filament 14*a* is powered constantly. In essence, the constant burning turn signal filament now becomes or takes the place of the constant burning parking light filament when night operation of the module 22 occurs. This situation of both filaments never being on at the same time is the desired effect to limit additional parking light filament heat at night should the module 22 be used for fog light nighttime operation in conjunction with specifically a dual filament front bulb turn signal system. Also, the 'either or' switching logic of the module 22 virtually guarantees that either the regular parking light filaments or the night time fog light/turn signal filaments 11*a*, 11*b* burn constantly at night. Stated another way, at night, one pair of filaments or another is always powered, and the switching logic built into the module 22 at its core functional level allows no possibility of any other possible nighttime operation. This combined with the automatic safety reconnect functionality of the module 22 is all designed to enhance the safety of such a system holistically.

Likewise, looking at second intensity light switch 50 in FIG. 4, the second light intensity switch 50 is now additionally connected between the parking/headlight switch 18, via a parking light input connector 56 and parking light connector 17*b*, and between the second dimmer filament 16*b* via a parking light output connector 58. When the second light intensity switch 50 is "off", the second light intensity switch 50 will connect the parking light input connector 56 with the parking light output connector 58 using the "normally closed" switched contact set 50*d* of second light intensity switch 50. As a result, the second light intensity switch 50 in the non-energized state connects the second dimmer light filament 16*b* to its original parking light connector 17*b*. Hence, when this is combined with the operations of second intensity light switch 50 previously described in FIG. 2, both connections to left dual filament vehicle light 16, namely parking light and turn signal light connections, are reconnected to their former vehicle connections while the second intensity light switch 50 is "off". Also, when the second light intensity switch 50 is energized (when the module 22 is "on"), the connection between parking light output input connector 56 and parking light output connector 58 is broken (or disconnected) via the switching of the contact set 50*d* of second intensity light switch 50 from "normally closed" to "normally open". Yet at the same time, the second bright filament 16*a* is powered constantly when the second intensity light switch 50 is energized or "on", as previously discussed. This results in the second dimmer filament 16*b* being disconnected anytime the fog light only module 22 in FIG. 4 is operational, and the module 22 being operational means the second brighter filament 16*a* is powered constantly. In essence, the constant burning turn signal filament 16*a* now becomes or takes the place of the constant burning parking light filament 16*b* when night operation of the module 22 occurs. This situation of both filaments 16*a*, 16*b* never being on at the same time is the desired effect to limit additional parking light filament heat at night should the module 22 be used for fog light nighttime operation in conjunction with specifically a dual filament front bulb turn signal system. Also, the 'either or' switching logic of the module 22 virtually guarantees that either the regular parking light filaments 16*b* or the night time fog light/turn signal filaments 16*a* burn constantly at night. Stated another way, at night, one pair of filaments or another is always powered, and the switching logic built into the module 22 at its core functional level allows no possibility of any other possible nighttime operation. This combined with the automatic safety reconnect functionality of the module 22 is all designed to enhance the safety of such a system holistically.

Finally, with reference to FIG. 4, the parking light loop 74 former shown in FIG. 2 and FIG. 3 is no longer included, as each parking light input 36, 56 from the front right and front left vehicle sides are being processed and controlled independently by the first and second intensity light switches 30, 50 as described above. This is only done to control unwanted heat, as previously explained. The automatic override switch 80 has the potential to automatically deactivate first and second light intensity switches 30, 50 when the parking light/headlight switch 18 is in either the parking light only position 18*a* or the headlight-plus-parking light position 18*b*, provided the night operation loop 72 in "intact" or continuous, as shown in the inset in FIG. 4. The parking light signal needed to energize automatic override switch 80 is now provided by right parking light input 36 singularly, as would occur in FIG. 2 should parking light loop 74 be severed or cut. This connection, still looking at FIG. 4, occurs as parking light voltage (or signal) reaches the electromagnetic coil 80*a* of automatic override switch 80 from the parking light/headlight switch 18 in the following manner: through parking light connector 17*a*, parking light input connector 36, then to circuit connector/output 39, then night operation light loop 72 (when continuous or intact), then circuit connector/input 77, and then to coil 80*a* of automatic override switch 80. Activation of the parking light/headlight switch 18 will energize the coil 80*a* of the automatic override switch 80 as long as night operation loop 72 is intact. When the night operation loop 72 is cut, the automatic override switch 80 can no longer energize and break the connection between ignition key switch 13 and the coils 30*a*, 50*a* of the first and second light intensity switches 30, 50. As a result, the first and second light intensity switches 30, 50 will remain energized, and are effectively left "on" when the parking/headlight switch 18 is activated. This, in effect allows the module 22 to remain "on" when the parking/headlight switch 18 is activated, because if the intensity switches 30, 50 are "on", then the module 22 itself is "on". If night operation loop 72 is permanently cut, then the module 22 operates both day and night exclusively as a fog light module, and the main module power switch 90 controls the module 22 in all situations such that the ignition key switch 13 is "on".

Figure 5:
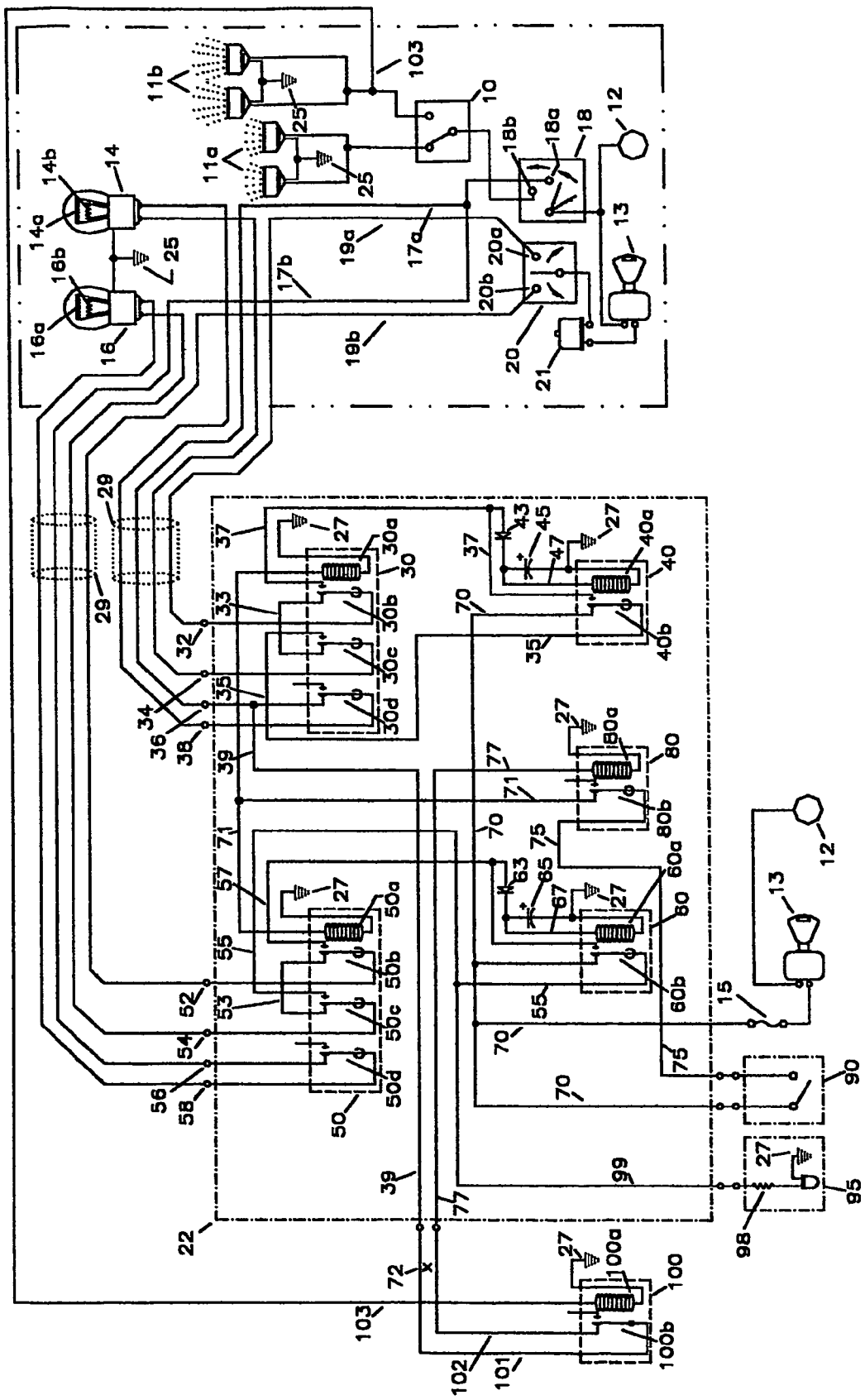
FIG. 5 is a schematic drawing of an expansion feature added externally to the daytime running light module of the present invention.

FIG. 5 shows an option added externally to the module 22 previously described in FIG. 4. In this case, it is necessary to include an auxiliary, 12-volt single pole, double throw high beam/auxiliary operation switch 100, such as a relay, as shown. Night operation loop 72 in now cut, and is connected to the "normally closed" contacts of contact set 100*b* of high beam/auxiliary operation switch 100 via external circuit connectors 101, 102. One end of the electromagnetic coil 100*a* of high beam/auxiliary operation switch 100 is connected to the vehicle's high beam output from the headlight high/low beam dimmer switch 10, via external circuit connector 103, while the other end of electromagnetic coil 100*a* is connected to ground 27. If the vehicle's high beams are turned on at any time, high beam/auxiliary operation switch 100 breaks the connection between the coil 80*a* of automatic override switch 80 and parking light voltage entering the module 22 from parking light input 36. Provided the main module power switch 90 is closed or "on", this optional high beam/auxiliary operation switch 100 addition causes the first and second bright filaments 14*a*, 16*a* of the module 22 to operate continuously in parallel with the high beams of same vehicle, and switches such lighting on and off at night as the high beams of that same vehicle switch on and off via the headlight high/low beam dimmer switch 10 in conjunction with parking/headlight switch 18. Normal module operation here would be: module 22 "on" as DRL's in the daytime, "off" at night when parking lights or low beams are on due to built in automatic override, then back "on" during usage of high beams. This optional connection and arrangement augments and enhances the operation of the vehicle's high beams, by giving additional amber lighting along with the white high beams themselves during lone vehicle operation on dark roads, where high beams are typically used and needed. In this case, the vehicle's high beam operation working simultaneously with the nighttime "on" operation of the DRL/fog module 22 would only be desirable when no other vehicle operators are present, as the high beams of a vehicle are typically only used when a high glare situation is not a hindrance to others, such as on a deserted road at night.

Figure 6:
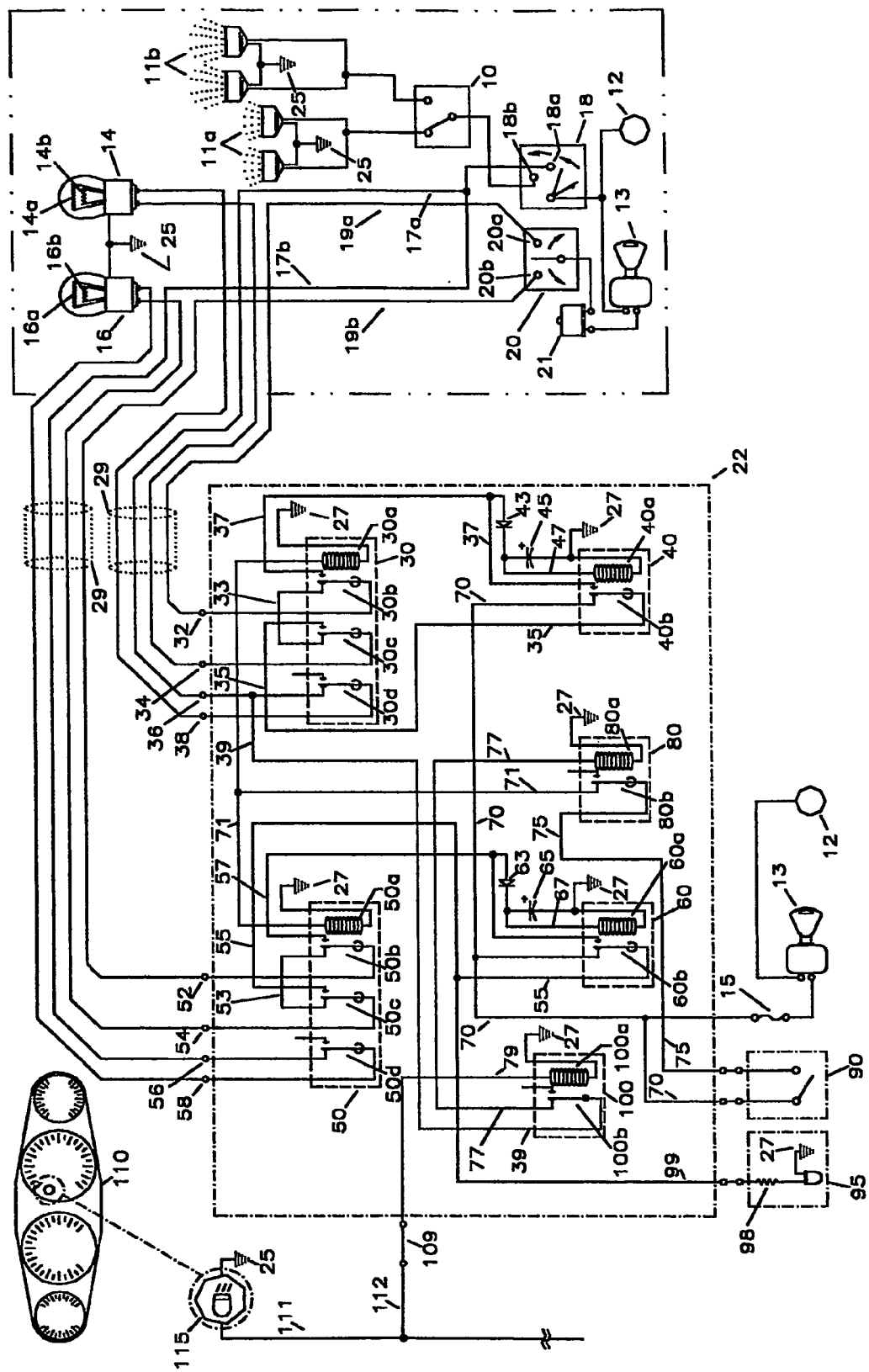
FIG. 6 is a schematic drawing of same expansion feature from FIG. 5 built into the daytime running light module of the present invention.

Looking further to FIG. 6, the high beam/auxiliary operation switch 100, which was previously external to the module 22, is now built into the module 22. Module high beam circuit connector/input 109 is added to the present embodiment and will allow night operation of the module 22 when high beam voltage is present. The vehicle's dashboard 110 contains a dashboard high beam indicator 115, which in essence is a bulb and which is normally fed positive voltage when the vehicle's headlight high beams come on through high beam dash circuit connector 111. The other side of dashboard high beam indicator 115 is connected to vehicle chassis ground 25. When external connector 112 is utilized to connect high beam circuit connector/input 109 to high beam dash circuit connector 111, the module 22 functions to utilize vehicle's high beam operation to work simultaneously with the DRL/fog module's nighttime "on" operation, as described above and shown in FIG. 5.

Figure 7:
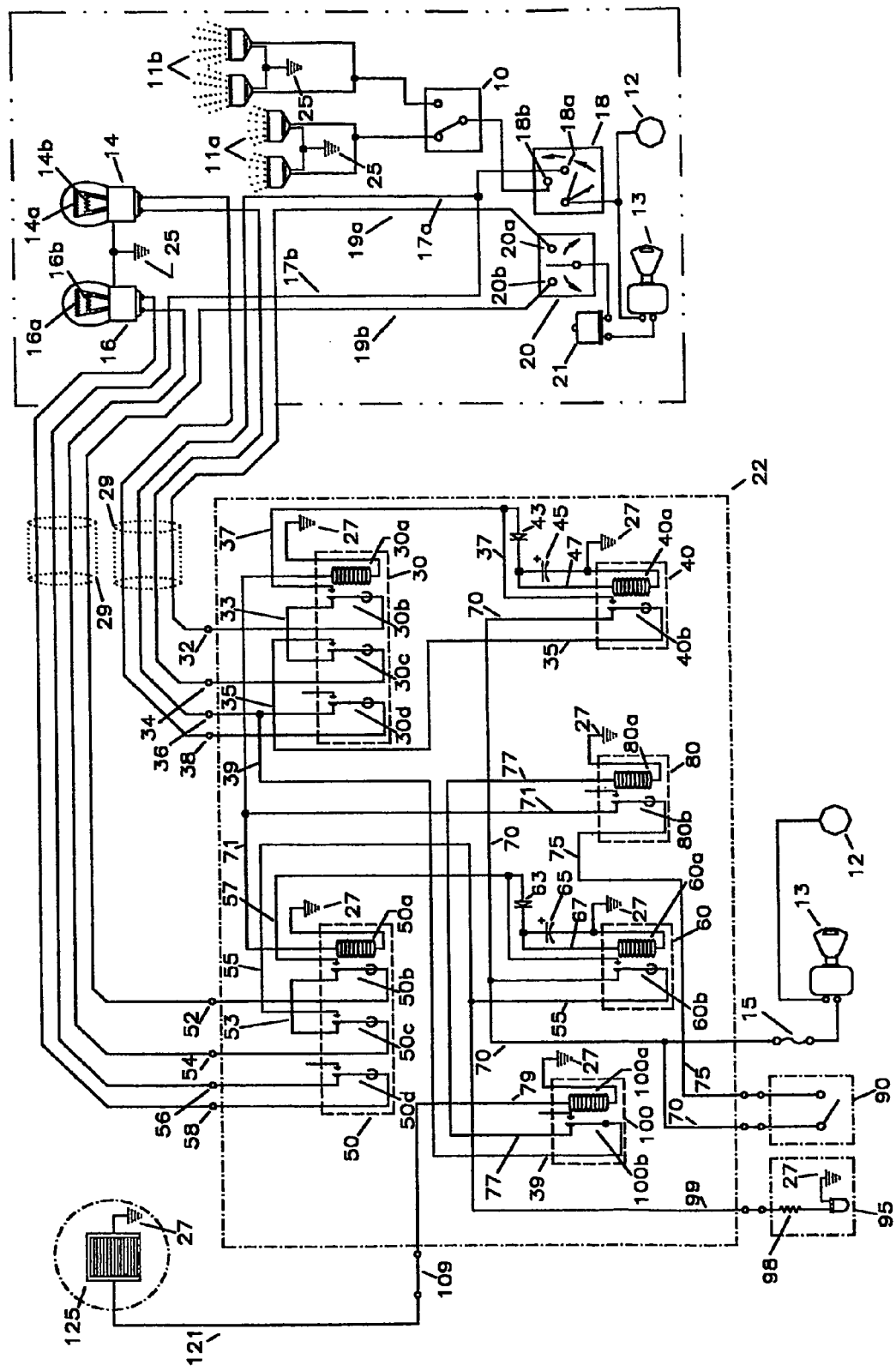
FIG. 7 is a schematic drawing of another functional application of same expansion feature built into the daytime running light module of the present invention.

In some states it is now law that school buses must drive with their headlights on during the day for safety. Yet daytime running light guidelines require that DRL devices switch off at night, specifically when the headlights or parking lights come on, to keep excessive glare from affecting other drivers at night. FIG. 7 shows the same basic module 22 illustrated in FIG. 6 with what is often referred to as a photoelectric eye 125. The photoelectric eye 125 is utilized to allow the module 22 to operate in the daytime on such school buses, aligning the present invention with the spirit and intent of the DRL laws. Such photoelectric eye 125, installed in a vehicle (such as a school bus) where the device has significant access to daylight, such as on the dashboard. The photoelectric eye 125 can be as basic as a solar panel that has 12-volt output at around 200 milliamps or as complicated as a device with its own power supply and having a 12-volt switched output. The eye 125 would be connected to high beam circuit connector/input 109 via external circuit connector 121. The other terminal of photoelectric eye 125 is connected to vehicle chassis ground 27. Sunlight hitting such device would trigger the high beam/auxiliary operation switch 100, again shown built into the module 22, to break the parking light signal that causes nighttime automatic override switch 80 to function. The coil 100*a* of high beam/auxiliary operation switch 100 needs approximately 0.15 amps, or 150 milliamps from photoelectric eye 125 to keep same switch latched open, which in turn breaks the connection between parking light input voltage via circuit connector 39 and the electromagnetic coil 80*a* of nighttime automatic override switch 80. This would allow the module to operate while the headlights of same vehicle were on during daylight hours, but would also allow the module 22 to return to a nighttime override condition when the photoelectric eye 125 could no longer 'sense' visible daylight present, in the form of sunlight.

Figure 8:
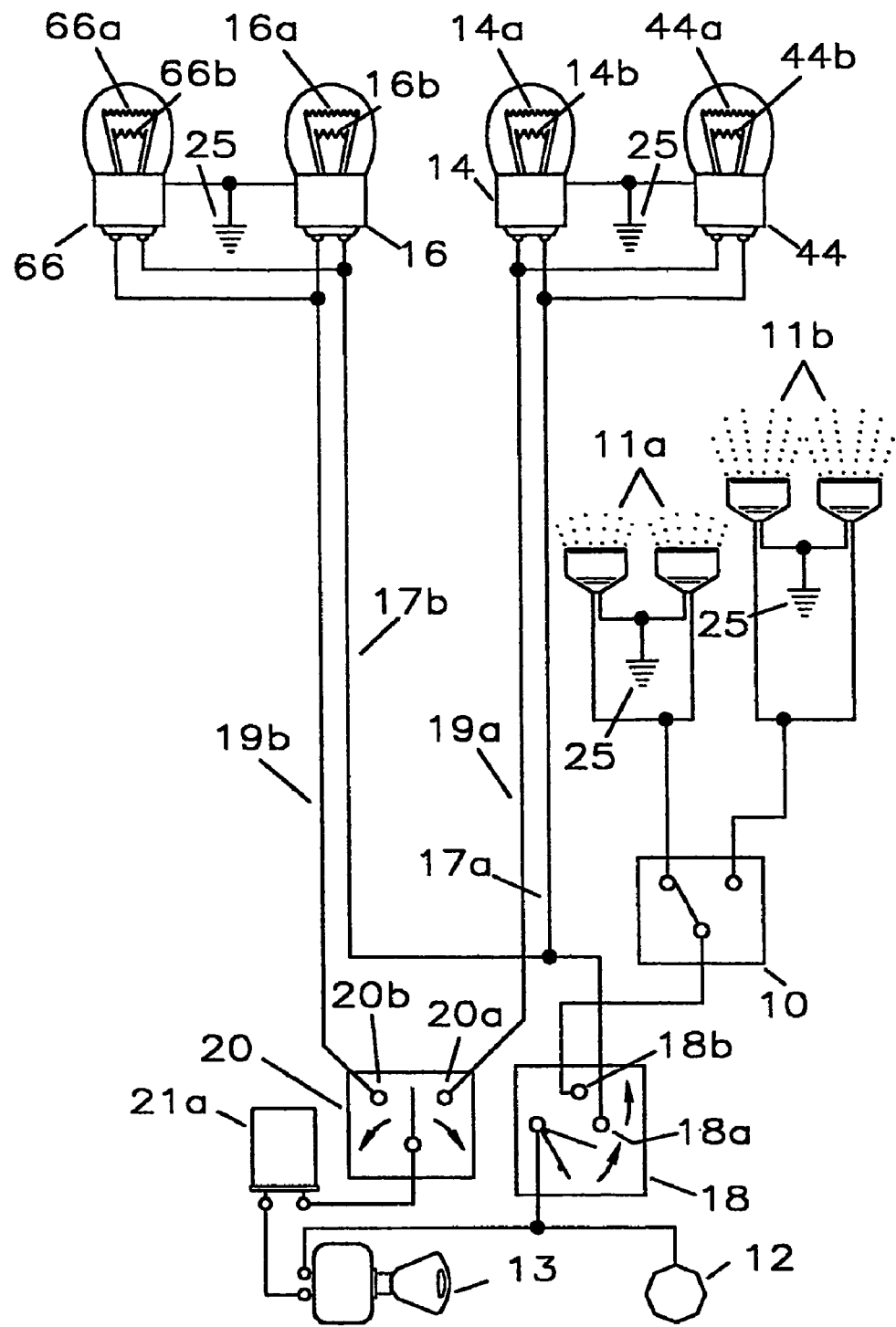
FIG. 8 is a schematic drawing of a connection of the front vehicular lights of some domestic luxury vehicles of the prior art.

Vehicle makers have the flexibility to accent the styling on vehicles and change the standard or typical front parking/turn signal lighting arrangement, usually to give the vehicle in question a more luxurious or unique look. Another parking light/turn light configuration is shown in FIG. 8 and can be found in some domestic luxury vehicles, and/or even in import or domestic vehicles that are not necessarily luxury vehicles, but where the styling of the front lighting system is emphasized by using four dual filament bulbs, two per side. Such a system, which might be referred to as a 'quad' front signal bulb system, is designed where two dual filament bulbs are utilized for each side of the front of the vehicle. Looking at FIG. 8, bulbs 14 and 44 are wired together in parallel for the front right side of the vehicle by the factory, as shown. Bulbs 16 and 66 are wired similarly for the front left side of the vehicle. The negative connectors of lights 14, 44, 16, 66 are grounded at vehicle chassis ground 25. Note that this type of system always uses a specially designed flasher 21*a* that is designed specifically for the additional current loads presented by the addition of bulbs 44 and 66. This vehicle requires a factory turn signal bulb out indication flasher 21*a* that 'senses' for three bulbs operational on the right side of the vehicle (two bulbs in the front right [14 and 44, FIG. 8], and one bulb in the rear right [not shown]), and three operational turn signal bulbs on the left side of the vehicle (two bulbs in the front left [16 and 66, FIG. 8], and one bulb in the rear left [not shown]). This 'sensing' monitors for bulb burn out with respect to any one of the three bulbs on either given side, and then functions to alert the vehicle operator of such an event.

Figure 9:
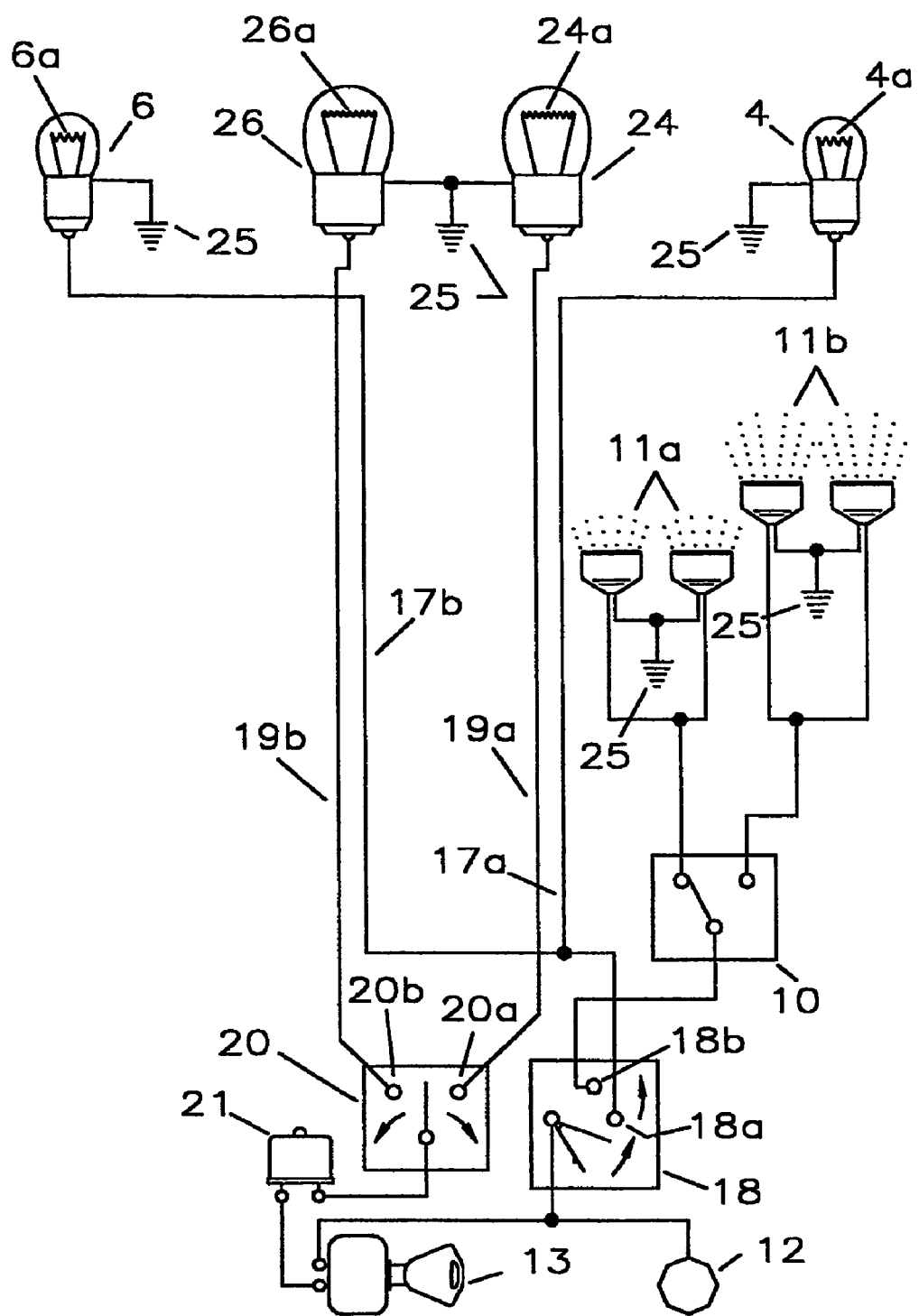
FIG. 9 is a schematic drawing of a connection of the front vehicular lights of some conventional import vehicles of the prior art.

For years, many vehicles imported into the U.S. have utilized a different front parking light/turn light configuration altogether, which might be referred to as a 'split' parking light/turn signal light system, such as that shown in FIG. 9. Only until recently have some import vehicle manufacturers begun to switch over to what is considered conventional domestic front parking/turn signal lighting configurations utilizing dual filament bulbs, but even some newer makes of import vehicles still use this type of split design configuration. The older styled import vehicles in question, wired as shown in FIG. 9, use separate parking light bulbs 4, 6 in separate lamp housings, usually beside each headlight, containing dimmer bulb filaments 4*a*, 6*a*, where these bulbs only job is parking light functions. Such vehicles then utilize additional but separate turn signal bulbs 24, 26 in separate lamp housings, typically in the front bumper area, containing brighter filaments 24*a*, 26*a*, with these bulbs possessing a brightness equal to the brightest filament in a typical dual filament bulb device. Hence, the turn signal bulbs and parking light bulbs do not reside inside the same lamp housing but are 'split' apart from each other, each residing in its own separate lamp housing. Vehicles with this split lighting type of arrangement typically utilize the parking light bulbs 4, 6 to be forward projecting parking lights for oncoming traffic, and in many cases these lights are simultaneously utilized to be the front lighted amber side marker lights, for warning any traffic approaching same vehicle from the side. More will be discussed about this further herein. Note that approximately 80% or more of the vehicles in the U.S. are equipped with a dual filament front bulb system, while 20% or less are designed with a split bulb system. Also note that there are approximately 180 to 190 million vehicles on the U.S. roads today.

Figure 10:
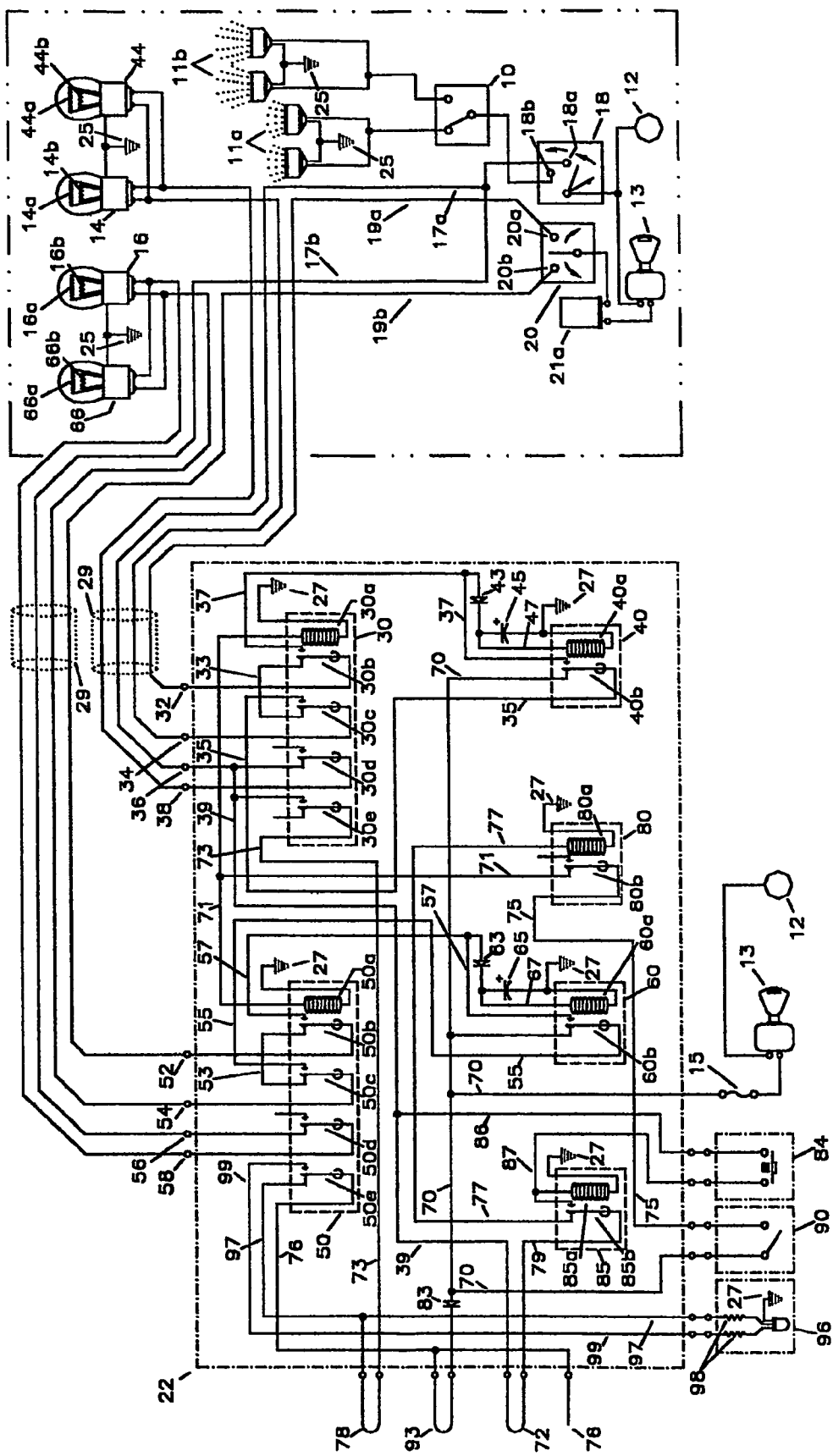
FIG. 10 is a schematic drawing of an embodiment of the dual function daytime running light/fog light module of the present invention integrated into certain types of domestic luxury vehicles.

FIG. 10 shows the DRL module 22 integrated into a 'quad' front bulb vehicle arrangement as discussed in FIG. 8. Additionally, if the module 22 shown in FIG. 10 for such a vehicle is to be offered as a combination or dual function product, such as a DRL module in the daytime, combined with a fog light module at night, then U.S. daytime running light law currently requires that the daytime running light portion of the current invention must turn "off" when either position of the parking/headlight switch 18 is activated to an "on" position. If the present invention is now to be utilized as a nighttime fog/bad weather/emergency lighting device, then a specific logic of operation has been designed into the operation of the module 22 to insure it conforms to the previously mentioned guidelines. First and foremost, the module 22 must shut off 100% of the time when the parking/headlights come on. Afterwards, any actuation of the module 22 into nighttime fog light operation must require some sort of manual operation, via a push button, by the vehicle operator to turn this secondary night operational function "on", but only after the parking/headlights are turned "on". This function now latches "on", for as long as the headlight/parking lights are activated, and turns "off" when the headlight/parking lights are deactivated or turned "off". Then once the parking/headlights are turned "off", the night operating system's latching capability will then 'reset', to essentially prepare the DRL's operating system to again turn "off" the next time the parking/headlights turn on. Stated another way, the dual function device or module 22 with optional night functions should shut off every time the parking lights or parking/headlights come on, and this is to happen without exception. Any night functioning is then push button activated via a one-time event to latch on and stay on, and such night operation circuitry then resets when the parking lights switch off. Note that no "night" functioning can occur with the vehicle's headlights turned "off", as this parking light system voltage is the source for the latching voltage used for the latching night function. Since fog lighting is under state jurisdiction, then the device can potentially be turned on in fog light mode after the DRL mode of the module 22 has turned off, provided the fog light mode on the particular vehicle complies with individual state laws, where such regulations are structured around lamp-vehicle placement and beam aiming. This secondary nighttime fog light functioning can always be utilized for 'off road' situations, where no requirements of any kind exist, federal or state. The next embodiment of the present invention shows such an adaptation of a dual functioning device (both DRL/night fog lighting) as described, specifically for a front 'quad' bulb vehicle turn signal lighting system as shown in FIG. 8.

Continuing to view FIG. 10, a schematic diagram of one embodiment of the present invention of the DRL module 22 with dual functioning DRL/fog light operation is illustrated. In the embodiment shown in FIG. 10, the first and second light intensity switches 30, 50 are four pole, double throw switches such that is able to make and/or break potentially four connections between the front vehicular lights 14, 16, 44, 66, both the turn signal connectors 20*a*, 20*b* of the directional turn signal switch 20, and the parking light connectors 17*a*, 17*b* of headlight switch 18. In the embodiment of the present invention shown, the first and second intensity switches 30, 50 continue to control connections between front vehicular bright filaments 14*a*, 16*a*, 44*a*, 66*a* and both turn signal switch 20 and ignition keyed power source 13, as outlined earlier. The first and second intensity switches 30, 50 continue to control connections between the front vehicular dimmer filaments 14*b*, 16*b*, 44*b*, 66*b* and parking/headlight switch 18, as previously described and shown in FIG. 4. Additionally, the first and second intensity light switches 30, 50 now also provide for additional operational indication switching to allow the vehicle operator to distinguish between daytime "on" operation, nighttime "on" operation, and module "off" indication.

As previously described, the additional heat from the parking light filament of dual bulbs should be controlled at night when both filaments can potentially be powered. From an output view, these lamps generate light with a byproduct of heat. Light output from the parking lights at night is not an issue for the dual bulb filament system, since the approximately 3 times brighter turn signal filaments, when continuously powered, effectively make the dimmer parking light filaments inoperative by eclipsing the parking lights with the much greater light output of the brighter turn signal filaments, keeping in mind that they are both housed inside the same bulb and same bulb housing in the dual bulb configuration vehicle. The parking light heat is controlled, as previously described, by contact sets 30d, 50d of first and second intensity light switches 30, 50 in night mode switch the parking light filaments off when the turn signal filaments are powered continuously. Logically, the night switching allows either the brighter or dimmer filaments to be energized at night, but never allowing both filaments or sets of filaments to be energized at the same time. This function is only needed if the module 22 is to have night operation: when the device is utilized as a DRL module only, then there is no need for this heat limiting function since the module 22 automatically turns "off" when the parking lights come "on". If this module 22 in FIG. 10 were to be utilized only as a DRL module without night fog light options, then the wiring at directional bulbs 14, 16, 44, 66 would change as not to control the parking light dimmer filaments 14b, 16b, 44b, and 66b, but to simply capture signal input from the parking light system itself for night override operation. In such a specific application, parking light wiring would be optionally wired at the bulbs similarly to the 'at the bulb' parking light wiring as shown in FIG. 2. Also, the night operation switching would no longer be necessary.

Still looking at FIG. 10, the module 22 automatically turns off when the parking lights come on as previously described before, and this occurs as parking light voltage (or signal) reaches the electromagnetic coil 80a of automatic override switch 80 from the parking light/headlight switch 18. In the embodiment shown in FIG. 10, night operation latching switch 85, such as a relay, as well as night operation momentary switch 84, such as a push button switch, are introduced into the present invention. The module 22, when operational during daytime hours, always turns "off" when the parking/headlight switch 18 is actuated, and this happens in the following manner: parking light voltage (or signal) is transferred through parking light connector 17a, parking light input connector 36, then to circuit connector/output 39, then through night operation light loop 72, then to circuit connector/input 79, through the "normally closed" contact set 85b of night operation latching switch 85, then to circuit connector 77, and then finally to coil 80a of automatic override switch 80. Activation of the parking light/headlight switch 18 will energize the coil 80a of the automatic override switch 80, as long as both night operation loop 72 is intact and night operational latching switch 85 is at rest (or non-energized).

Night operation of the module 22 can not automatically or by default occur in the present invention shown in FIG. 10, because the module 22 is always switched "off" instantly by the activation of either position of the parking/headlight switch 18, as described above. The vehicle operator must now perform some action to initialize the night function of the device, and this optional nighttime operational mode can only occur when two things happen: when the operator chooses to actuate the night operation momentary switch 84, and then only when the parking lights are on. Such night operation momentary switch 84 is a spring loaded, momentary single pole, single throw push button switch, and receives input voltage in the form of parking light signal coming into the module 22 from circuit connector/output 39 via circuit connector 86. Output from night operation momentary switch 84 connects to the electromagnetic coil 85a and the "normally closed" contact of contact set 85b of night operational latching switch 85 via circuit connector 87, but only when night operation momentary switch 84 is pushed momentarily, as a one time event. The other side of coil 85a is connected to ground 27.

When nighttime operation of the module 22 in FIG. 10 has the potential to occur, the module 22 has power from the ignition key switch 13, but is deactivated because of nighttime operation due to the automatic override switch 80 being energized as the parking lights or headlights are turned on. Automatic override switch 80 controls positive coil voltage between the coils of first and second intensity light switches 30, 50 and power coming from main module power switch 90. Note that the job of automatic override switch 80 is to always override module operation at night, without fail. Suppose then the vehicle operator encounters a heavy fog or rain at night, and the vehicle operator then decides to activate the nighttime operation mode of the module 22 by pushing the night operation momentary switch 84 while the vehicle's parking/headlights are activated. Parking light voltage originating from parking light switch 18 passes through night operation momentary switch 84 and momentarily energizes the electromagnetic coil 85a of nighttime operation latching switch 85. The energizing of coil 85a causes the switched contact set 85b of night operation latching switch 85 to break its "normally closed" connection in its relaxed state and to make its "normally open" energized connection in its energized state. When the connection of this contact set 85b is broken, then the automatic override switch 80 will relax or turn "off". This allows first and second intensity light switches 30, 50 to reenergize, causing the module 22 to turn "on" again. Also, since parking light voltage from the "common" contact of contact set 85b is now fed to the electromagnetic coil 85a of nighttime operation latching switch 85 via the "normally open" contact of contact set 85b through circuit connector 87, this nighttime operation latching switch 85 (or relay) effectively latches "on" for as long as the parking light voltage from parking/headlight switch 18 is present. This means that the module 22, once activated by the night operation momentary switch 84, will stay in a nighttime operational mode as long as the parking lights are on, because the nighttime operation latching switch 85 remains "latched on" independent of what is happening with the night operation momentary switch 84, because of latching voltage originating from parking/headlight switch 18. Once the parking lights are turned off, by turning off parking/headlight switch 18, then the nighttime operation latching switch 85 relaxes and switches "off", having lost the parking light voltage delivered through the "normally open" contact set 85b of nighttime operation latching switch 85 and circuit connector 87 that allowed it to previously remain "latched on". At any time during the nighttime operational mode of this embodiment that the operator wishes to turn the module 22 "off", they may do so by turning the main module power switch 90 "off" or by turning the parking/headlight switch 18 "off". If the module 22, in nighttime operation mode as activated by the night operation momentary switch 84, is turned "off" by the main module power switch 90, then the module 22 itself is "off" during both nighttime and daytime vehicle operation, even though the nighttime operation latching switch 85 remains latched on while parking light voltage is available. If the module 22, in nighttime operational mode as activated by the night operation momentary switch 84, is turned "off" by turning the vehicle's parking/headlight switch 18 "off" (even if only for an instant), then the module 22 will reset to only be "on" when the parking/headlight switch is turned "off", and the module 22 will again turn "off" when the parking/headlight switch 18 is turned "on". Stated another way, the nighttime module operation can be initiated by the operator using the night operation momentary switch 84 as a one time event as long as the parking lights are on, but should the operator turn the parking lights off at anytime, even for just an instant, the module 22 will again be defeated when the parking lights come back on. This means that for the operator to use the nighttime function of the dual function DRL/fog light module 22, a conscious effort by the operator must happen to turn the night function "on" by pushing the night operation momentary switch 84 after every instance of the parking lights first being turned "off" and then being turned back "on". In this way the turn signal lamps will not cause unnecessary nighttime glare to some other passing motorist unless the vehicle operator so physically chooses to actuate a separate switch and operate these lights during nighttime hours. The most appropriate use of these lights might be for off road, bad weather, or emergency use only, and should be held in reserve until needed and used sparingly because of potential glare as seen by other drivers.

In the present embodiment as shown in FIG. 10 there is a need to give more detailed feedback to the vehicle operator concerning what operational state the dual function DRL/fog light module 22 might be operating in at any given time. This present invention shown in FIG. 10 now includes a multiple function operational indicator 96, such as a two input, three-color LED. The operational indicator 96 provides feedback or notice to the user concerning the operational state of the DRL module 22 at all times. The operational indicator 96 includes two dropping resistors 98, and has a negative terminal that is connected to ground 27. One of these resistors 98 is connected in-line with the first input of the indicator 96 and the circuit connector/output 99, thus causing the LED to illuminate green when 12 volts is present at circuit connector/output 99. The other resistor 98 is connected in-line with the second input of the LED and circuit connector/output 97, thus causing the LED to illuminate red when 12 volts is present at circuit connector/output 97. These resistors 98 reduce or "drop" the 12-volt output from the module circuit connector/outputs 99, 97 to about 2 volts, such as is required by the LED.

When the operational indicator 96 is illuminated green, the DRL module 22 is "on". This occurs only if both the vehicle's ignition key switch 13 and the module 22 itself are both "on". The ensuing connection is from ignition key switch 13, through module fuse 15, to main power circuit connector 70, then through feedback prevention diode 83, through expandability loop 93, through circuit connector/output 76, through the "normally open" contacts of contact set 50e of energized light intensity switch 50, then through circuit connector/output 99, then to resistor 98 and on to operational indicator 96. Note that second intensity light switch 50 must be energized to allow the circuit connector/output 99 to produce an output. Such can occur only if the module 22 is "on", as the completed circuit supplying voltage to circuit connector/output 99 is disconnected at contact set 50e of light intensity switch 50 when the module 22 is "off". Also, feedback prevention diode 83 acts as a one-way current valve to keep the parking light voltage from feeding back into the internal main ignition keyed power circuitry of the module 22, where the potential for this feedback to occur happens when the vehicle itself is turned off before the vehicle's headlights are turned off.

When the operational indicator 96 is illuminated orange, then the DRL module 22 is uniquely "on" while the parking lights (and/or headlights) are also turned on. This orange LED output represents the secondary manually activated nighttime fog light function of the module 22, and is accomplished by manually pushing the night operation momentary switch 84 while the parking light circuit is energized, as previously described. Orange illumination from the LED only occurs when both the green and red illumination of the operational indicator 96 are energized simultaneously. When the module 22 is in this mode, one half of the dual LED's input voltage itself is supplied from the following connection; from ignition key switch 13 and module fuse 15, to main power circuit connector 70, through feedback prevention diode 83, then through expandability loop 93, through circuit connector/output 76, through the "normally open" contacts of contact set 50e of energized light intensity switch 50, then through circuit connector/output 99, then to resistor 98 and on to operational indicator 96, producing the green illumination. At the same time, parking light voltage enters the module 22 at parking light input connector 36, through circuit connector 39, through the "normally open" contacts of contact set 30e of energized light intensity switch 30, then through circuit connector 73, through expandability loop 78, then to circuit connector/output 97, then to resistor 98 and on to operational indicator 96, producing the red illumination. The combined colors of red and green illumination, energized at the same time, yield the orange LED illumination that indicates the nighttime fog light "on" state of the module 22. Note that both first and second intensity light switches 30 and 50 must be energized, and the parking lights must also be on to allow the circuit connector/outputs 99 and 98 to be energized at the same time. Such a situation occurs only if the module 22 is "on" and the parking lights are "on" simultaneously, as only occurs when night operation momentary switch 84 has been actuated to cause nighttime module operation, as described previously.

When the operational indicator 96 is illuminated red, then the DRL module 22 is "off". This occurs in two cases: when the main power switch 90 is switched off, or when the automatic night override 80 switch has automatically turned the module 22 "off" because the parking and/or headlights lights are turned "on". In either case, the operational indicator 96 receives power by connecting from ignition key switch 13 and through module fuse 15, to main power circuit connector 70, through feedback prevention diode 83, then through expandability loop 93, through circuit connector/output 76, through the "normally closed" contacts of contact set 50e of light intensity switch 50, then through circuit connector/output 97, then to resistor 98 and on to operational indicator 96, producing the red illumination. Note that second intensity light switch 50 must be "off" to allow the circuit connector/output 97 to produce such an output. Such can occur only if the module 22 is "off" and the ignition key is "on".

Finally, if the operational indicator 96 has no illumination at all, then the DRL module 22 has: lost a connection to the ignition key switch 13, had the ignition key switch 13 to be been turned off, blown module fuse 15, or lost the ground connection 27. Since the illumination states of the operational indicator 96 are accomplished using switched contact logical feedback from one or both of contact sets 30e, 50e on each of the intensity switches 30, 50, it can be said that the operational indicator 96 uses active feedback to inform the vehicle operator as to the operating state of the module 22 at any given moment.

Figure 11:
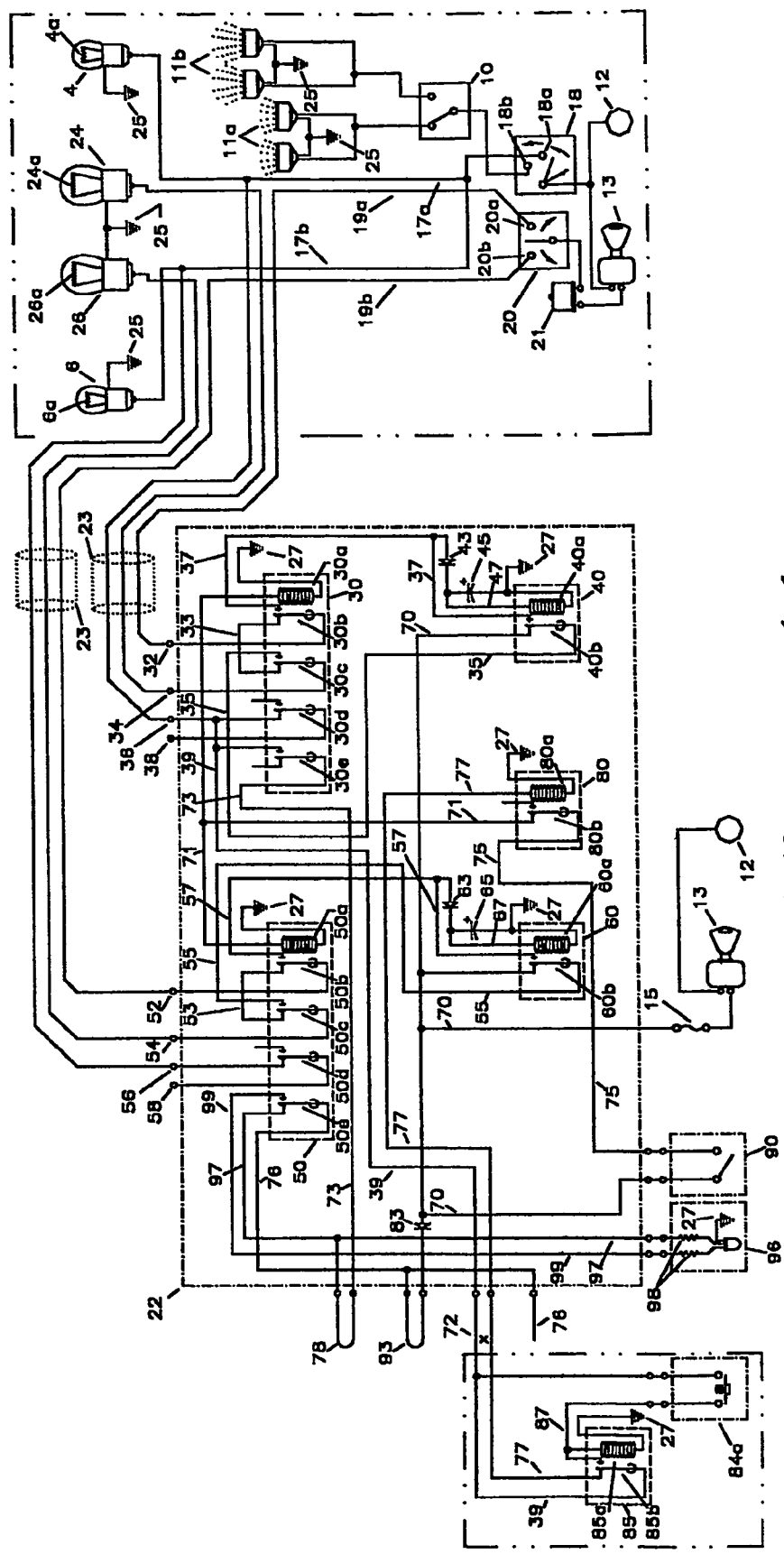
FIG. 11 is a schematic drawing of an embodiment of the dual function daytime running light/fog light module of the present invention integrated into a some conventional import vehicles.

FIG. 11 shows the combination DRL/fog light module 22 integrated into an import vehicle with a "split" parking light/ turn signal light system, such as the import "split" system shown in FIG. 9. In this configuration, there is no need for the module 22 to control the parking light bulbs 4, 6, or to more specifically control the heat that is generated by these bulbs 4, 6 while the module 22 is energized at night, as in the case with a dual filament conventional domestic vehicle/system. This is because these bulbs 4, 6 reside in separate lamp housings, such that are independent of the turn signal lamps and the turn signal lamp housings. In the case of when such front parking light bulbs 4, 6 are also designed to be the lighted front side marker lights for traffic approaching the vehicle from the side, these lights should not ever be turned off by the module 22. Since U.S. law has required lighted side markers on vehicles for safety reasons since 1968, interrupting these lights by the normal module's dual filament bulb/vehicle application is undesirable, and a different configuration to correct for this is shown in FIG. 11.

Looking at FIG. 11, the parking light circuit connector outputs 38, 58 of the module 22 have no connection to the import vehicle's lighting system. Because an import vehicle has front parking lights that are independent of the front turn signal lights, there is no need for the module 22 to process the front parking lights. Therefore, the outputs from the module 22 to control or output to the parking lights is not applicable. As referred to earlier, the only reason to 'process' or control the parking light filaments in the dual bulb system is to keep heat inside lamp housings to a minimum, at night when both the module's fog light night operation and parking light operation could occur simultaneously.

In the application shown in FIG. 11, the connections from the front lights 4, 24, 6, 26 and the light intensity switches 30, 50, of the DRL module 22 itself are made using three-strand, 18-gauge shielded cables 23. Similar to the connections shown in FIG. 2, the DRL module 22 in FIG. 11 is connected to the parking/headlight switch 18 via a parking light input connector 36 and parking light connector 17a, and it is also connected to the parking light signal via a parallel electrical connection at parking light connector 17a. The first light intensity switch 30 is connected to the right turn connector 20a of the turn signal switch 20 through turn signal input connector 32 and turn signal connector 19a, and first light intensity switch 30 is also connected to the first bright filament 24a through turn signal output connector 34.

Again similar to connections shown in FIG. 2, the DRL module 22 is also connected to the parking/headlight switch 18 via a parking light input connector 56 and parking light connector 17b, and it is also connected to the parking light signal via a parallel electrical connection at parking light connector 17b. The second light intensity switch 50 is connected to the left turn connector 20b of the turn signal switch 20 through turn signal input connector 52 and turn signal connector 19b, and second light intensity switch 50 is also connected to the second bright filament 26a through turn signal output connector 54. Connections in this manner allow for the parking light lamps for this type of import vehicle to retain their original functionality, independent of the operational DRL/fog light module shown in FIG. 11.

Additionally shown in FIG. 11, and in contrast to the embodiment shown in FIG. 10, is the optional nighttime operation latching switch 85 that is no longer built into the module 22 itself. Rather, the switch 85 and the secondary night operation momentary switch 84a are installed external to or outside of the base module 22, potentially as an add-on kit to the base model DRL only module. This allows the possibility of a vehicle owner to buy the economy version daytime module 22, and upgrade to night operation later with the now separately installed additions of optional nighttime operation latching switch 85 and the mating secondary night operation momentary switch 84a. Night operation loop 72 is cut, and night operation external components connect directly to both ends of the now cut loop, with an additional connection to ground. In this case, the night operation of the module 22 is identical to that described previously. All other connections are the same as previously described. As long as the base model module 22 does not have nighttime operation latching switch 85 built in, but has a night operation loop 72, it can be upgraded with this optional night kit as an add-on accessory.

Figure 12:
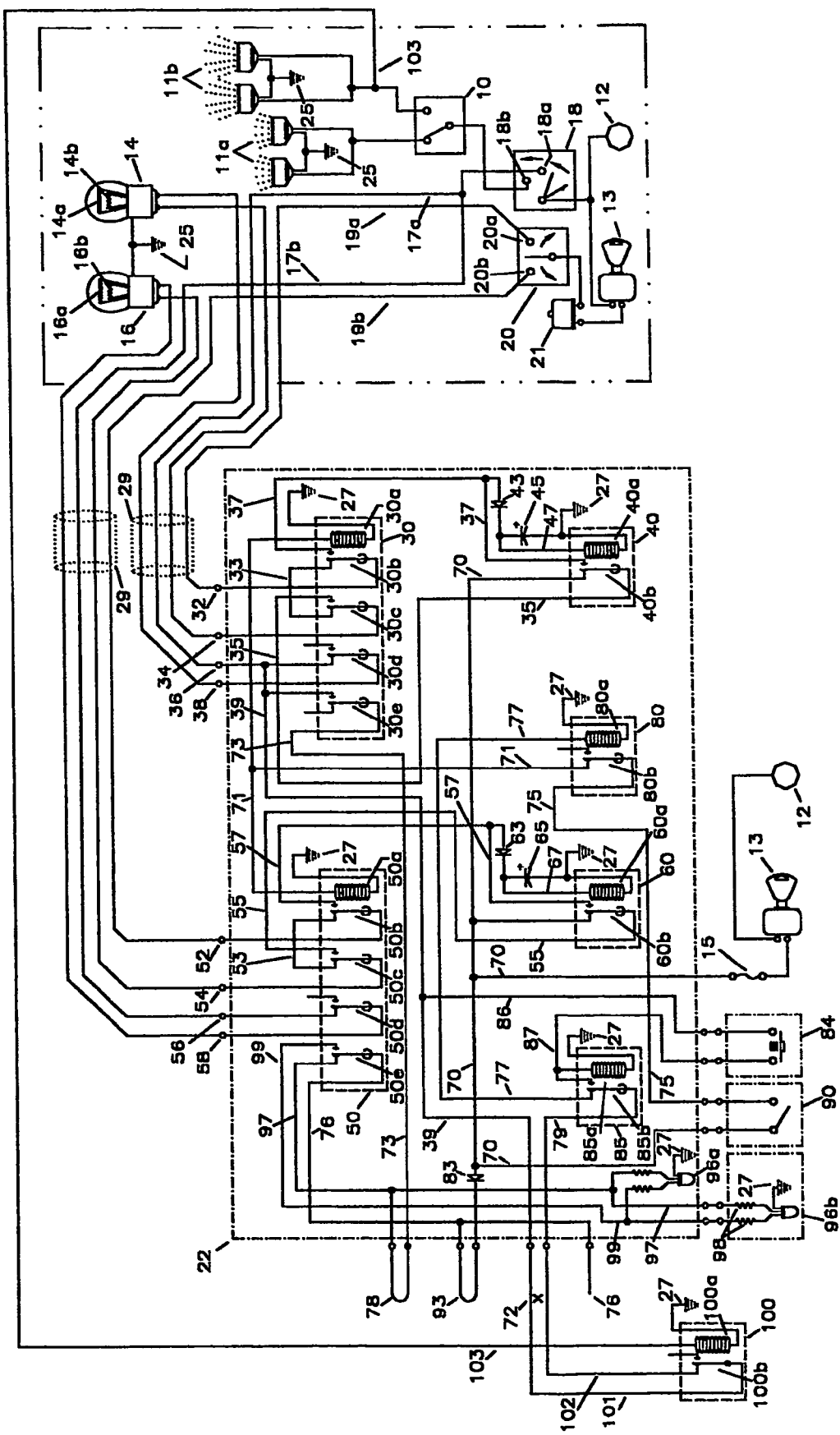
FIG. 12 is a schematic drawing of an embodiment of an expansion feature added to the dual function daytime running light/fog light module of the present invention.

In FIG. 12, the combination DRL/fog light module is shown as integrated into a standard dual filament two front lamp vehicle system, such as shown in the prior art FIG. 1. The application described below again controls parking light heat for nighttime operation, as previously described. This embodiment contains a built-in dual LED operational indicator 96a, similar as to the single built-in operational indicator 95a in FIG. 3; and also contains the optional high beam/auxiliary operation switch 100, such as formerly described and shown in FIG. 5. Night operation loop 72 is cut, and the high beam/auxiliary operation switch 100 is externally integrated into the present invention/system to control simultaneous headlight high beam/module "on" operation, as previously described. When this feature is now combined with the optional nighttime operation latching switch 85 as shown, the result is such that now flashing the headlight high beams on and off again will turn off the "latched" nighttime fog light operational mode. Since the parking light voltage supplied from parking light input connector 36 to nighttime operation latching switch 85 now passes through high beam/auxiliary operation switch 100, and any initiation of high beams causes switching of high beam/auxiliary operation switch 100. Thus, switching the vehicle's high beams on while the module 22 is in optional night operation mode will cause nighttime operation latching switch 85 to lose its "latching" voltage and relax, and this will in turn return the module 22 to daytime only operational mode when the vehicle's headlight high beams are subsequently switched off.

Figure 13:
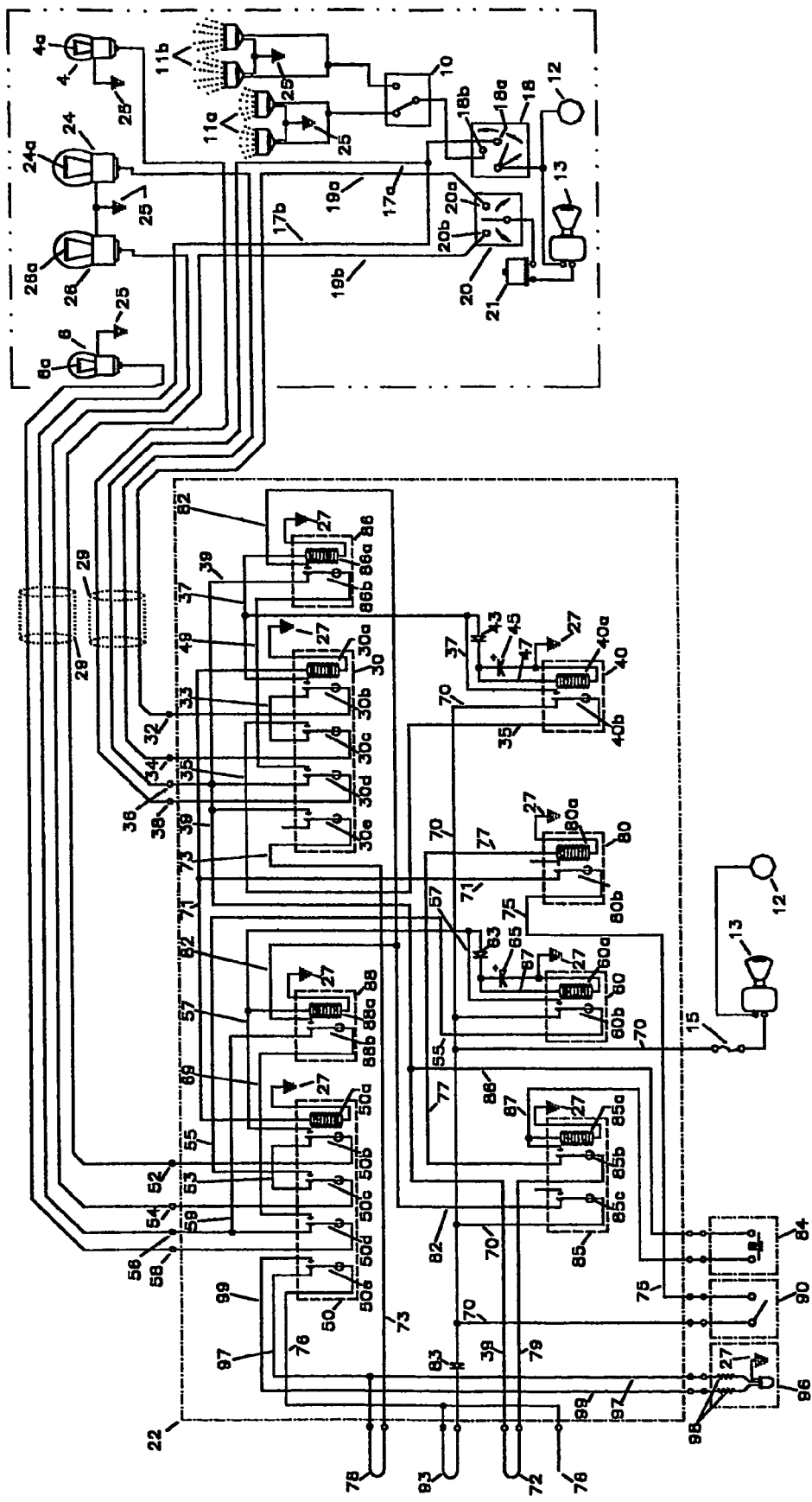
FIG. 13 is a schematic drawing of an embodiment of the dual function daytime running light/fog light module with enhanced turn signal feature of the present invention integrated into a conventional import vehicle.

In FIG. 13, the present invention DRL/fog light module 22 with turn signal enhancement is shown as integrated into an import split parking/turn signal light system, such as found in prior art FIG. 9. This current embodiment contains additional features that enhance the vehicle's existing front parking lights, causing them to function as auxiliary turn signals, in addition to and complimenting the regular vehicle turn signals, during both day and night vehicle operation, provided the module 22 is "on". At any time the module 22 is "off", either intentionally as manually controlled by the vehicle operator, or automatically when the vehicle's parking/headlights are turned on, the front parking lights revert back to their normal operation. It is very important that this configuration never defeats the regular front parking light operation or safety aspect thereof, but only enhances their operation to bring added functionality to these lights and added vehicle safety as a result.

Looking at FIG. 13, connections with the front parking and turn signal lights are again such that all turn signal and parking light inputs and outputs to the module 22 are utilized. The first and second intensity switches 30, 50 continue to control connections between first and second bright filaments 24a, 26a and both turn signal switch 20 and ignition keyed power source 13, as outlined earlier. The first and second intensity switches 30, 50 now also control connections between first and second dimmer filaments 4a, 6a and parking/headlight switch 18. It is important to keep in mind that first and second dimmer filaments 4a, 6a often serve double duty, and in this case these are not only front parking lights but also front side marker parking lights. This is in contrast to FIG. 11, where the standard wiring for an import split system does not control the front parking lights. All connections from the front lights 4, 24, 6, 26 and the light intensity switches 30, 50 of the DRL/fog light module 22 with enhanced parking lights are made using twin four-strand, 18-gauge shielded cables 29. Again, the first and second light intensity switches 30, 50 are four pole, double throw switches such that is able to make and/or break potentially four connections between the first and second vehicular lights 4, 24, 6, 26 and both the turn signal connectors 20a, 20b of the directional turn signal switch 20 as well as the parking light connectors 17a, 17b of headlight switch 18.

The standard turn signal functioning and module 22 operation concerning turn signal rerouting and bulb out indication described above and shown in FIG. 2 is the same in the present invention shown in FIG. 13. Also, the optional night fog light operation described above and shown in FIG. 5 is also functionally and operationally the same as the invention shown in FIG. 13. Turn signal enhancement changes introduced into the present embodiment include a first enhanced turn signal switch 86, and second enhanced turn signal switch 88. The first and second enhanced turn signal switch 86, 88 are both comprised of a single pole, double throw switch each, such as relays. Also, the night operation latching switch 85 is now changed to a double pole, double throw switch (such as a relay), where in previous representations the same switch was a single pole, double throw switch.

In the embodiment of the present invention shown in FIG. 13, first light intensity switch 30 is connected between the parking/headlight switch 18, via a parking light input connector 36 and parking light connector 17a, and between the first parking light dimmer filament 4a via a parking light output connector 38. When the first light intensity switch 30 is "off", the light intensity switch 30 connects the parking light input connector 36 with the parking light output connector 38 using the "normally closed" switched contact set 30d of light intensity switch 30. As a result, the first light intensity switch 30 in the non-energized state connects the first dimmer light filament 4a to its original parking light connector 17a, which is the normal connection for first dimmer filament 4a if the module 22 were not present, and this parking light operates normally when the vehicle's parking lights are turned on.

When the first intensity light switch 30 is "on", the parking light output connector 38 is connected through the "normally open" switched contact set 30d of energized first light intensity switch 30 and to the "common" contact of first enhanced turn signal switch 86 via circuit connector 49. The "normally closed" contact of contact set 86b of first enhanced turn signal switch 86 is connected to parking light input 36 via circuit connector 39. The "normally open" contact of contact set 86b of first enhanced turn signal switch 86 is connected to the main power circuit connector 70 via both circuit connector 82 and the connection through the "normally closed" contact set 85c of night operation latching switch 85. The electromagnetic coil 86a of first enhanced turn signal switch 86 is connected via circuit connector 37 to the turn signal feed or "signal" that also supplies pulsed signal to previously discussed turn signal rerouting switch 40. This signal comes from turn signal input connector 32 and the "normally open" contact set 30b of now energized first intensity light switch 30, then to circuit connector 37. The other end of electromagnetic coil 86a is connected to ground 27. As a result, when first light intensity switch 30 alone is energized, the first dimmer filament 4a will be constantly off as long as the module 22 is in its daytime operation, as the "normally closed" contact of contact set 86b of first enhanced turn signal switch 86 has no voltage to feed to parking light output connector 38 via circuit connector 49.

When first light intensity switch 30 is energized and the right turn signal is activated at the vehicle's turn signal switch 20, pulsed signal alternately energizes and de-energizes first enhanced turn signal switch 86 through the following connection: turn signal output from terminal 20a of turn signal switch 20 travels to turn signal connector 19a, then into the module 22 to turn signal input connector 32, through the "normally closed" contact set 30b of first intensity light switch 30, and then through circuit connector 37 and to the electromagnetic coil 86a of first enhanced turn signal switch 86. Since voltage exists at the "normally open" contact of contact set 86b of first enhanced turn signal switch 86 via main power circuit connector 70, via circuit connector 82 and through the "normally closed" contact set 85c of night operation latching switch 85b; and since the first enhanced turn signal switch 86 commences to begin switching on and off in a repeating manner due to its coil being pulse activated; then the first dimmer filament 4a which was formerly off now pulses on and off, repeating as a day time 'enhanced' turn signal lamp. Pulsed signal passes out of the module 22 on to parking light bulb 4 via connection through the parking light output connector 38, through the "normally open" switched contact set 30d of energized first light intensity switch 30, via circuit connector 49 and to the "common" contact of first enhanced turn signal switch 86. This new pulsed signal is caused by the subsequent energizing and de-energizing of first enhanced turn signal switch 86 coupled with no voltage present at the "normally closed" contact of contact set 86b, supply voltage present at the "normally open" contact of same contact set, and the "common" contact of said contact set connected to parking light output connector 38 via circuit connector 49, connecting on to first dimmer filament 4a.

Still looking at FIG. 13, when the parking/headlight switch 18 is now energized, the module 22 now automatically switches "off" as it operationally enters nighttime automatic override mode, as previously discussed. Parking light voltage is routed via the first light intensity switch 30 by connecting the parking light input connector 36 with the parking light output connector 38 using the "normally closed" switched contact set 30d of unenergized first light intensity switch 30, which in turn causes the right front parking light 4 to operate "on" as normal. Since the pulsed turn signal voltage that feeds the electromagnetic coil 86a of first enhanced turn signal switch 86 must pass through the "normally open" contact set 30b of energized first intensity switch 30, and since the first intensity switch 30 switches "off" when the parking lights of the vehicle are activated, enhanced daytime turn signal functioning is defeated when the module 22 is turned "off". Note that all parking light and turn signal functions return to normal factory operation when the module 22 is "off", whether by nighttime automatic override module deactivation, or by manually switching the module 22 "off" via main module power switch 90.

During night operation of the DRL/fog light module 22 with turn signal enhancement for split import lighting system, the vehicle operator must actively actuate the night operation momentary switch 84, via the one time event of pressing the momentary push button for an instant, as outlined earlier. When the parking/headlight switch 18 is activated, and then the night operation latching switch 85 is activated and energized "on" via the night operation momentary switch 84, this causes first light intensity switch 30 to energize and the module 22 controlled parking light operation of first dimmer filament 4a occurs. This parking light/night operation of first dimmer filament 4a as controlled by the module 22 is an imperative feature of this system with turn signal enhancement, since the parking lights are on and the module 22 should not defeat front parking light operation at front parking light 4 in the split lighting system with turn signal enhancement application. This lamp is also in many cases utilized as a right front lit side marker in the typical split import front lighting system, hence the reason it should not be turned "off", as when it would otherwise be controlled "off" because of its heat output as in the dual filament module/system integration. It is important to again note this light is connected as normal at night or anytime when the module 22 itself is "off". The module 22 "on" at night connection to first dimmer filament 4a occurs as follows: parking light voltage or 'signal' enters the module 22 through parking light input connector 36, to circuit connector 39, through the "normally closed" contact set 86b of first enhanced turn signal switch 86, to circuit connector 49, through the "normally open" contact set 30d of now energized first intensity switch 30 and to parking light output connector 38.

Furthermore, when the parking/headlight switch 18 is activated, when the night operation latching switch 85 is activated via the night operation momentary switch 84, when the first light intensity switch 30 to energized, and when the right turn signal is activated at the vehicle's turn signal switch 20, a pulsed signal alternately energizes and de-energizes first enhanced turn signal switch 86, causing same switch to switch on, off, and repeat for as long as the turn signal is on. In this night operation mode during turn signal operation, voltage at the "normally closed" and "normally open" contacts of contact set 86b of first enhanced turn signal switch 86 have now swapped positions when compared to daytime enhanced turn signal operation described above. Parking light voltage now exists at the "normally closed" contact of contact set 86b of first enhanced turn signal switch 86 via circuit connector 39 as supplied from circuit connector 39 and parking light input 36. Also, because night operation latching switch 85 is energized and latched "on" in this operational mode, now voltage no longer exists at the "normally open" contact of contact set 86b of first enhanced turn signal switch 86. Voltage that was previously supplied to the "normally open" contact of contact set 86b of first enhanced turn signal switch 86 during daytime module operation via main power circuit connector 70 through the "normally closed" contact set 85c of night operation latching switch 85 to circuit connector 82 is now interrupted, specifically at the contacts 85c of night operation latching switch 85 as same switch is now latched "on". The first dimmer filament 4a now pulses as a nighttime 'enhanced' turn signal lamp via pulsed signal passing out of the module 22 via the parking light output connector 38, from the "normally open" switched contact set 30d of energized first light intensity switch 30, via circuit connector 49 and to the "common" contact of first enhanced turn signal switch 86. This is caused by the subsequent energizing and de-energizing of first enhanced turn signal switch 86 coupled with parking light voltage present at the "normally closed" contact of contact set 86b, no voltage present at the "normally open" contact of same contact set, and the "common" contact of said contact set connected to parking light output connector 38 via circuit connector 49, connecting on to first dimmer filament 4a.

Continuing to look to FIG. 13, second light intensity switch 50 is connected between the parking/headlight switch 18, via a parking light input connector 56 and parking light connector 17b, and between the second parking light dimmer filament 6a via a parking light output connector 58. When the second light intensity switch 50 is "off", the light intensity switch 50 connects the parking light input connector 56 with the parking light output connector 58 using the "normally closed" switched contact set 50d of light intensity switch 50. As a result, the second light intensity switch 50 in the non-energized state connects the second dimmer light filament 6a to its original parking light connector 17b, which is the normal connection for second dimmer filament 6a if the module 22 were not present, and this parking light operates normally when the vehicle's parking lights are turned on.

When the second intensity light switch 50 is "on", the parking light output connector 58 is connected through the "normally open" switched contact set 50d of energized second light intensity switch 50 and to the "common" contact of second enhanced turn signal switch 88 via circuit connector 69. The "normally closed" contact of contact set 88b of second enhanced turn signal switch 88 is connected to parking light input 56 via circuit connector 59. The "normally open" contact of contact set 88b of second enhanced turn signal switch 88 is connected to main power circuit connector 70 via both circuit connector 82 and the connection through the "normally closed" contact set 85c of night operation latching switch 85. The electromagnetic coil 88a of second enhanced turn signal switch 88 is connected via circuit connector 57 to the turn signal feed or "signal" that also supplies previously discussed pulsed signal to turn signal rerouting switch 60. This signal comes from turn signal input connector 52 and the "normally open" contact set 50b of now energized second intensity light switch 50, then to circuit connector 57. The other end of electromagnetic coil 88a is connected to ground 27. As a result, when second light intensity switch 50 alone is energized, the second dimmer filament 6a will be constantly off as long as the module 22 is in its daytime operational state, as the "normally closed" contact of contact set 88b of second enhanced turn signal switch 88 has no voltage to feed to parking light output connector 58 via circuit connector circuit connector 69.

When second light intensity switch 50 is daytime energized and the left turn signal is activated at the vehicle's turn signal switch 20, pulsed signal alternately energizes and de-energizes second enhanced turn signal switch 88 through the following connection: turn signal output from terminal 20b of turn signal switch 20 travels to turn signal connector 19b, then into the module 22 to turn signal input connector 52, through the "normally closed" contact set 50b of second intensity light switch 50, and then through circuit connector 57 and to the electromagnetic coil 88a of second enhanced turn signal switch 88. Since voltage exists at the "normally open" contact of contact set 88b of second enhanced turn signal switch 88 via main power circuit connector 70, via circuit connector 82 and through the "normally closed" contact set 85c of night operation latching switch 85b; and since the second enhanced turn signal switch 88 commences to begin switching on and off in a repeating manner due to its coil being pulse activated; then the second dimmer filament 6a which was formerly off now pulses on and off, repeating as a day time 'enhanced' turn signal lamp. Pulsed signal passes out of the module 22 onto parking light bulb 6 via connection through the parking light output connector 58, through the "normally open" switched contact set 50d of energized second light intensity switch 50, via circuit connector 69 and to the "common" contact of second enhanced turn signal switch 88. This is caused by the subsequent energizing and de-energizing of second enhanced turn signal switch 88 coupled with no voltage present at the "normally closed" contact of contact set 88b, supply voltage present at the "normally open" contact of same contact set, and the "common" contact of said contact set connected to parking light output connector 58 via circuit connector 69, connecting on to second dimmer filament 6a.

Still looking at FIG. 13, when the parking/headlight switch 18 is now energized, the module 22 now automatically switches "off", as it operationally enters nighttime automatic override mode, as has been previously discussed. Parking light voltage is routed via the second light intensity switch 50 connecting the parking light input connector 56 with the parking light output connector 58 using the "normally closed" switched contact set 50d of unenergized second light intensity switch 50, which in turn causes the left front parking light 6 to operate "on" as normal. Since the pulsed turn signal voltage that feeds the electromagnetic coil 88a of second enhanced turn signal switch 88 must pass through the "normally open" contact set 50b of energized second intensity switch 50, and since the second intensity switch 50 switches "off" when the parking lights of the vehicle are activated, enhanced daytime turn signal functioning is defeated when the module 22 is turned "off". Note that all parking light and turn signal functions return to normal factory operation when the module 22 is "off", whether by nighttime automatic override module deactivation, or by manually switching the module 22 "off" via main module power switch 90.

During night operation of the DRL/fog light module with turn signal enhancement for split import lighting, the vehicle operator must actuate the night operation momentary switch 84, as previously described above. When the parking/headlight switch 18 is activated, and then the night operation latching switch 85 is activated and energized "on" via the night operation momentary switch 84, this causes second light intensity switch 50 to energize and the module 22 controlled parking light operation of second dimmer filament 6a occurs. Again, this parking light/night operation of second dimmer filament 6a as controlled by the module 22 is an imperative feature of this system with turn signal enhancement, since the parking lights are on and the module 22 should not defeat front parking light operation at front parking light 6 in the split lighting system with turn signal enhancement application. This lamp is also in many cases is utilized as a left front lit side marker in the typical split import front lighting system, hence the reason it should not be turned "off", as when it would otherwise be controlled "off" because of its heat output as in the dual filament module/system integration. It is important to again note this light is connected as normal at night or anytime when the module 22 itself is "off". The module 22 "on" at night connection to second dimmer filament 6a occurs as follows: parking light voltage or 'signal' enters the module 22 through parking light input connector 56, to circuit connector 59, through the "normally closed" contact set 88b of second enhanced turn signal switch 88, to circuit connector 69, through the "normally open" contact set 50d of energized second intensity switch 50 and to parking light output connector 58. Finally, still considering the parking/headlight switch 18 is activated, when the night operation latching switch 85 is activated via the night operation momentary switch 84 causing second light intensity switch 50 to be energized, and the left turn signal is activated at the vehicle's turn signal switch 20, pulsed signal alternately energizes and de-energizes second enhanced turn signal switch 88, causing same switch to switch on, off, and repeat for as long as the turn signal is on. In this night operation mode during turn signal operation, voltage at the "normally closed" and "normally open" contacts of contact set 88b of second enhanced turn signal switch 88 have now swapped positions when compared to daytime enhanced turn signal operation described above. Parking light voltage now exists at the "normally closed" contact of contact set 88b of second enhanced turn signal switch 88 via circuit connector 59 as supplied from circuit connector 59 and parking light input 56. Also, because of night operation latching switch 85 is energized and latched "on" in this operational mode, now voltage no longer exists at the "normally open" contact of contact set 88b of second enhanced turn signal switch 88. Voltage that was previously supplied to the "normally open" contact of contact set 88b of second enhanced turn signal switch 88 during daytime module operation via main power circuit connector 70 through the "normally closed" contact set 85c of night operation latching switch 85 to circuit connector 82 is now interrupted, specifically at the contacts 85c of night operation latching switch 85 as same switch is now latched "on". The second dimmer filament 6a now pulses as a nighttime 'enhanced' turn signal lamp via pulsed signal passing out of the module 22 via the parking light output connector 58, from the "normally open" switched contact set 50d of energized second light intensity switch 50, via circuit connector 69 and to the "common" contact of second enhanced turn signal switch 88. This is caused by the subsequent energizing and de-energizing of second enhanced turn signal switch 88 coupled with parking light voltage present at the "normally closed" contact of contact set 88b, no voltage present at the "normally open" contact of same contact set, and the "common" contact of said contact set connected to parking light output connector 58 via circuit connector 69, connecting on to second dimmer filament 6a.

To summarize the turn signal enhancement feature found in FIG. 13, it performs turn signal enhancement at the parking lights of the split import lighting system, turning these parking lights into additional turn signals as well as allowing same lights to retain their normal functioning. The turn signal enhancement feature operates optionally in both day and night modes, but only when the module 22 is "on" in either case. During the daytime module DRL operation, parking lights that are normally 'off' now pulse on-off-on, and repeat, as secondary daytime turn signals. During the nighttime module fog light operation, parking lights that are normally 'on' now pulse off-on-off, and repeat, as secondary nighttime turn signals. When the module 22 with turn signal enhancement is "off", whether during day or night vehicular operation, the front parking lights continue to function as designed by the original vehicle manufacturer.

Figure 14:
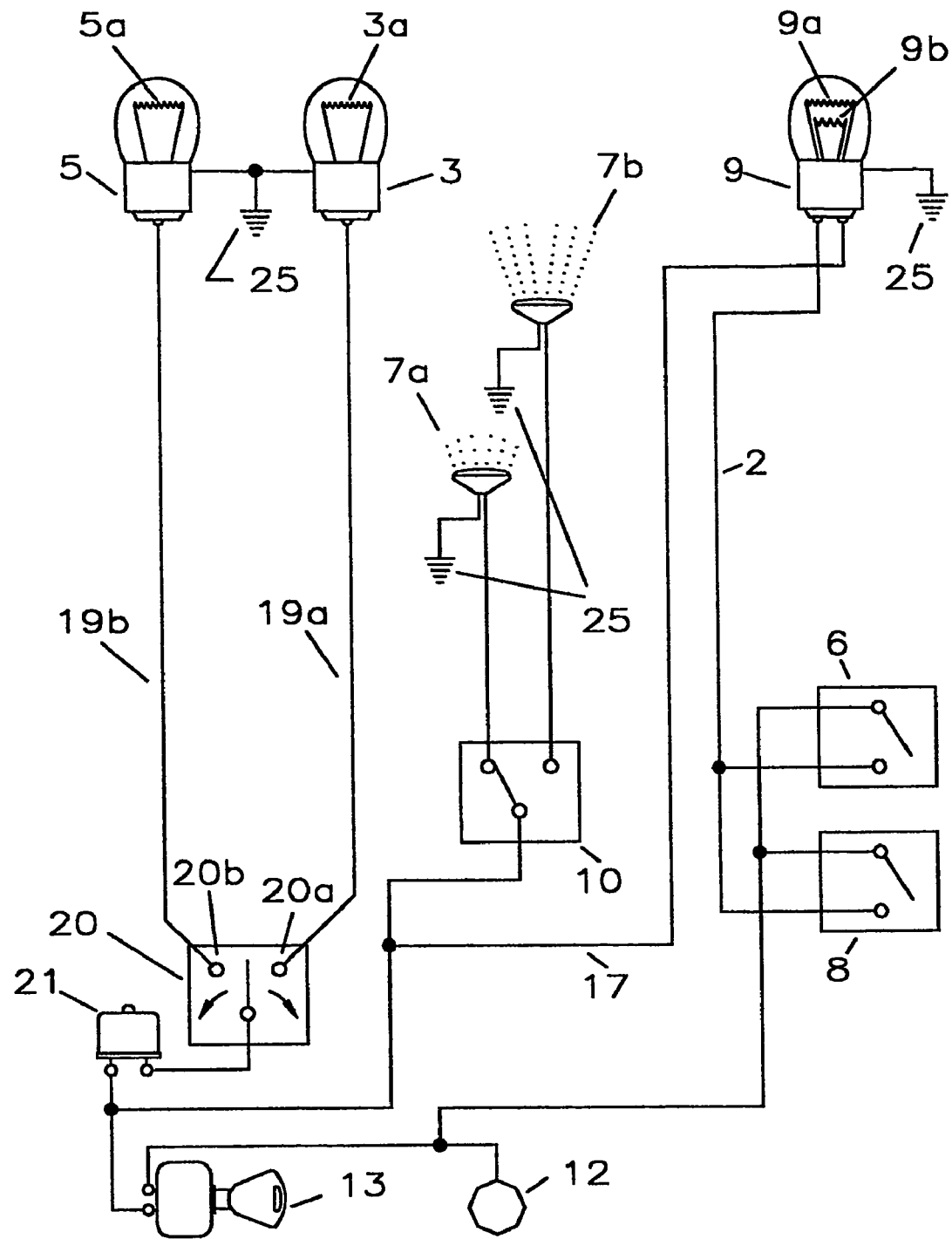
FIG. 14 is a schematic drawing of a connection of parking lights/turn signal lights and headlights of some motorcycles of the prior art.

This invention also has several interesting applications with respect to motorcycles. FIG. 14 shows a wiring configuration of a typical motorcycle of the prior art. Motorcycles have had daytime running lights for years, as usually a single headlight bulb or filament 7a is wired to come "on" automatically as the ignition switch is turned "on", as well as a single parking lamp filament 9b that also is simultaneously illuminated in the rear of the motorcycle. Turn signal lamps 3, 5 axe in many cases single filament as shown, and are identical in front and in rear of same vehicle (two pair exist, but only one pair are shown in FIG. 14). Motorcycles typically possess a single brake/parking light 9 in the rear, which is a dual filament bulb. They also possess a front wheel brake light switch 6 and a rear wheel brake light switch 8, either of which sends signal to the first bright filament 9a of brake/parking light 9 when one or both of the brakes are applied. The first dimmer filament 9b is the rear parking light filament for same vehicle.

Figure 15:
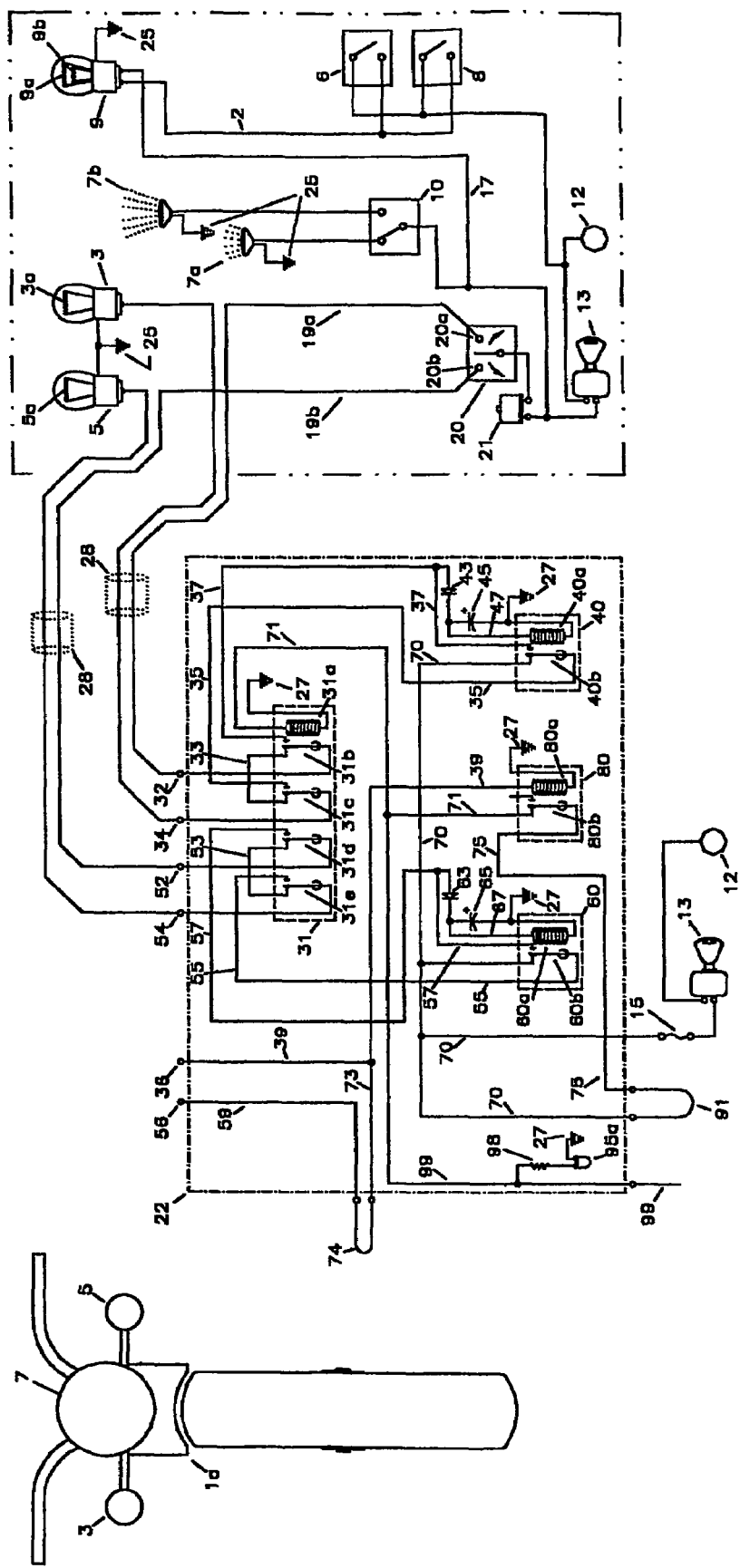
FIG. 15 is a schematic drawing of an embodiment of the daytime running light module of the present invention integrated into a motorcycle as supplemental amber DRL's.

FIG. 15 shows the basic module 22 from FIG. 3 integrated into the front turn signal system of some motorcycles 1 (1a is front view) to cause the amber front turn signals 3, 5 to become additional bright daytime and nighttime running lights to make the vehicle more conspicuous during operation. Statistically, motorcycles are the second most dangerous form of transportation behind homebuilt aircraft, and any added visibility such a device may yield will increase the overall safety of such a dangerous mode of transportation. In this application both the single headlight 7 plus both front turn signal bulbs 3, 5 will be illuminated during vehicle operation, while the front turn signals themselves will continue to operate to show the vehicle operator's directional intentions while operating same vehicle. Bright front amber turn signal lighting from front turn signal bulbs 3, 5 while the motorcycle is operational and addition to the front headlight 7 is similar to motorcycle passing lights. Passing lights for a motorcycle are a white light add-on product with twin stalk mounted similar to and mounted close to the existing turn signal lamp housings, and acting as additional white 'daytime running lights'. Passing lights are added to motorcycles for greater safety via external visibility of same motorcycle, but are not available for all motorcycle types and brands.

In motorcycle applications such as shown in FIG. 15, there is no need for the module 22 to enter into automatic nighttime override mode, as motorcycle lights are always on. This eliminated the needs for wiring any inputs to the module's parking light input terminals 36, 56 and allows for connections between the module 22 and the turn signal lights may be made via twin, 2-strand 18-gauge cables 28. A dedicated module built specifically 'for motorcycle's only' would also have no need for automatic override switch 80, but might be included anyway. Modules marketed as DRL's should always have the night override function built-in, in case the design of the turn signal lamps themselves is such to cause excessive night brightness, and such day function could be deactivated at night with a toggle switch supplying parking light input 36 with ignition voltage at night (not shown). A photoelectric eye system, as shown earlier in FIG. 7, could be used in cases as just mentioned, allowing the DRL system to distinguish and change operational modes between night and day. Some new smaller police motorcycles used in crowd control at night have been noticed with the same front night fog light or DRL turn signal driven effect. This functionality is probably supplied by the motorcycle OEM (Original Equipment Manufacturer) themselves, and is similar to the effect that the present invention controls to achieve in moving vehicle applications.

Figure 16:
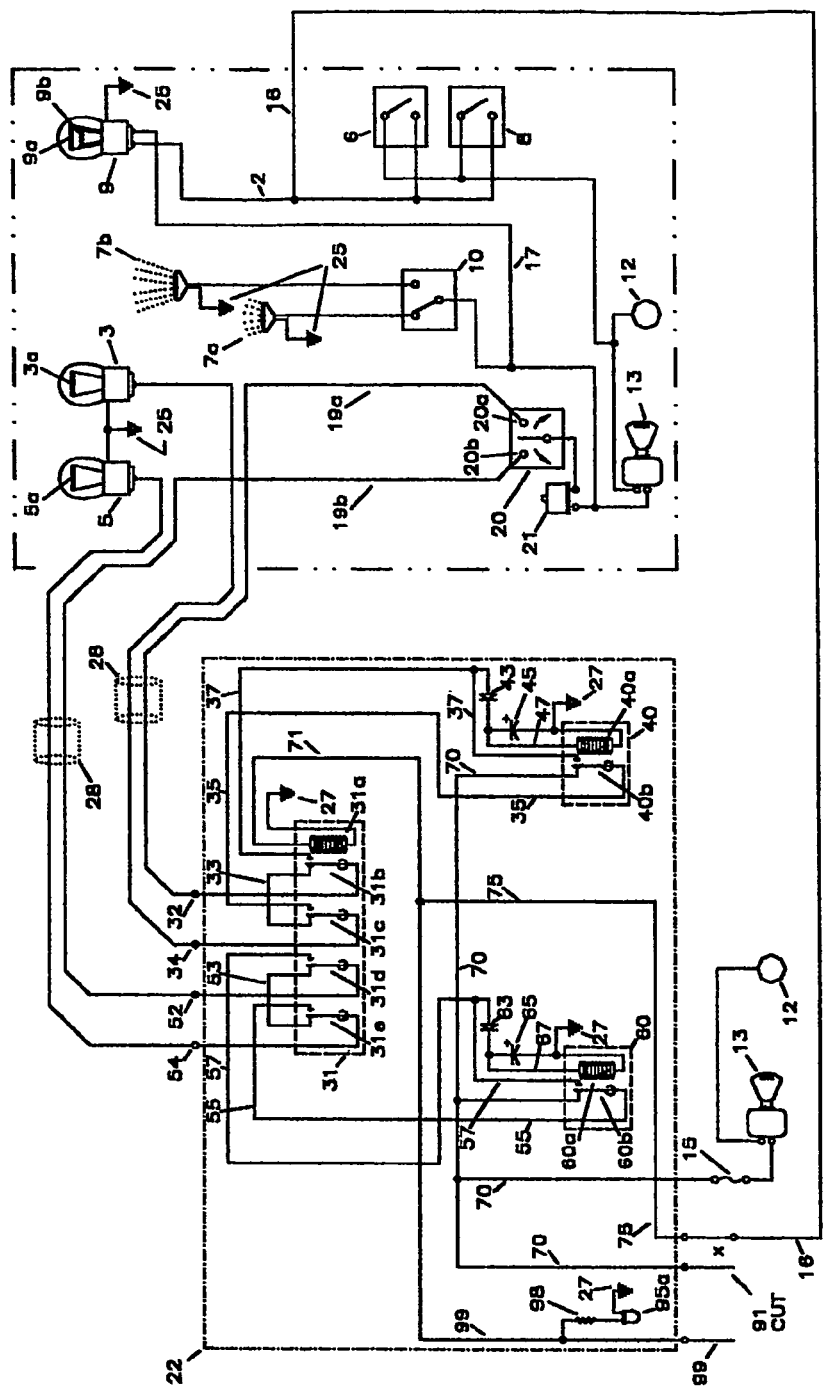
FIG. 16 is a schematic drawing of an embodiment of the daytime running light module of the present invention employed as a vehicular turn signal control system for additional auxiliary rear brake lights, integrated into a motorcycle for increased safety.
Figure 16:
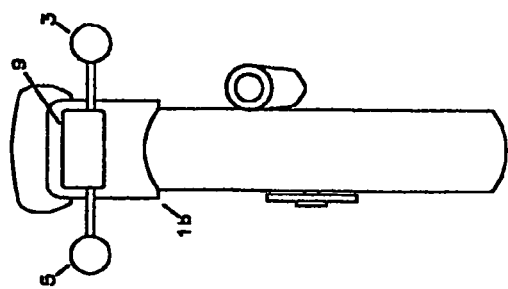

Considering turn signal lamps 3, 5 to be the rear turn signal lamps instead of the front, and noting that both sets of lights 3, 5 are identical in function and design on many motorcycles, FIG. 16 shows the basic module 22 now integrated into the rear turn signal system of a motorcycle 1 (1b is rear view) to cause the amber rear turn signals 3, 5 to become auxiliary rear brake lights for increased visibility and safety during stopping. In contrast to FIG. 15, the module 22 shown in FIG. 16 is the basic module from FIG. 3, but devoid of any night operation functionality components. In this application main power loop 91 is cut, and circuit connector/output 75 is connected via external circuit connector 16 to main brake light circuit connector 2. In this application, every time the red brake light 9 of the motorcycle 1 is actuated via either front brake light switch 6 or rear brake light switch 8, the module 22 energizes, causing the rear turn signal bulbs 3, 5 to also illuminate in amber simultaneously with the brake light 9, operating to draw more attention to same vehicle during stopping or while stopped. Stated differently, the amber rear turn signals now additionally function as brake lights in unison with the factory brake light for added visibility by other drivers. Rear turn signals continue to function as normal, both during stopping and non-stopping conditions. The present invention is now employed as a supplemental brake light/turn signal control system, enhancing the factory brake light system in the rear of the motorcycle as seen by others in traffic situations. Some police motorcycles these days have been observed with this style of rear three lamp/dual color brake light feature (without replacement lenses), utilizing the existing motorcycle turn signal system to enhance the safety of the officer onboard such motorcycle in two situations: while applying brakes anytime during driving, or for as long as the brakes are held while sitting at a traffic light. Motorcycles rear-ended while sitting at red lights is a significant and sometimes fatal problem. Such accidents are more prevalent at night, and some of which could be avoided if the motorcycles were more visible to other drivers in traffic in close proximity to same motorcycles. Note that the modules described in FIGS. 15 and 16 could potentially be integrated into one dual acting turn signal control module/package for added safety for both the front and rear of a motorcycle simultaneously. Modules 22 marketed as DRL's might always have the night override function built-in, yet modules 22 marketed as supplemental brake lights could have the night override circuitry removed, as shown in FIG. 16 and mentioned above.

Also note that motorcycles sometimes have dual filament bulbs in the front of same vehicle, and a module 22 as shown in FIG. 4, one that controls the parking light filaments to limit bulb housing heat issues, would be more appropriate for use with this type of motorcycle front turn signal lighting arrangement (the dual filament front motorcycle module embodiment and application is not shown).

Figure 17:
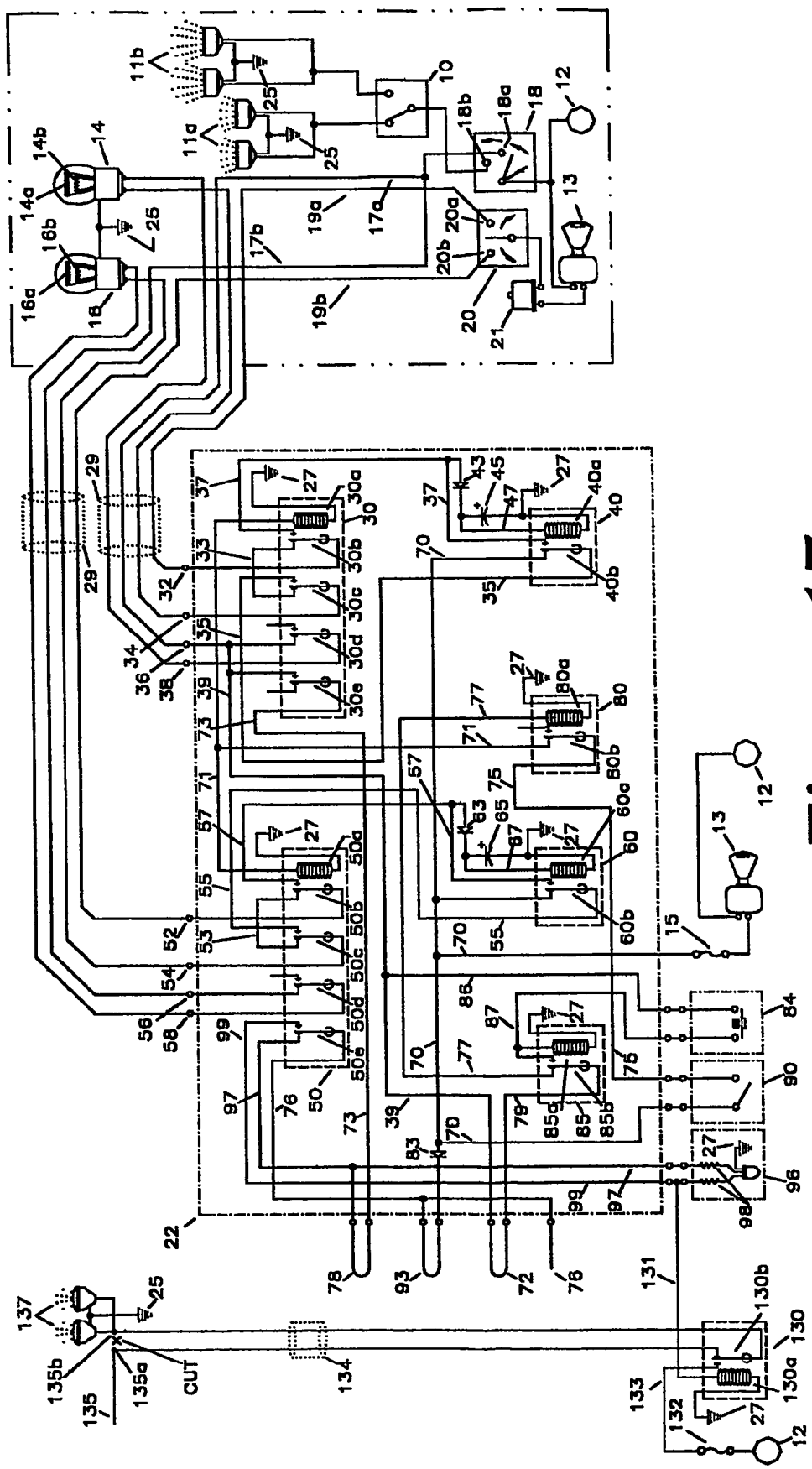
FIG. 17 is a schematic drawing of another embodiment of a minor expansion feature added to the dual function daytime running light/fog light module of the present invention.

Additionally, the DRL module 22 has been designed with expandability in mind, and has the ability for both minor and major expandability events. FIG. 17 shows a minor expandability event, using the active feedback signals that normally feed to the operational indicator 96. In this case, it is necessary to include an auxiliary, 12-volt single pole, double throw expansion switch 130 (such as a relay) as shown. In this example, the vehicle possesses driving lights 137 that are supplied control voltage from a source connector 135, and receive ground potential from vehicle chassis ground 25. The source connector 135 is interrupted or cut, and source feed circuit connector 135a and light connector 135b are connected back to expansion switch 130 using a two-strand 18-gauge shielded cable 134. The light connector 135b is connected to the "common" switched terminal of contact set 130b, and the source feed connector 135a is connected to the "normally closed" switched terminal of contact set 130b. This causes the driving lights 137 to be connected to their normal factory connection as long as expansion switch 130 remains non-energized or in the "off" position. The "normally open" switched terminal of contact set 130b is connected to power source 12 through auxiliary fuse 132 and external circuit connector 133. One side of the electromagnetic coil 130a of expansion switch 130 is connected to circuit connector/output 99 via external circuit connector 131. The other side of coil 130a is connected to ground 27. Subsequently, when the operational indicator 96 is illuminated green (i.e. the module 22 is "on"), 12 volts supplied from circuit connector/output 99 energizes expansion switch 130 and forces driving lights 137 to be activated, as these lights are supplied voltage from power source 12, via auxiliary fuse 132 and external circuit connector 133. This activation happens regardless of the energized or non-energized state of source connector 135.

Figure 18:
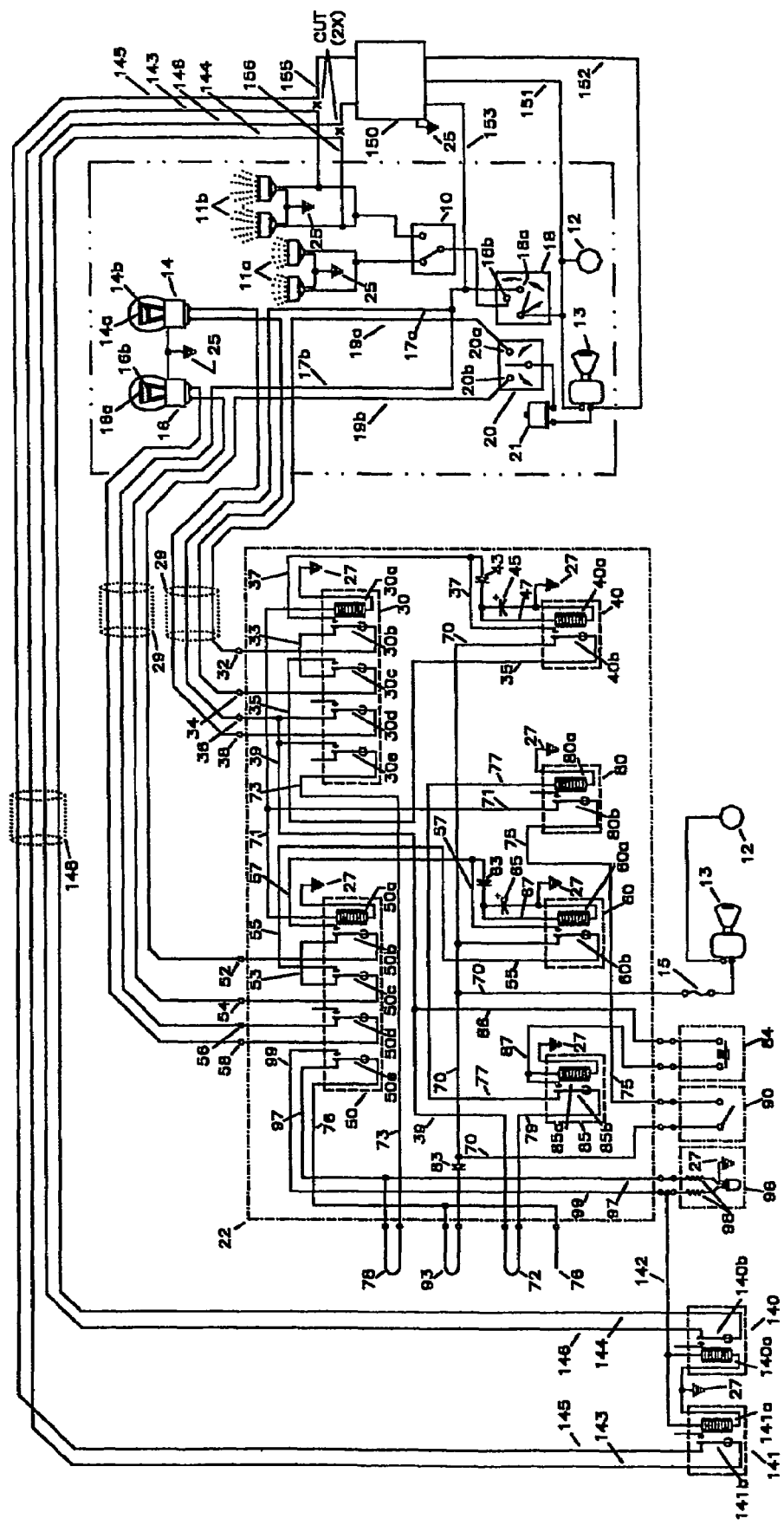
FIG. 18 is a schematic drawing of an embodiment of the daytime running light module of the present invention of an expansion feature added, controlling and replacing a factory installed white light output headlight/DRL system with an amber light output turn signal/DRL system of the present invention.

Another expandability event that might be added to the DRL module is to have the module switch "off" any headlight driven factory DRL devices that might already exist on a vehicle. Since the headlights of a vehicle are typically high current consuming devices, and the turn signal bulbs of same vehicle are low current consuming devices, lifetime fuel economy saving and lower vehicle pollution emissions are two advantages of the present invention over most existing factory or OEM headlight driven DRL systems 150, as well as aftermarket producers of headlight driven DRL product. In the module expandability event shown in FIG. 18, the aftermarket DRL system 150 of the present invention is used to control the vehicle's existing factory DRL system, by switching the factory system "off" when the more economical present invention/system turns "on". This improves same vehicle's long-term fuel economy and simultaneously reduces vehicle's pollution emissions over time, plus allows for A-B fuel consumption and visual distinctness comparisons.

The OEM or factory DRL module 150 feeds the vehicle's high beam headlights 11b at typically a 20% reduced voltage output through individual factory DRL-headlight circuit connectors 155, 156. Note that a 20% reduced voltage input to such lights produces an 80% of normal light output at the bulb itself. Federal DRL guidelines suggest that if the high beam headlights are to be used as daytime running lights, then they must be utilized at a reduced output to prevent glare to other drivers. Thus, all factory DRL modules that connect to a vehicle's high beam headlights have built in large wattage power reducing resistors connected in line to these bulbs to accomplish a reduced output voltage feeding these headlights. The typical factory DRL module 150 as such is shown, and commonly has the following four inputs: supply voltage to feed same headlights and OEM module from a high current source such as power supply 12, connected as shown via external circuit connector 151; voltage for the OEM module to sense that the vehicle has been started, allowing the factory safety lighting to turn "on" when the vehicle starts, from ignition key switch 13, connected as shown via external circuit connector 152; voltage for the OEM module to sense that the parking/headlights have been activated, allowing the factory safety lighting to turn "off" at night, from parking/headlight switch 18, connected as shown via external circuit connector 153; and a supply ground 25.

The expandability event shown in FIG. 18 again uses the active feedback signals that feed to the operational indicator 96. In this case, it is necessary to include two auxiliary, 12-volt single pole, double throw expansion switches 140, 141 (such as a relays) as shown. One side of the electromagnetic coils 140a, 141a of expansion switches 140, 141 are connected to circuit connector/output 99 via external circuit connector 142. The other side of coils 140a, 141a are connected to ground 27. The DRL-headlight circuit connectors 155, 156 are interrupted or cut as shown, and source feed circuit connectors 145, 146, and light feed circuit connectors 143, 144 are connected to both the severed circuit connectors 155, 156, and are also connected back to expansion switches 140, 141 using four-strand 18-gauge shielded cable 148. At expansion switch 140, the "normally closed" contact of contact set 140b of expansion switch 140 is connected to source feed circuit connector 146, while the "common" contact of contact set 140b of expansion switch 140 is connected to light feed circuit connector 144. Similarly, at expansion switch 141, the "normally closed" contact of contact set 141b of expansion switch 141 is connected to source feed circuit connector 145, while the "common" contact of contact set 141b of expansion switch 141 is connected to light feed circuit connector 143. Subsequently, when the operational indicator 96 is illuminated green (i.e. the module 22 is "on"), 12 volts supplied from circuit connector/output 99 energizes expansion switches 140, 141, disconnecting the factory DRL module 150 connections to the vehicle's high beam headlights 11b via interrupting the factory DRL-headlight circuit connectors 155, 156 while the present embodiment of the module 22 is "on". When the present invention module 22 is "off", the factory DRL module 150 is subsequently reconnected to the high beam headlights 11b.

Figure 19:
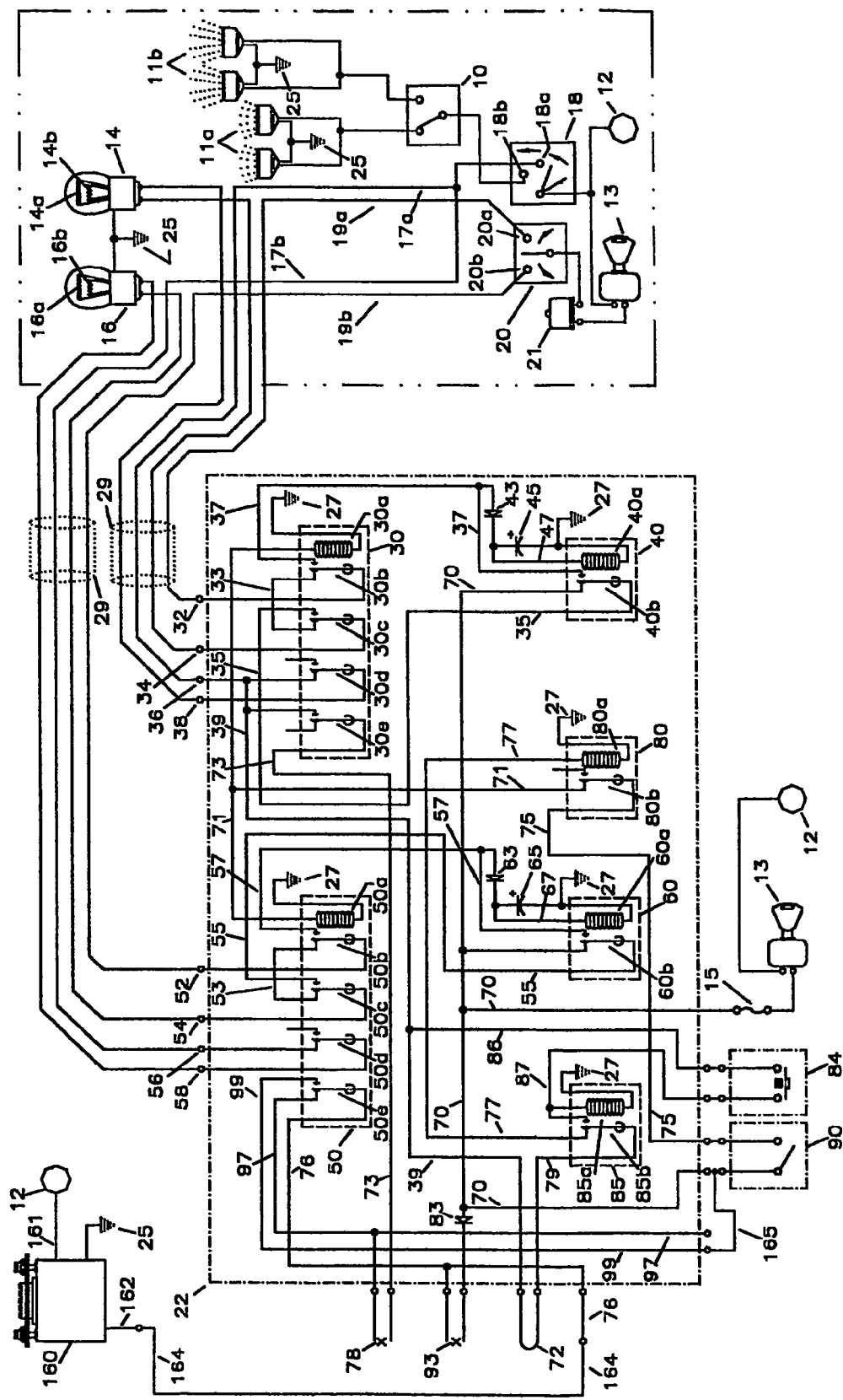
FIG. 19 is a schematic drawing of an embodiment of a major expansion feature of the daytime running light module of the present invention, employing internal module expansion capabilities.

As mentioned previously, the module 22 has the ability for a major expandability event. An example of such expandability is shown in FIG. 19. For a major expandability event, the module 22 has two expandability loops 78, 93 that when cut allow the entire contact set 50e in second intensity light switch 50 to be accessed by the system integrator/installer. This spare arrangement and utilization of a "normally closed", "normally open", and "common" internal contacts is typically referred to as called "dry contacts" when it refers to home and commercial burglar alarms in the building security/alarm industry. These contacts, which were previously "wet" with voltage, become "dry" or without voltage due to the cutting of the two expandability loops 78, 93. The module 22 now has the ability to switch powers or grounds, provided the accessories or devices being switched draw less than the rated contact current capacity of each individual contact set in second intensity light switch 50. In the current design, this switching current capacity is limited to 6 amps. The module 22 shown is the version as previously described in FIG. 12. Looking now to FIG. 19, expandability loops 78 and 93 are cut, and power from main power circuit connector 70 that feeds main power switch 90 is also connected to circuit connector/output 99 through external circuit connector 165. Circuit connector/output 99 was formerly a voltage output lead coming out of the module 22, before expandability loop 93 was cut. Now, the circuit connector/output 99 is neither necessarily an output or an input, since it is just a "dry" contact, and can be utilized for either function. In this example, the ignition keyed positive lead 162 from car stereo 160 is connected to expandability lead 76 through external circuit connector 164. Car stereo's battery positive lead 161 is connected to power source 12, and the same car stereo 160 is connected to vehicle chassis ground 25. When the module 22 is "off", power to ignition keyed positive lead 162 of car stereo 160 is not connected to power due to the contact set 50e in second intensity light switch 50 being relaxed, and car stereo 160 cannot turn "on". When the module 22 is "on", power to ignition keyed positive lead 162 of car stereo 160 is connected due to the contact set 50e in second intensity light switch 50 because second intensity light switch 50 is energized. When expandability loops 78, 93 are cut, the formerly shown operational indicator 96 is not utilized. Such a configuration might be advantageous when the vehicle is taken to the car wash, and/or the car dealership service center. Turning the module 22 "off" at the car wash keeps the daytime running lights from operating while the vehicle is going through the wash, and keeps the car wash attendants from playing the stereo loudly while the vehicle is being cleaned. At the service center, turning the module 22 "off" keeps the dealership from attempting to repair turn signal lights that are observed to be stuck "on" and therefore must be damaged and in need of repair. It also keeps service personnel from playing the stereo loudly, again potentially damaging speakers. This is only one example of a major expandability event that is possible using module's "dry contacts".

There exists an installation qualification for the automatic safety reconnect feature to work properly. This automatic safety reconnect feature, described previously, is the failsafe feature that reconnects all factory wiring with factory bulbs instantaneously with any module 22 loss of power, either accidental or deliberate. Each module 22 is therefore constructed with twin ground cables, to supply module ground 27. These ground cables are to be installed to two separate negative chassis ground points under the dashboard of a target vehicle. The logic behind this is that the module 22 should never lose ground, if the automatic safety reconnect feature is to have a high probability to always work during any random loss of power. The module 22 in theory could lose one ground, and still be thoroughly grounded electrically because of the second ground. If the module 22 loses ground, the device tends to seek ground potential from any and all factory lighting wires, which may cause erratic module behavior. Loss of power causes all electromagnetic coils of the properly grounded modules internal component switches to relax, causing the reconnect feature to occur. Proper and nearly 'guaranteed' grounding of the electromagnetic coils of the module's internal components ensures proper module operation for years to come. Engineering calculated lifespan of such a device, built with high quality readily available components, far exceeds the expected life of the vehicle it is installed in. Lifespan of the present invention with respect to switching components and mean operations to failure using high quality components calculates equal to decades of reliable service with heavy-duty commercial vehicle usage.

It should further be noted that while the present invention discloses the use of relay switches, the switches of the present design could be replaced with electronic switching, such as solid-state relays or their equivalent, and including switching transistors. As designed, relay switching is more robust and less subject to semi-conductor failure. Also, microprocessors, such as the PIC chip or a BASIC stamp, could be programmed and utilized to duplicate the capacitor effect on turn signal rerouting, holding the rerouting relay open until the turn signal event is over. The present capacitor methodology is also more robust, should last longer than the highly reliable switching itself, and is also less subject to component failure.

Figure 20:
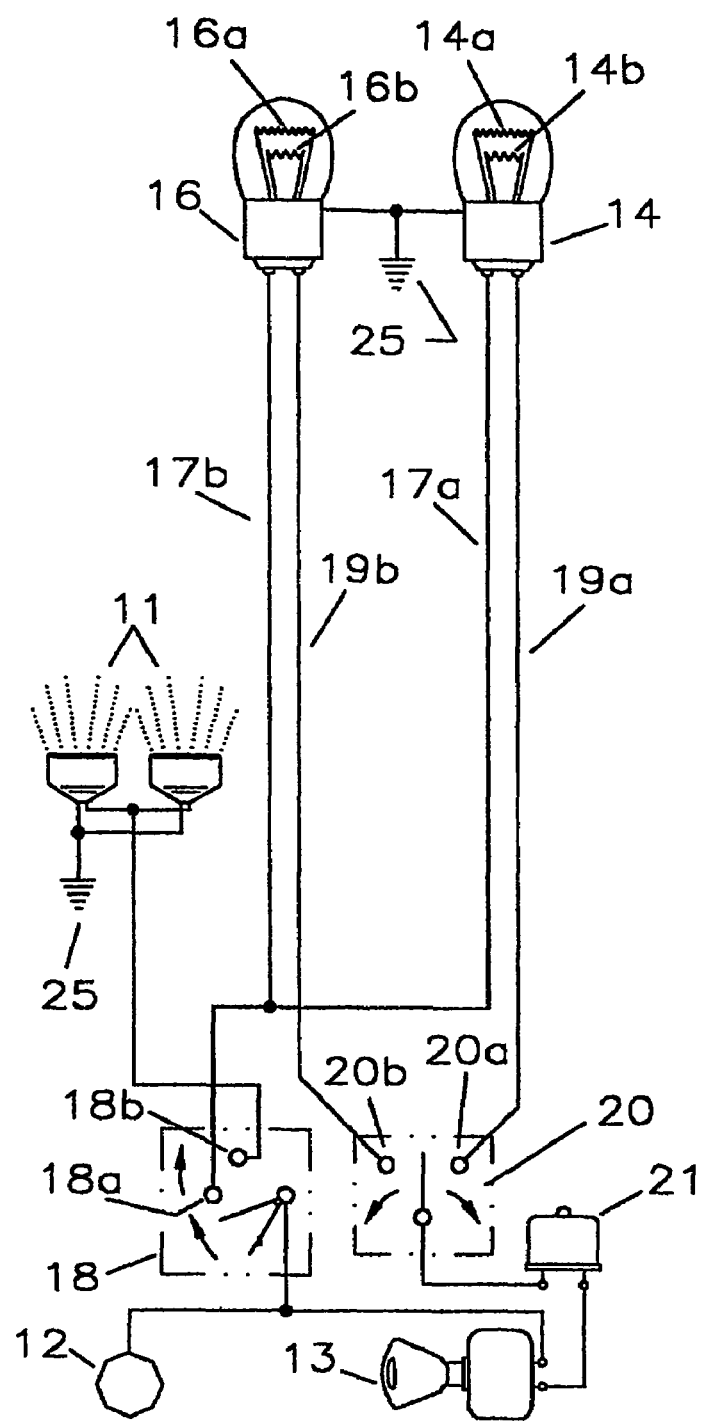
FIG. 20 is a schematic drawing of a connection of parking lights/turn signal lights of a conventional domestic vehicle of the prior art.

Referring now to FIG. 20, a conventional connection between a power source 12 and a set of automotive lights 11, 14, and 16 in a vehicle is illustrated. The power source 12 is a conventional vehicular power source, such as a 12-volt battery. The set of lights includes a pair of headlights 11 and a pair of front vehicular lights 14, 16 having dual filament bulbs. Traditional American and many import vehicle designs include a pair of front vehicular lights 14, 16 that are considered the front parking/turning lights. These front vehicular lights 14, 16 are conventionally integrated into the vehicle generally at the front right corner and the front left corner of the vehicle. The position of the front vehicular lights 14, 16 allow the operator to provide visible signals in traffic to other vehicles in close proximity to same vehicle concerning the operator's intentions in operation of that vehicle. For example, the right front vehicle light 14 is visible on the right side of the vehicle, and the left front vehicle light 16 is visible on the left side of the vehicle.

The first vehicular light 14 corresponds to the right side of the vehicle, and includes filaments 14a and 14b. The second vehicular light 16 corresponds to the left side of the vehicle, and includes filaments 16a and 16b. Each filament 14a, 14b, 16a, and 16b of the respective bulbs 14, 16 has a unique brightness corresponding to either a low intensity light or a high intensity light. In particular, the respective first filaments 14a, 16a have a brighter illumination than the second filaments 14b, 16b since they are conventionally used as turn signal directional lights, and the respective second filaments 14b, 16b having a softer illumination than the first filaments 14a, 16a since they are conventionally used as parking lights. The energized turn signal filament in a conventional vehicle bulb is characteristically designed to be approximately three times as bright as an energized parking light filament of that same bulb. Consequently, the flashing turn signal light has a high contrast, greater than the energized parking light during night operation of a vehicle, especially since both light sources in this case are emitting light from the same location and the same lamp housing.

Continuing to view FIG. 20, the power source 12 is connected to the headlights 11 and second dim filaments 14b, 16b of the vehicular lights 14, 16 via a parking/headlight switch 18 of the vehicle. That is, the parking/headlight switch 18 of the vehicle will determine when the headlights 11 and the dim filaments 14b, 16b are connected to the power source 12. On the other hand, the power source 12 is connected to the first bright filaments 14a, 16a of the vehicular lights 14, 16 via a turn signal switch 20, an ignition key switch 13, and a variable load thermal flasher 21. The negative connectors of lights 14, 16 are grounded at vehicle chassis ground 25.

The ignition key switch 13 is the same that typically starts the engine of the vehicle. With respect to the first bright filaments 14a, 16a of the vehicular lights 14, 16, the power source 12 will only connect to voltage if the ignition key switch 13 of the vehicle is energized, or in an "on" position (i.e., when the ignition key of the vehicle is in the "run" position).

The first filament 14a, 16a of each vehicular light 14, 16 is connected to the turn signal switch 20 via a respective turn signal connector 19a, 19b, while the second filament 14b, 16b of each vehicular light 14, 16 is connected to the conventional parking/headlight switch 18 via a respective parking light connector 17a, 17b. The turn signal switch 20 is a single pole, double throw switch that has a center off or "rest" position. The turn signal switch 20 may complete the circuit at turn signal connector 20a for a right directional signal, or may complete the circuit at turn signal connector 20b for a left directional signal, as desired by the vehicle operator. The parking/headlight switch 18 is a double pole, triple throw switch with an "off" position. In operation, when the parking/headlight switch 18 is closed to either a parking light only position 18a or a headlight-plus-parking light position 18b, the parking/headlight switch 18 will connect the second filaments 14b and 16b with the power source 12 such that the second filament 14b, 16b will be energized. Also, when the turn signal switch 20 is activated for a right direction turn through connector 20a, the first filament 14a of the right vehicular light 14 is connected with the power source 12 (through the thermal flasher 21 and ignition key switch 13, discussed below) such that the first filament 14a will be alternately energized and de-energized, in a pulsing on/off fashion. Similarly, when the turn-signal switch 20 is activated for a left directional turn through connector 20b, the first filament 16a of the vehicular light 16 is connected with the power source 12 through thermal flasher 21 and ignition key switch 13 such that the first filament 16a will be alternately energized on and off in like manner. The thermal flasher 21 generates the alternating on/off flashing voltage sent to the first filament 14a when the turn signal switch 20 is actuated to indicate a right turn directional signal, and the thermal flasher 21 generates an identical but redirected alternating on/off flashing voltage to the first filament 16a when the turn signal switch 20 is actuated to indicate a left turn directional signal.

The thermal flasher 21 is considered a variable load device, and accomplishes the on/off flashing 12-volt output due to its load transferring and carrying capabilities. The primary conventional flasher design has only two contacts, one contact is connected to the power source 12 through the ignition key switch 13, while the other contact will not initiate "flashing" without current being drawn from the output connector of the thermal flasher 21 (traveling on to the input of the turn signal switch 20, and connecting to either right turn connector 20a or left turn connector 20b). Without any resistive load for the thermal flasher 21 to sense, the thermal flasher 21 will not flash at all. As the current flow rate of the flasher 21 changes, the rate of flash of a conventional flasher usually also changes, hence why it is also known as a variable load flasher.

Figure 21:
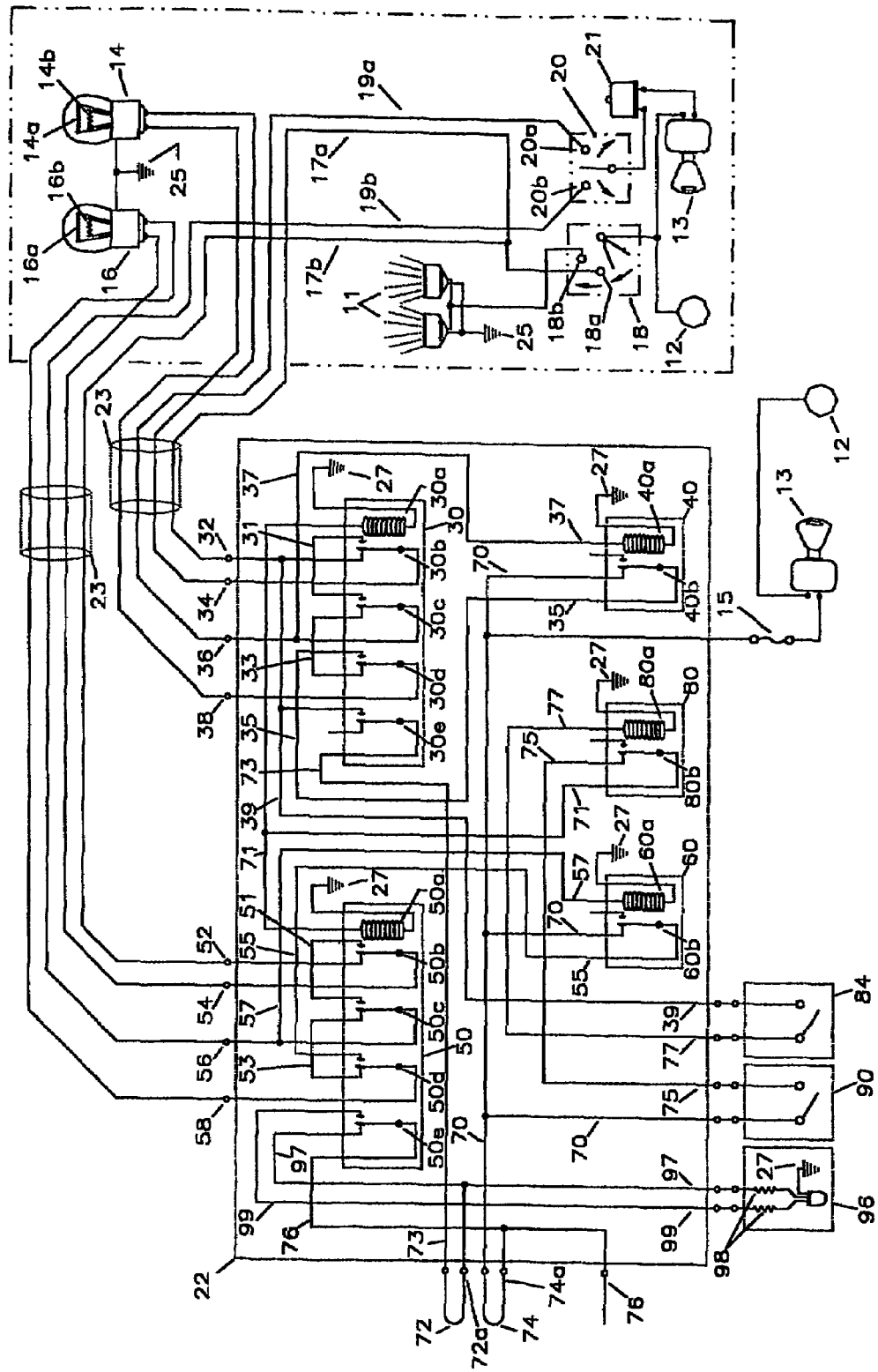
FIG. 21 is a schematic drawing of one embodiment of the daytime running light module of the present invention.

Looking now to FIG. 21, a schematic diagram of one embodiment of the present invention of the daytime running module 22 is illustrated. The daytime running module 22 is electrically connected to the parking light connector 17a, 17b and the turn signal connector 19a, 19b, between the power source 12 and the vehicular lights 14, 16. As a result, the daytime running light module 22 controls the intensity of the light produced by the vehicular lights 14, 16. In particular, the daytime running light module 22 includes a pair of light intensity switches 30, 50 that are interconnected between the front vehicular directional lights 14, 16 and the power source 12, controlling the light emitted from the vehicular lights 14, 16, but only when the ignition key switch 13 is in the ignition "on" or "run" position, as would be needed while driving in the daytime.

Each light intensity switch 30, 50 preferably comprises a relay, and, more specifically, a four pole, double throw relay. The first light intensity switch 30 is connected between the first vehicular light 14 and both the parking/headlight switch 18, and the right hand connector 20a of turn signal switch 20. Likewise, the second light intensity switch 50 is connected between the second vehicular light 16 and both the parking/headlight switch 18 and the left hand connector 20b of turn-signal switch 20. Also, each light intensity switch 30, 50 has an electromagnetic coil 30a, 50a, with one end of each coil connected to ground 27. Energizing the other end of coil 30a, 50a causes the respective light intensity switch 30, 50 to energize and switch four sets of contacts, with their terminals conventionally described as "common", "normally closed", and "normally open". The switch sets 30b, 30c, 30d, 30e and 50b, 50c, 50d, 50e typically connect the "common" terminal to a matching "normally closed" terminal when the corresponding switch is not energized. They also connect the "common" terminal to a matching "normally open" terminal when the corresponding switch is energized. The corresponding switch contacts "close" when a voltage trigger is applied and maintained at the coil 30a or the coil 50a of the corresponding light intensity switch 30 or 50.

In the embodiment shown in FIG. 21, the first light intensity switch 30 is a four pole, double throw switch such that is able to make and/or break potentially four connections between the first vehicular light 14 and both the parking/headlight switch 18 and the right turn connector 20a of the directional turn signal switch 20. All connections from the front lights 14, 16 and the light intensity switch 30, 50 are made using a four-strand, 18 gauge shielded cable 23. The first light intensity switch 30 is connected to the parking/headlight switch 18 via a parking light input connector 32 and parking light connector 17a, and it is connected to the second dimmer filament 14b via a parking light output connector 34. The first light intensity switch 30 is connected to the right turn connector 20a of the turn signal switch 20 through turn signal input connector 36 and turn signal connector 19a, and it is connected to the first brighter filament 14a through turn signal output connector 38. When the first light intensity switch 30 is not energized (i.e., turned "off"), the light intensity switch 30 connects the turn signal input connector 36 with the turn signal output connector 38 via circuit path connector 33 and the "normally closed" switched contact sets 30c and 30d of light intensity switch 30. Also, when the first light intensity switch 30 is "off", the light intensity switch 30 connects the parking light input connector 32 with the parking light output connector 34 using the "normally closed" switched contact set 30b of light intensity switch 30. As a result, the first light intensity switch 30 in the non-energized state connects the first brighter light filament 14a to its original turn signal connector 19a, and connects first dimmer light filament 14b to its original parking light connector 17a. Hence, right vehicle light 14 is reconnected to its former vehicle connections while the intensity light switch 30 is "off".

When the first light intensity switch 30 is energized (i.e., turned "on"), the turn signal output connector 38 is connected to the power source 12; through ignition key switch 13 and fuse 15, then through main power circuit connector 70, through the "normally closed" switched contact set 40b of turn signal interrupt switch 40, then through circuit path connector 35 and finally through the "normally open" switched contact set 30d of light intensity switch 30. As a result, when light intensity switch 30 is energized, the first brighter filament 14a will be lit as long as the ignition key switch 13 is energized or activated, and the turn signal interrupt switch 40 remains non-energized (i.e. stays "off"). Also, when the first light intensity switch 30 is energized, the parking light output connector 34 is connected to turn signal input connector 36 using the circuit path connector 31 and the "normally open" switched contact sets 30b and 30c of light intensity switch 30. This results in the right turn signal connector 20a of the turn signal switch 20 being connected to the first dimmer filament 14b when the first light intensity switch 30 is energized. The first dimmer filament 14b waits in the ready state to draw current from thermal flasher 21 should the turn signal switch 20 be actuated to indicate a right directional turn by the operator, and similarly to accept the pulsed turn signal output that was formerly connected to first brighter filament 14a before the first light intensity switch 30 was energized. Operationally, this first dimmer filament 14b becomes the surrogate or "new" turn signal filament, with the vehicle's turn signal circuitry rerouted to that same filament as long as first light intensity switch 30 is energized.

Rerouting of the vehicle's right turn signal output to the dimmer parking light filament causes the resistive load represented by the second dimmer filament 14b to draw current from and help cause the alternating on/off output action of the thermal flasher 21 through the turn signal switch 20, when same switch is actuated for a right directional turn and completes the circuit through right turn signal connector 20a. It must be noted here that there is conventionally a right rear bulb with parking light, turn signal, and also brake light duties (not shown) wired in parallel with the front bulb. The thermal flasher 21 also sees the resistive load of the rear turn signal (brighter) filament in parallel with the second dimmer filament 14b when first intensity light switch 30 is energized, in order that thermal flasher 21 will "sense" the combined total current load of the substitute front and normal rear right turn signal filament system.

Likewise, the second light intensity switch 50 of the embodiment shown in FIG. 21 is a four pole, double throw switch such that is able to make and/or break potentially four connections between the second vehicular light 16 and both the parking/headlight switch 18 and the left turn connector 20b of the directional turn-signal switch 20. The second light intensity switch 50 is connected to the parking/headlight switch 18 via a parking light input connector 52 and parking light connector 17b, and it is connected to the second dimmer filament 16b via a parking light output connector 54. The first light intensity switch 50 is connected to the left turn connector 20b of the turn signal switch 20 through turn signal input connector 56 and turn signal connector 19b, and it is connected to the second brighter filament 16a through turn signal output connector 58. When the second light intensity switch 50 is not energized (i.e., turned "off"), the light intensity switch 50 connects the turn signal input connector 56 with the turn signal output connector 58 via circuit path connector 53, and the "normally closed" switched contact sets 50c and 50d of light intensity switch 50. Also, when the second light intensity switch 50a is "off", the light intensity switch 50 connects the parking light input connector 52 with the parking light output connector 54 using the "normally closed" internal switched contact set 50b of light intensity switch 50. The result is that, the second light intensity switch 50 in the non-energized state connects the second brighter light filament 16a to its original turn signal connector 19b, and connects second dimmer light filament 16b to its original parking light connector 17b. Hence, left vehicle light 16 is reconnected to its former vehicle connections while the intensity light switch 50 is not energized (i.e., turned "off").

When the second light intensity switch 50 is energized (i.e., turned "on"), the turn signal output connector 58 is connected to power source 12; through ignition key switch 13 and fuse 15, then through main power circuit connector 70, through the "normally closed" switched contact set 60b of turn signal interrupt switch 60, then through circuit path connector 55 and finally through the "normally open" switched contact set 50d of light intensity switch 50. As a result, when light intensity switch 50 is energized, the second brighter filament 16a will be lit as long as the ignition key switch 13 is energized, and the turn signal interrupt switch 60 remains non-energized (i.e. stays "off"). Also, when the second light intensity switch 50a is energized, the parking light output connector 54 is connected to turn signal input connector 56 using the circuit connector 51 and the "normally open" switched contact sets 50b and 50c of light intensity switch 50. This results in the left turn signal connector 20b of the turn signal switch 20 being connected to the second dimmer filament 16b when the second light intensity switch 50 is energized. The second dimmer filament 16b waits in the ready state to draw current from thermal flasher 21 should the turn signal switch 20 be actuated to indicate a right directional turn, and similarly to accept the pulsed turn signal output that was formerly connected to second brighter filament 16a before the second light intensity switch 50 was energized. Operationally, this second dimmer filament 16b becomes the surrogate or "new" turn signal filament, with the vehicle's turn signal circuitry rerouted to the second dimmer filament 16b as long as second light intensity switch 50 is energized.

Rerouting of the left turn signal output of the vehicle to the second dimmer parking light filament 16b causes the resistive load represented by the second dimmer filament 16b to be detected by the thermal flasher 21 through the turn signal switch 20, when same switch is actuated for a left directional turn and completes the circuit through left turn signal connector 20b. It must be noted here that there is conventionally a left rear bulb with parking light, turn signal, and also brake light duties (not shown) wired in parallel with the front bulb. The thermal flasher 21 also sees the resistive load of the rear turn signal (brighter) filament in parallel with the second dimmer filament 16b when second intensity light switch 50 is energized, in order that thermal flasher 21 will "sense" the combined total current load of the substitute front and normal rear left turn signal filament system. Note that when intensity light switches 30, 50 are energized, the module 22 is considered to be "on", and how this happens will be further discussed herein.

The daytime running light module 22 additionally includes a first turn signal interrupt switch 40 and a second turn signal interrupt switch 60 that operate with the turn signal switch 20 to oscillate the brightness of the respective vehicular lights 14 and 16. Each turn signal interrupt switch 40, 60 is preferably a single pole, double throw switch (such as a relay). Looking to the first turn signal interrupt switch 40, the electromagnetic coil 40a of turn signal interrupt switch 40 is connected to the turn signal input connector 36 through circuit connector 37. The other end of coil 40a is connected to ground 27. When the turn signal switch 20 is actuated to indicate a right directional signal by completing the circuit at connector 20a, the turn signal input connector 36 connects pulsed right turn signal input (or "signal") to the coil 40a of first turn signal interrupt switch 40.

The turn signal pulsed output from turn signal switch 20 causes the first turn signal interrupt switch 40 to initially energize; thus momentarily disconnecting the "normally closed" connection of contact set 40b between the power source 12 and the turn signal output connector 38 (provided first intensity switch 30 is energized), whereas the turn signal output connector 38 is in turn connected to first brighter filament 14a. The thermal flasher 21 then internally alternates between opening and closing a connection between the ignition key switch 13 and the turn signal switch contact 20a of turn signal switch 20. Furthermore, the oscillating signal from the thermal flasher 21 travels through turn signal switch 20 to turn signal input connector 36, and through circuit connector 37 to alternately energize and relax the coil 40a of turn signal interrupt switch 40. This causes the connection between the power source 12 and first brighter filament 14a to be alternately reconnected and disconnected. During vehicle operation, the first brighter filament 14a is energized or "on" when the output from turn signal switch 20 is "off", and the first brighter filament 14a oscillates "off" when the output from turn signal switch 20 is energized or turns "on", then the cycle repeats. Thus, the first brighter filament 14a is on, then pulses off, then on, and then repeats while the turn signal switch 20 is energized or "on".

As previously discussed, first dimmer filament 14b is connected to be a substitute or replacement turn signal filament for the vehicle's existing turn signal system while first intensity switch 30 is energized. Since the first dimmer filament 14b is connected by the energized module 22 to the turn signal input connector 36, then the first dimmer filament 14b energizes from the pulsed signal from thermal flasher 21 at the same time the first brighter filament 14a is turning off. As stated earlier, the connection of turn signal input connector 36 to the first dimmer filament 14b is helpful to present a current drain or "load" to thermal flasher 21 in order for same thermal flasher 21 to operate. In summary, when a right turn signal is applied while the daytime running light module 22 is operational, the corresponding vehicular light 14 changes from a constant bright output to a flashing output repeatedly, alternating between the first dimmer filament 14b being energized and the first brighter filament 14a being energized. That is, the first vehicular light 14 will oscillate between a bright light and a dimmed light during the turn signal operation to provide directional notice to other vehicle operators. It is by this manner that the right turn signal directional lighting emitted by vehicular light 14 is restored to the vehicle during the operation of the daytime running light module 22.

Similarly, looking to the second turn signal interrupt switch 60, the electromagnetic coil 60a of second turn signal interrupt switch 60 is connected to the turn signal input connector 56 through circuit connector 57. The other end of coil 60a is connected to ground 27. When the turn signal switch 20 is actuated to indicate a left directional signal by completing the circuit at connector 20b, the turn signal input connector 56 connects pulsed left turn signal input (or "signal") to the coil 60a of second turn signal interrupt switch 60. The turn signal pulsed output from the turn signal switch 20 causes the second turn signal interrupt switch 60 to initially energize; thus momentarily disconnecting the "normally closed" connection of contact set 60b between ignition key switch 13 and the turn signal output connector 58 (provided intensity switch 50 is energized), whereas the turn signal output connector 58 is in turn connected to second brighter filament 16*a*. The thermal flasher 21 then internally alternates between opening and closing a connection between the i power source 12 and the turn signal switch contact 20*b* of turn signal switch 20. Furthermore, the oscillating signal from the thermal flasher 21 travels through turn signal switch 20 to turn signal input connector 56, and through circuit connector 57 to alternately energize and relax the coil 60*a* of turn signal interrupt switch 60. This causes the connection between the power source 12 and second brighter filament 16*a* to be alternately reconnected and disconnected. During vehicle operation, the second brighter filament 16*a* is energized or "on" when the output from turn signal switch 20 is "off", and the second brighter filament 16*a* oscillates "off" when the output from turn signal switch 20 is energized, or turns "on", then the cycle repeats. Thus, the second bright filament 16*a* is on, then pulses off, then on, and then repeats while the turn signal 20 is energized.

As previously discussed, the second dimmer filament 16*b* is connected to be a substitute or replacement turn signal filament for the vehicle's existing turn signal system while second intensity switch 50 is energized. Since the second dimmer filament 16*b* is connected by the energized module 22 to the turn signal input connector 36, the second dimmer filament 16*b* energizes from the pulsed signal from thermal flasher 21 at the same time the second brighter filament 16*a* is turning off. As described earlier, the connection of turn signal input connector 56 to the second dimmer filament 16*b* is helpful to present a current drain or "load" to thermal flasher 21 in order for same thermal flasher 21 to operate. In summary, when a left turn signal is applied while the daytime running light module 22 is operational, the corresponding vehicular light 16 changes from a constant bright output to a flashing output, repeatedly alternating between the second dimmer filament 16*b* being energized and the second brighter filament 16*a* being energized. That is, the second vehicular light 16 will oscillate between a bright light and a dimmed light during the turn signal operation to provide directional notice to other vehicle operators. It is by this manner that the left turn signal directional lighting emitted by vehicular light 16 is restored to the vehicle during the operation of the daytime running light module 22.

The daytime running light module 22 may additionally include an automatic override switch 80 that automatically deactivates first and second light intensity switches 30, 50 when the parking light/headlight switch 18 is in either the parking light only position 18*a* or the headlight-plus-parking light position 18*b*. The automatic override switch 80 is desirable to reduce the illumination of the vehicular lights 14, 16 back to their normal output during certain nighttime hours when brighter vehicle lights 14, 16 are not desired or needed.

The embodiment of the daytime running light module 22 such as shown in FIG. 21 includes the automatic override switch 80, preferably a single pole, double throw switch, such as a relay. The "normally closed" contact set 80*b* of automatic override switch 80 allows the power supply 12 to energize the respective coil inputs 30*a*, 50*a* of the first and second light intensity switches 30, 50, as long as automatic override switch 80 remains "off". Again looking at FIG. 21, the power supply 12 connects to the ignition key switch 13 and to main power circuit connector 70, then through main module power switch 90 (provided same switch is closed, further discussed herein), through circuit connector 75, through the "normally closed" contact set 80*b* of automatic override switch 80, and then to auxiliary power circuit connector 71, which in turn is connected simultaneously to both coil inputs 30*a*, 50*a* of the first and second light intensity switches 30, 50. This connection causes the module 22 to turn "on" when the ignition key switch 13 is energized, as light intensity switches 30, 50 being energized is the state where the module is considered to be "on". The electromagnetic coil 80*a* of automatic override switch 80 is connected to parking light/headlight switch 18 in the following manner: through parking light connector 17*a*, parking light input connector 32, then circuit connector 39, through a manual night override switch 84 (provided the same switch is closed), then through circuit connector 77, and then to coil 80*a* of automatic override switch 80. The other side of coil 80*a* is connected to ground 27. Activation of the parking light/headlight switch 18 will energize the coil 80*a* of the automatic override switch 80, provided the manual night override switch 84 is closed. When the parking lights are turned on, the automatic override switch 80 energizes and breaks the connection between ignition key switch 13 and the coils 30*a*, 50*a* of the first and second light intensity switches 30, 50. As a result, the first and second light intensity switches 30, 50 are not energized, and are effectively turned "off". Consequently, the daytime running light module 22 will be deactivated, and the vehicular lights 14, 16 will operate as originally connected by the vehicle manufacturer. Many conventional factory-installed daytime running light systems currently operate this way, turning "off" as the vehicle lights turn "on".

In the situation where the operator wishes to deactivate the automatic override switch 80, the manual night override switch 84 mentioned earlier is connected between parking light source voltage from parking light input connector 32 and coil 80*a* of automatic override switch 80. The inclusion of this automatic overrule switch 80 is desired when additional light and roadway visibility is desired, as in fog or hazy conditions; persons with decreased night vision may also desire the additional night lighting. The manual night override switch 84 is a standard single pole, double throw switch with an off or "rest" position. When the parking lights are "on" and the manual night override switch 84 is closed, the module 22 goes into night override, thereby turning the module "off" and reconnecting the vehicular lights 14, 16 to their factory wiring. However, when the manual night override switch 84 is switched open (i.e. breaking the potentially closed circuit) while the parking lights are "on", the connection between the automatic override switch 80 and the first and second light intensity switches 30, 50 will be reconnected (i.e. as during daytime operation), such that the vehicular lights 14, 16 will continue to have a brighter illumination. The optional "night mode" state provided by the manual night override switch 84 is controlled exclusively by the operator of the vehicle. It potentially enhances both the operator's visibility at night, during dusk and dawn, and also during night/fog or night/rain conditions. Additionally, it increases the vehicle's outward visibility with respect to other vehicle operators more clearly seeing same vehicle during less than optimum environmental conditions. Factory systems lack this functionality, turning "off" as the parking lights come on.

Previously mentioned, a main module power switch 90 may be included in the present invention to allow the user to control the operation of the first and second light intensity switches 30, 50. In particular, the main module power switch 90 is preferably a conventional single pole, double throw switch (with an off or "rest" position) that connects between the ignition key switch 13 and the first and second light intensity switches 30, 50. Thus, when the main module power switch 90 is closed, the connection between the ignition key switch 13 and the electromagnetic coils 30*a*, 50*a* of the first and second light intensity switches 30, 50 is maintained. The connection itself is from the ignition key switch 13 to main power circuit connector 70, then through main module power switch 90 (provided same switch is closed), through circuit connector 75, through the "normally closed" contact set 80b of automatic override switch 80, and then to auxiliary power circuit connector 71, which in turn is connected simultaneously to both coil inputs 30a, 50a of the first and second light intensity switches 30, 50. Conversely, when the main module power switch 90 is open, the connection between the ignition key switch 13 and the first and second light intensity switches 30, 50 will be broken. In this case the daytime running light module 22 will not control the vehicular lights 14, 16, allowing them to reconnect to their original or factory connections and resulting in the same operational functioning of vehicular lights 14, 16 without the control of the daytime running light module 22. Factory daytime running light systems also lack this functionality, and such a control feature is particularly advantageous to a game hunter, who uses his vehicle to enter the woods during early morning hours and is trying not to draw attention to same vehicle upon arrival.

The present invention includes an operational indicator 96, such as a two input, three color light emitting diode. The operational indicator 96 provides feedback or notice to the user concerning the operational state of the daytime running light module 22 at all times. The operational indicator 96 includes two "dropping" resistors 98, and has a negative terminal that is connected to ground 27. One of these resistors 98 is connected in-line with the first input of the indicator and the circuit connector/output 99, thus causing the light emitting diode to illuminate green when 12 volts is present at circuit connector/output 99. The other resistor 98 is connected in-line with the second input of the diode and circuit connector/output 97, thus causing the light emitting diode to illuminate red when 12 volts is present at circuit connector/output 97. These resistors 98 reduce or "drop" the 12-volt output from the module circuit connector/outputs 99, 97 to about 2 volts, such as is required by the light emitting diode, or commonly known as a LED.

When the operational indicator 96 is illuminated green, the daytime running light module 22 is "on". This occurs only if both the vehicle's ignition key switch 13 and the module 22 itself are both "on". The ensuing connection is from ignition key switch 13 to main power circuit connector 70, then through expandability loop 74, through circuit connector/output 76, through the "normally open" contacts of contact set 50e of energized light intensity switch 50, then through circuit connector/output 99, then to resistor 98 and on to operational indicator 96. Note that second intensity light switch 50 must be energized to allow the circuit connector/output 99 to produce an output. Such can occur only if the module 22 is "on", as the completed circuit supplying voltage to circuit connector/output 99 is disconnected at contact set 50e of light intensity switch 50 when the module 22 is "off".

When the operational indicator 96 is illuminated orange, then the daytime running light module 22 is uniquely "on" while the parking lights (and/or headlights 11) are also turned on. This orange LED output represents the manually canceling of the nighttime override function of the module, and is accomplished by manually switching the manual night override switch 84 "open", as previously described. Orange illumination from the LED only occurs when both the green and red illumination of the operational indicator 96 are energized simultaneously. When the module 22 is in this mode, one half of the dual LED input connection itself is from the ignition key power source 12, through ignition key switch 13 to main power circuit connector 70, then through expandability loop 74, through circuit connector/output 76, through the "normally open" contacts of contact set 50e of energized light intensity switch 50, then through circuit connector/output 99, then to resistor 98 and on to operational indicator 96, producing the green illumination. At the same time, parking light voltage enters the module 22 at parking light input connector 32, through circuit connector 39, through the "normally open" contacts of contact set 30e of energized light intensity switch 30, then through circuit connector 73, through expandability loop 72, then to circuit connector/output 97, then to resistor 98 and on to operational indicator 96, producing the red illumination. Both primary colors of illumination energized at the same time yield the orange illumination that indicates the module's nighttime "on" state. Note that both intensity light switches 30 and 50 must be energized, and the parking lights must also be on to allow the circuit connector/outputs 99 and 98 to be energized at the same time. Such a situation occurs only if the module 22 is "on" and the parking lights are "on" simultaneously.

When the operational indicator 96 is illuminated red, then the daytime running light module 22 is "off". This occurs in two cases: when the main power switch 90 is switched off, or when the automatic night override 80 switch has automatically turned the module "off" because the parking lights (and/or headlights 11) are turned "on" (via a closed circuit connection at manual night override switch 84). In either case, the operational indicator 96 receives power by connecting the power source 12 through ignition key switch 13 to main power circuit connector 70, then through expandability loop 74, through circuit connector/output 76, through the "normally closed" contacts of contact set 50e of light intensity switch 50, then through circuit connector/output 97, then to resistor 98 and on to operational indicator 96, producing the red illumination. Note that second intensity light switch 50 must be "off" to allow the circuit connector/output 97 to produce such an output. Such can occur only if the module is "off" and the ignition key is "on".

Finally, if the operational indicator 96 has no illumination at all, then the daytime running light module 22 has lost a connection to the ignition key switch 13, has blown fuse 15, or has lost ground connection 27. Since the illumination states of the operational indicator 96 are accomplished using switched contact logical feedback from one or both of contact sets 30e, 50e on each of the intensity switches 30, 50, it can be said that the operational indicator 96 uses active feedback to inform the vehicle operator as to the operating state of the module 22 at any given moment.

Figure 22:
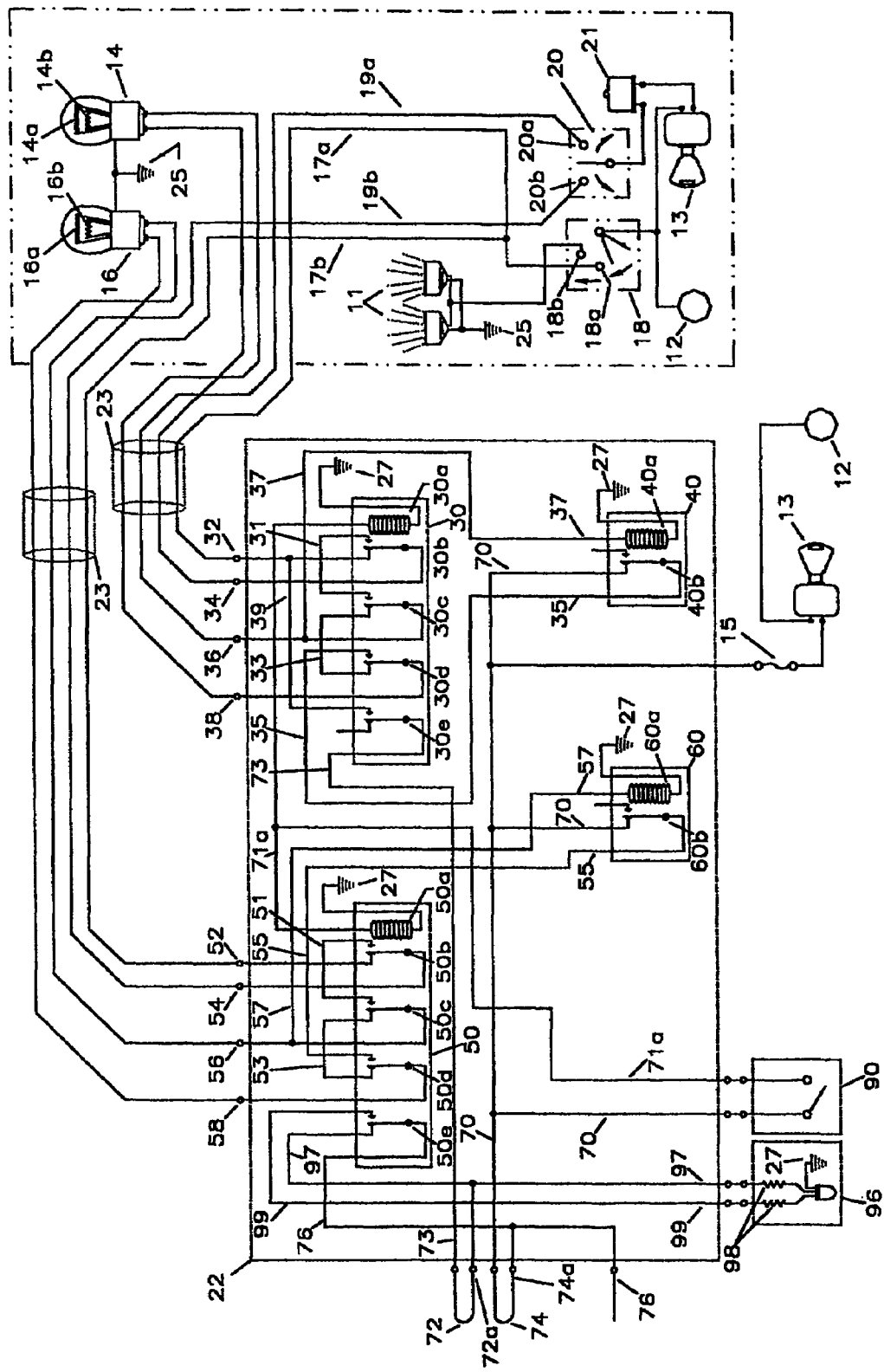
FIG. 22 is a schematic drawing of another embodiment of the manually operated daytime running light module of the present invention.

In the embodiment of the daytime running light module 22 illustrated in FIG. 22, the design of the daytime running light module 22 has been simplified to include only a main module power switch 90 to control operation of the module 22. The "automatic" day and night switching functionality from the module 22 as shown in FIG. 21 has been removed, and control of the module 22 is operator dependent. That is, the operator determines when the additional light is required, and may do so anytime the ignition key switch 13 is "on". When the manual operation running light module 22 is desired, the operator simply turns the main module power switch 90 on, which in turn connects the module 22 with the ignition key switch 13 and the power source 12. Specifically, ignition key switch 13 connects main power circuit connector 70 to one side of main module power switch 90, which when "closed" connects to auxiliary power circuit connector 71a, which in turn is connected simultaneously to both coil inputs 30a, 50a of the first and second light intensity switches 30, 50.

Comparing FIGS. 2 and 3, the automatic override switch 80 and the manual night override switch 84 are removed from FIG. 21 to achieve the embodiment of the manual operation running light module 22 illustrated in FIG. 22. This is due to the fact that there is no need for automatic operation in the embodiment of the "on demand" manual operation running light module 22 shown in FIG. 22. There are some automobile operators who dislike daytime running lights for various reasons, but purchase and utilize aftermarket fog lights on their vehicle, as long as same operator can control where and when these auxiliary lights are energized. The embodiment illustrated in FIG. 22 is a simplified or economy version of the daytime running light module 22 that provides the operator with total control of the vehicular lights 14, 16. That is, this embodiment allows the user to manually determine when the vehicular lights 14, 16 will have a brighter illumination while the vehicle is in operation.

Figure 23:
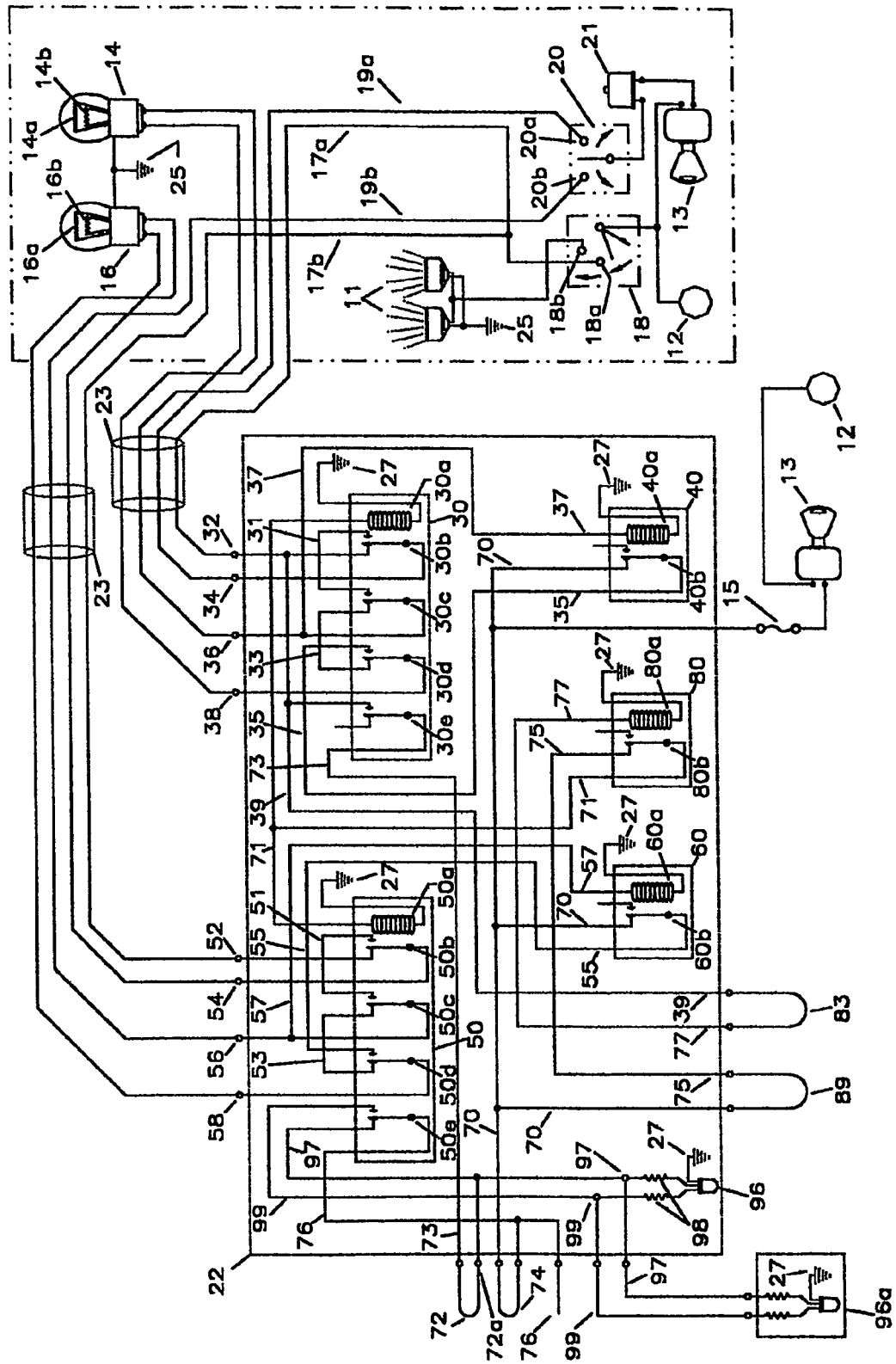
FIG. 23 is a schematic drawing of another embodiment of the automatically operated daytime running light module of the present invention.

Looking now to FIG. 23, another embodiment of the daytime running light module 22 is illustrated. This module 22 of this embodiment is considered to be a commercial vehicle or "fleet" version. That is, for a single vehicle or fleet of vehicles that typically operate in the daytime, there is little need for the operator of such a vehicle to interface with and control the module 22. Therefore, the module 22 is allowed to function completely automatically. Here, the operational indicator 96 is built into the module 22 at the circuit board level, and a second optional operational indicator 96a is mounted where the operator can see the operational states of the module 22. The previous vehicle operator switching 90, 84, as found in FIG. 21, are now replaced by two loops 83 and 89. The first is a main power loop 89, and the second loop is a night override loop 83. The embodiment of the module 22 shown in FIG. 23 most closely operates like a factory system. That is, the module 22 is energized when the vehicle lights are off, and the module 22 is "off" at night when the vehicle lights are on. Moreover, this embodiment is lacking the controls to turn the daytime running lights "off" when the vehicle is running, and it is also lacking the controls to turn the daytime running lights "on" anytime the parking lights and/or headlights 11 are activated.

Figure 24:
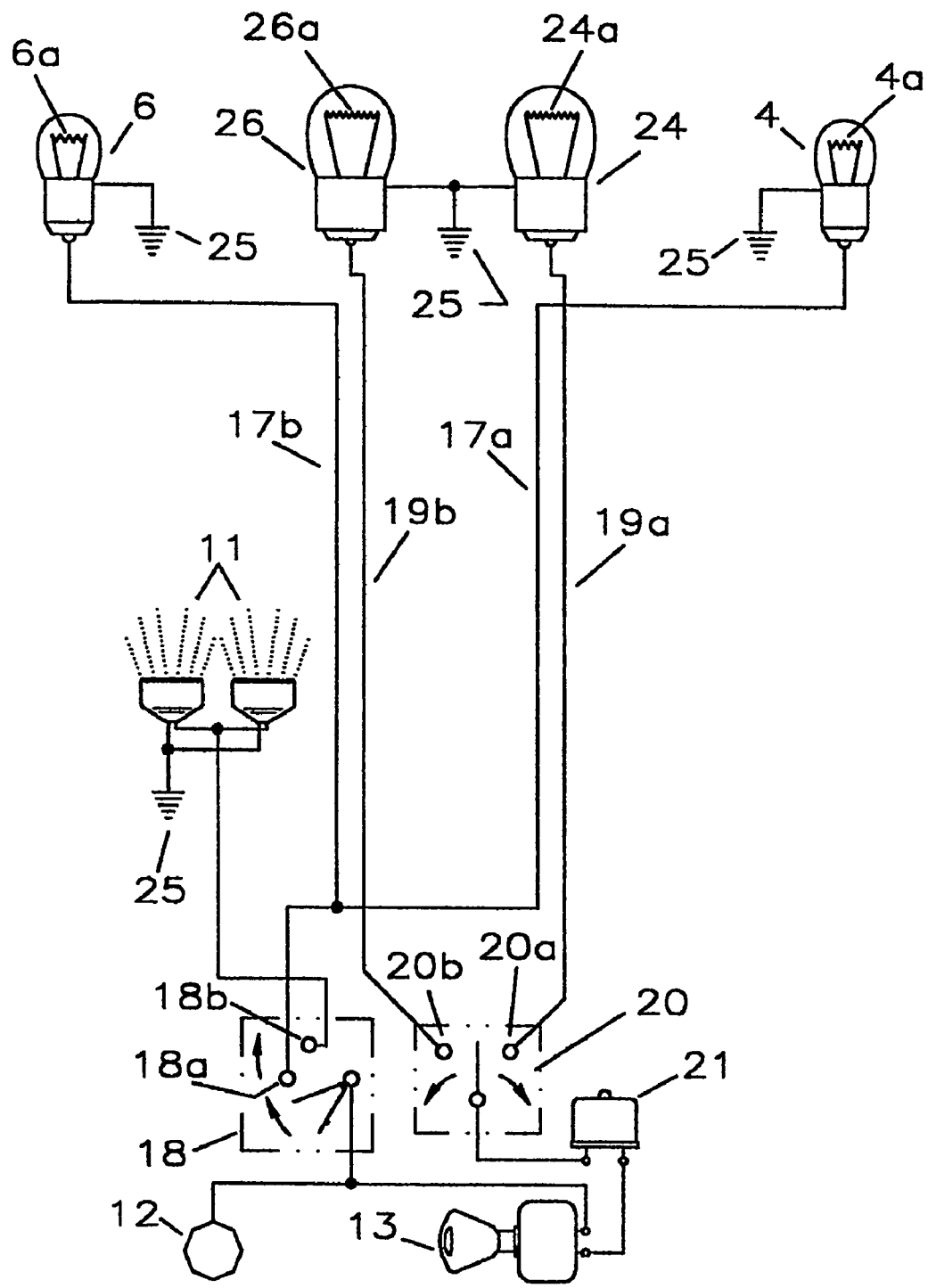
FIG. 24 is a schematic drawing of connection of parking lights/turn signal lights of a conventional import vehicle of the prior art.

Many imported vehicles typically have a different parking light/turn light configuration, similar to that shown in FIG. 24. These vehicles use separate parking light bulbs 4, 6 containing dimmer bulb filaments 4a, 6a. Such vehicles then utilize additional but separate turn signal bulbs 24, 26 containing brighter filaments 24a, 26a. Vehicles with this type of arrangement may utilize the parking light bulbs 4, 6 to be both forward projecting parking lights for oncoming traffic, and to also be the front lighted side marker lights for traffic approaching the vehicle from the side. More will be discussed about this further herein.

Figure 25:
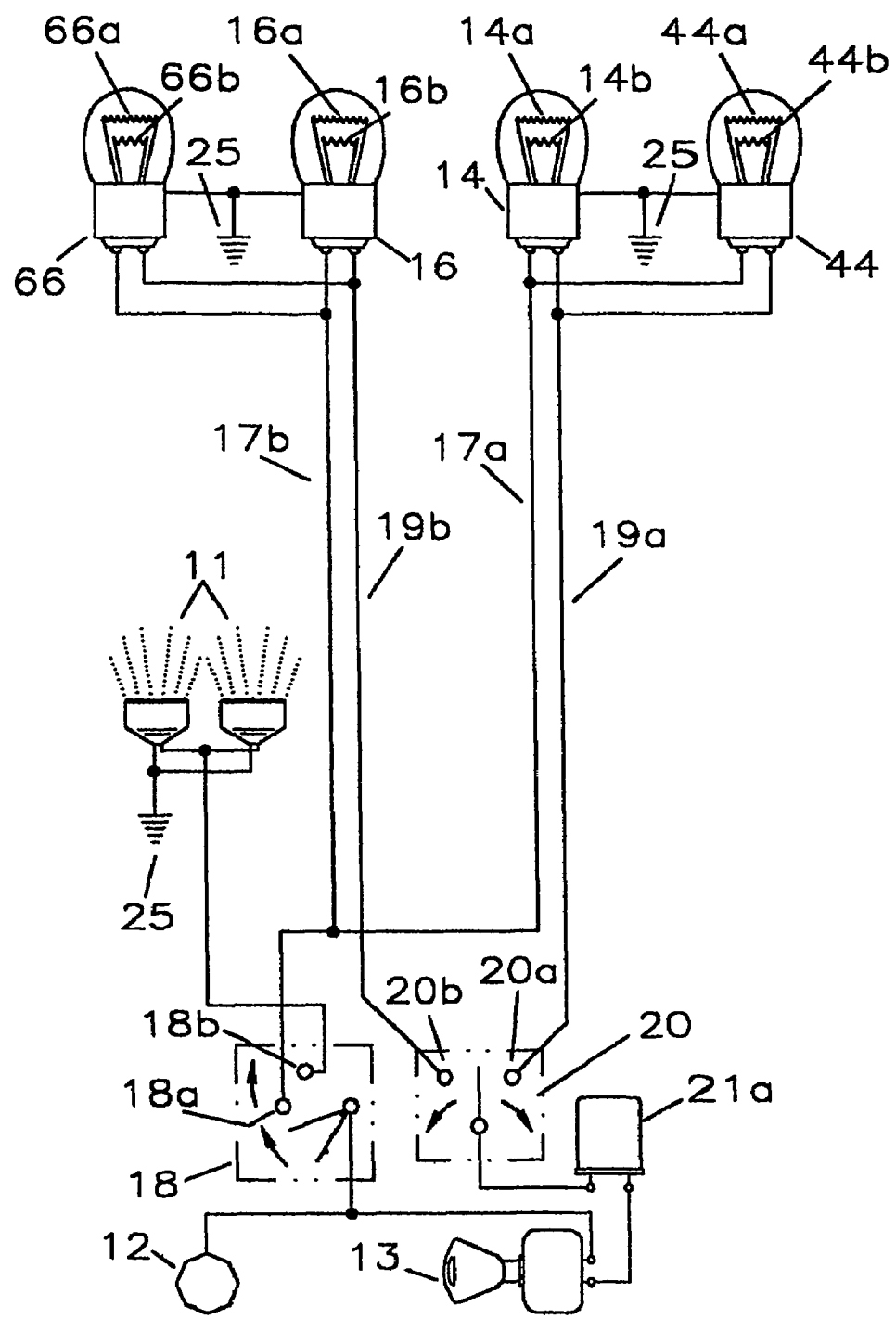
FIG. 25 is a schematic drawing of connection of parking lights/turn signal lights of some luxury vehicles of the prior art.

Another uniquely different parking light/turn light configuration can be found in some luxury vehicles, and/or in vehicles where the styling of the front lighting system is emphasized. Such a system is shown in FIG. 25, where two dual filament bulbs are utilized for each side of the front of the vehicle. Bulbs 14 and 44 are wired together in parallel for the front right side of the vehicle, as shown. Bulbs 16 and 66 are wired similarly for the front left side of the vehicle. Note that this type of system nearly always uses a specially designed flasher 21a that is designed specifically for the additional current loads presented by the addition of bulbs 44 and 66.

Figure 26:
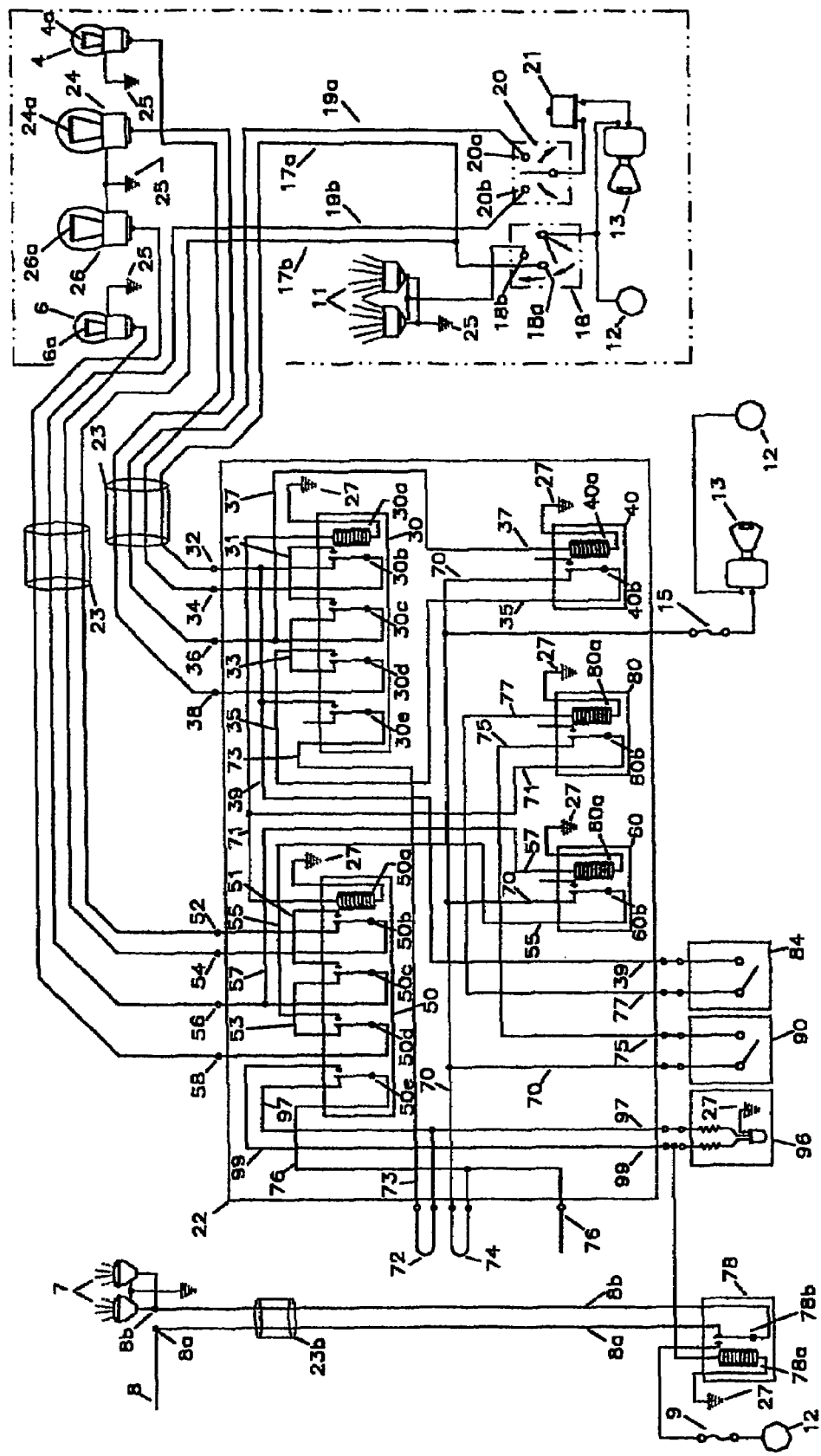
FIG. 26 is a schematic drawing of another embodiment of the daytime running light module of the present invention.

FIG. 26 shows the daytime running light module 22 integrated into an imported vehicle as discussed in FIG. 24. Additionally, the daytime running light module 22 has been designed with expandability in mind, and has the ability for both minor and major expandability events. FIG. 26 shows a minor expandability event, using the active feedback signals that normally feed to the operational indicator 96. In this case, it is necessary to include an auxiliary, 12-volt single pole, double throw expansion switch 78 (such as a relay) as shown. In this example, the vehicle possesses driving lights 7 that are supplied control voltage from a source connector 8. The source connector 8 is interrupted, and source feed circuit connector 8a and light connector 8b are connected back to expansion switch 78 using two strand 18-gauge shielded cable 23b. The light connector 8b is connected to the "common" switched terminal of contact set 78b, and the source feed connector 8a is connected to the "normally closed" switched terminal of contact set 78b. This causes the driving lights 7 to be connected to their normal factory connection as long as expansion switch 78 remains non-energized or in the "off" position. The "normally open" switched terminal of contact set 78b is connected to power source 12 through auxiliary fuse 9, and one side of coil 78a is connected to circuit connector/output 99. The other side of coil 78a is connected to ground 27. Subsequently, when the operational indicator 96 is illuminated green (i.e. the module is "on"), 12 volts supplied from circuit connector/output 99 energizes expansion switch 78 and forces driving lights 7 to be activated, regardless of the state of source connector 8.

As mentioned previously, some imported vehicles utilize the parking light bulbs 4, 6 as shown in FIG. 24 to be both forward projecting parking lights for oncoming traffic, and also to be the front lighted side marker lights for traffic approaching the vehicle from the side. In this specific instance, the connection of the daytime running light module 22 in its normal configuration will connect the original parking light filaments 4a, 6a as surrogate or substitute turn signal bulbs, with the vehicle's turn signal circuitry rerouted to those same filaments as long as the daytime running light module 22 is energized. When the parking lights are off, this feature of the module 22 is advantageous because when a turn signal is activated, both high and low intensity bulbs on that side of the vehicle alternate energizing on and off. When the parking lights are activated and the module 22 is "on", however, this is a disadvantage because the parking light output from the vehicle is no longer connected to the parking light bulbs 4, 6. Since U.S. law has required lighted side markers on vehicles since 1968, defeating these lights by the module's normal American vehicle operation is unacceptable, and an adaptation to correct for this is necessary.

Figure 27:
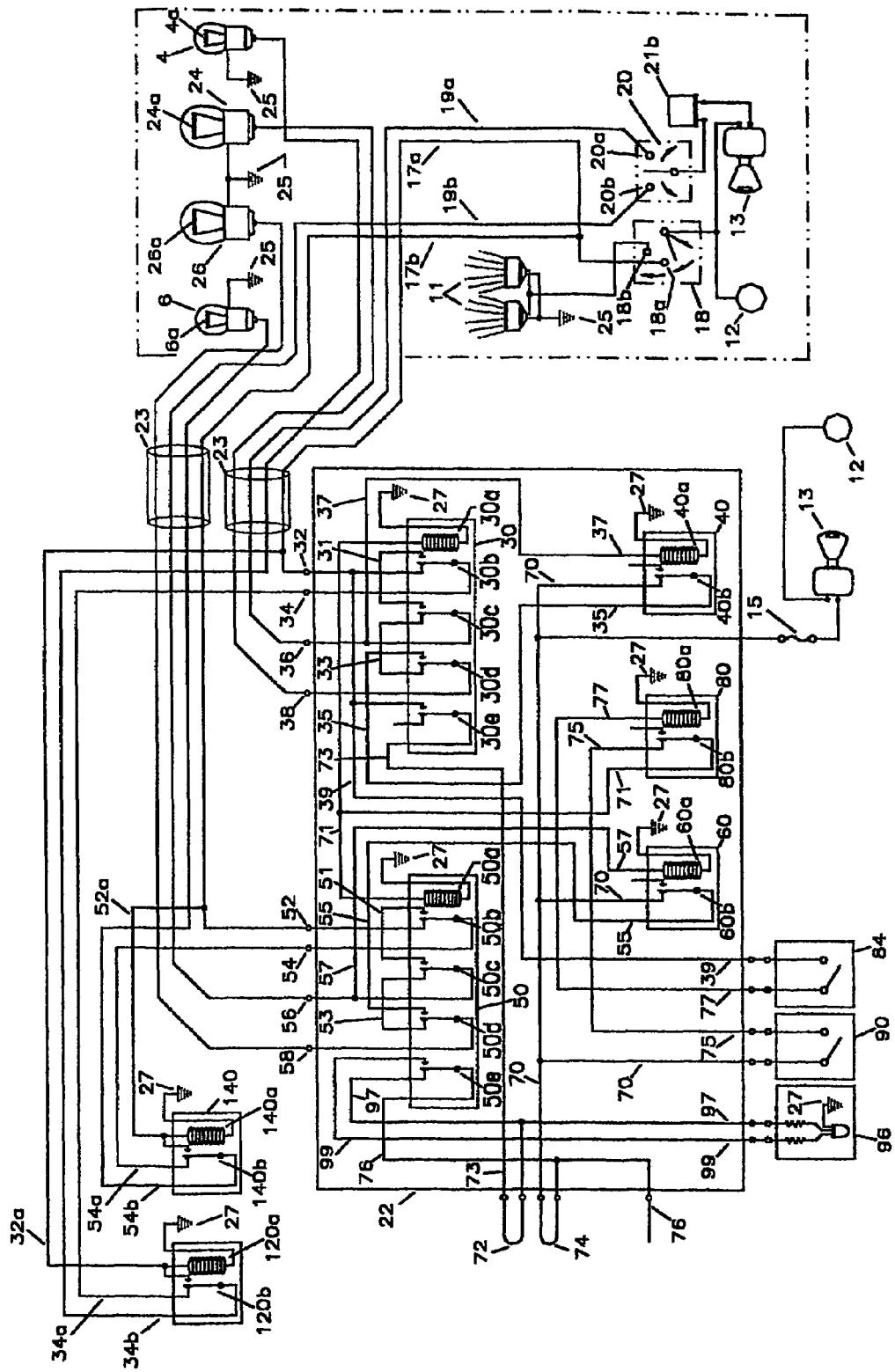
FIG. 27 is a schematic drawing of another embodiment of the daytime running light module of the present invention.

FIG. 27 shows such an adaptation, and in this case it is necessary to include two secondary light switches 120, 140 preferably single pole, double throw switches (such as relays). For the right parking light side, parking light source voltage from parking light input connector 32 is connected to both one end of coil 120a and the "normally open" terminal of contact set 120b of secondary light switch 120 via external circuit connector 32a. The other end of coil 120a of secondary light switch 120 is connected to ground 27. The parking light input connector 34 of first intensity light switch 30 is connected to the "normally closed" terminal of contact set 120b via external circuit connector 34b. Also the "common" terminal of contact set 120b of secondary light switch 120 is connected to the dimmer filament 4a of parking light bulb 4 via external circuit connector 34b. At times when the parking lights are "off", the normal connection of the module 22 between parking light input 34 and parking light dimmer filament 4a is restored through the contact set 120b as long as secondary light switch 120 is relaxed or non energized. When the parking lights are activated, the secondary light switch 120 is energized and connects parking light voltage from external circuit connector 32b through contact set 120b and external circuit connector 34b to energize dimmer filament 4a of parking light bulb 4.

For the left parking light side, parking light source voltage from parking light input connector 52 is connected through to both one end of coil 140a and the "normally open" terminal of contact set 140b of secondary light switch 140 via external circuit connector 52a. The other end of coil 140a of secondary light switch 140 is connected to ground 27. The parking light input connector 54 of second intensity light switch 50 is connected to the "normally closed" terminal of contact set 140b via external circuit connector 54b. Also the "common" terminal of contact set 140b of secondary light switch 140 is connected to the dimmer filament 6a of parking light bulb 6 via external circuit connector 54b. At times when the parking lights are "off", the module's normal connection of the module 22 between parking light input 54 and parking light dimmer filament 6a is restored through the contact set 140b as long as secondary light switch 140 is relaxed or non-energized. When the parking lights are activated, the secondary light switch 140 is energized and connects parking light voltage from external circuit connector 52b through contact set 140b and external circuit connector 54b to energize dimmer filament 6a of parking light bulb 6. Also, the secondary light switches 120, 140 could optionally be built into the module 22 at the circuit board level for imported cars.

Notice in FIG. 27 the normal factory thermal flasher 21 has been replaced what is commonly known as a heavy-duty trailer flasher 21b. A variable load factory thermal flasher 21 is typically designed for the current requirements of two turn signal filaments: one bright filament for a front bulb, and one bright filament for rear bulb (this is not always the case, as original equipment flashers are designed for the number of bulbs built into the specific vehicle in question). When one of these filament burns out, then the current flowing through the factory thermal flasher 21 changes, and the rate of flash of the simple device either increases (i.e., a fast or rapid flash condition), or freezes in the "on" or always connected (i.e., no flash) state. This is to signal the vehicle operator that a bulb-out condition exists on that specific side of the vehicle, as indicated by the system function change on the affected side. Optionally replacing the factory thermal flasher 21 with a widely available and inexpensive heavy-duty trailer flasher 21b is very common when a vehicle is used to tow a trailer, or when the flasher itself burns out. When a trailer is towed behind a vehicle, brake and turn signal lights on the trailer are connected to the vehicle's lighting system. This causes the factory flasher 21 in many cases to falsely signal a bulb-out condition, hence the need for a heavy-duty trailer flasher 21b. When a flasher burns out or otherwise fails, all that is typically commercially available are heavy-duty trailer flashers. Such heavy-duty trailer flashers have no bulb-out notice capacity, and flash constantly with either one filament or any number of filaments present. In some cases, integration of the daytime running light module 22 into a vehicle with the module's rerouting of the turn signal circuitry to the parking light filaments is self correcting, with no need for flasher replacement. In the case of a fast flashing bulb-out condition occurring due to the addition of the daytime running light module 22, replacing the factory flasher with a heavy-duty trailer flasher 21b solves this problem in a very high percentage of cases. With the absence of connection to the parking light filaments in the night operation as described above and shown in FIG. 27, such flasher replacement as described is necessary.

Figure 28:
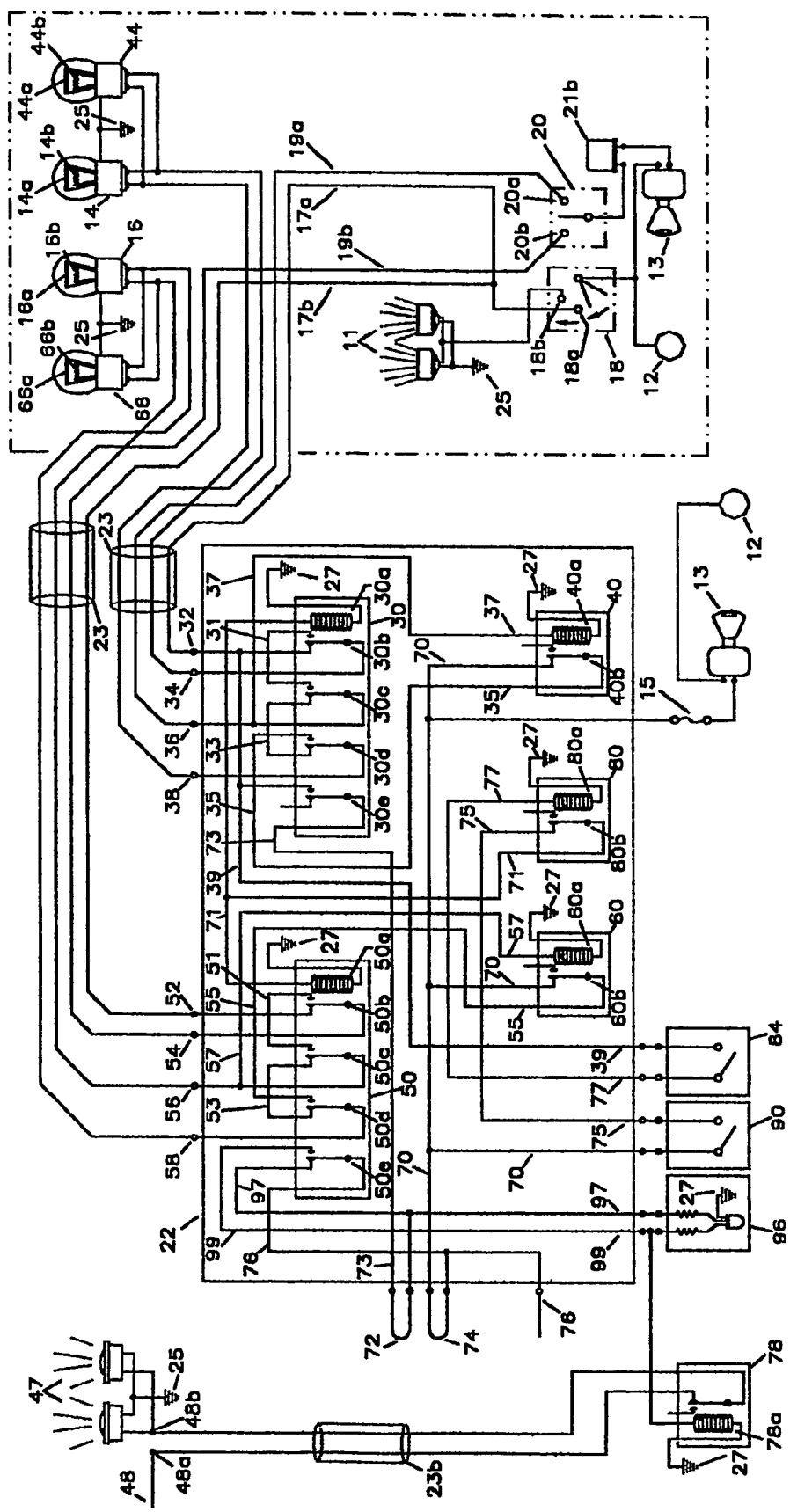
FIG. 28 is a schematic drawing of another embodiment of the daytime running light module of the present invention.

The embodiment shown in FIG. 28 shows the module 22 integrated into a four bulb eight filament system, as shown in FIG. 25. The factory thermal flasher has been replaced with a heavy-duty trailer flasher 21b in FIG. 28, as described above, to compensate for the resistive load drop of two lower resistance filaments (i.e., a lower resistance filament equals higher light output) having been replaced in the turn signal system by the higher resistance parking light filaments. FIG. 28 additionally shows another minor expandability event, in this instance to turn "off" factory white daytime running lights 47 when the module activated amber daytime running lights are energized or turned "on". Again it is necessary to include an expansion switch 78, such as a single pole, double throw switch (such as a relay). The vehicle possesses white factory daytime running lights 47 that are supplied control voltage from source connector 48. The source connector is intercepted, and source feed circuit connector 48a and light connector 48b are connected back to expansion switch 78 using two strand 18 gauge shielded cable 23b. The light connector 48b is connected to the "common" terminal of contact set 78b, and the supply feed connector 48a is connected to the "normally closed" terminal of contact set 78b. This causes the white factory driving lights 47 to be connected to their normal source connector 48 as long as expansion switch 78 remains non-energized or in the "off" position. The "normally open" terminal of contact set 78b has no connection. One side of coil 78a is connected to circuit connector/output 99. The other side of coil 78a is connected to ground 27. Subsequently, when the operational indicator 96 is illuminated green from 12 volts being supplied from circuit connector/output 99 (i.e. the module is "on"), then the expansion switch 78 is energized and forces the white factory daytime running lights 47 to be deactivated, regardless of the state of source connector 48.

Figure 29:
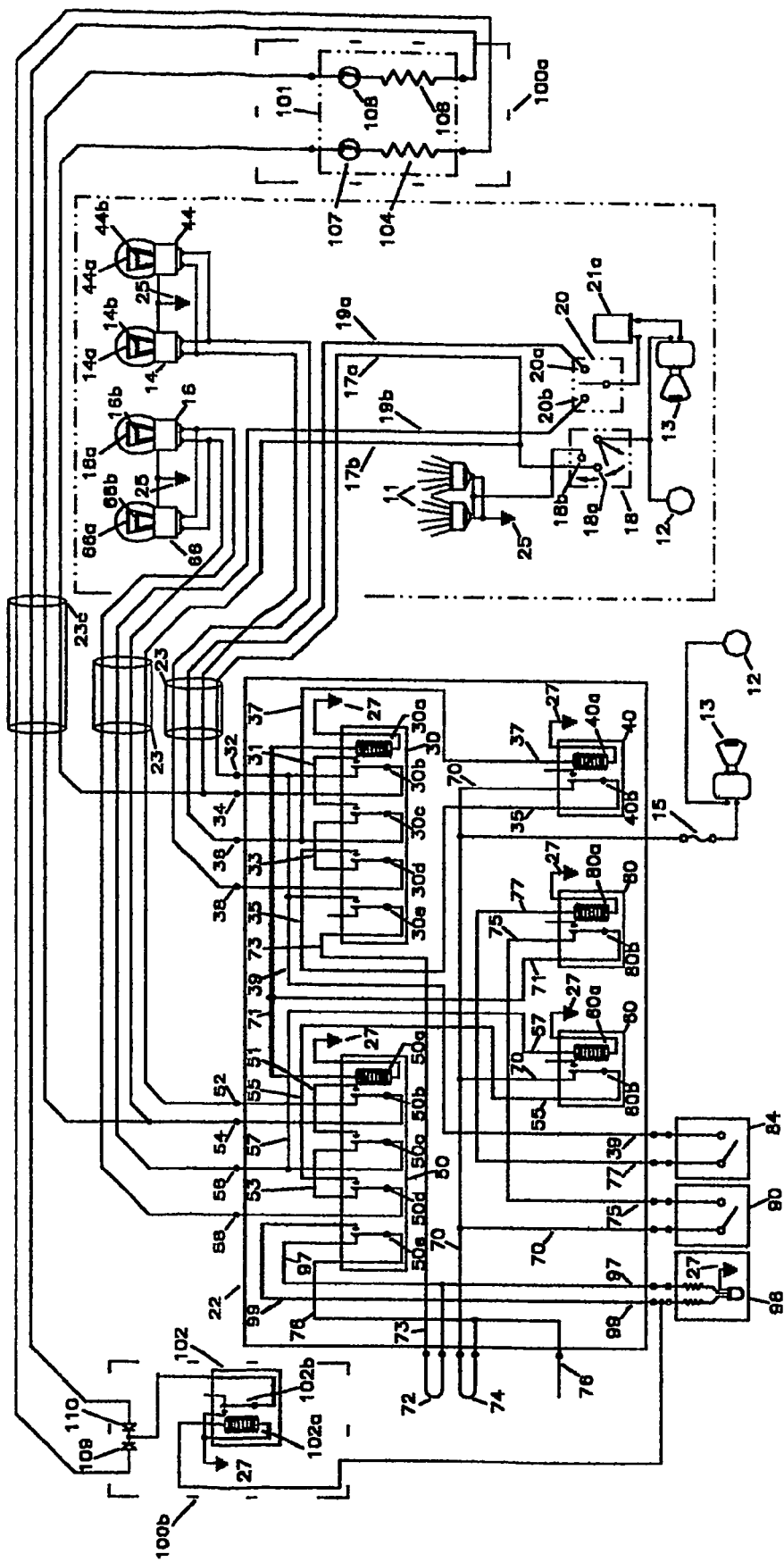
FIG. 29 is a schematic drawing of another embodiment of the daytime running light module of the present invention.

Occasionally, a vehicle's factory thermal flasher 21a is designed in such a fashion that it cannot be replaced with a heavy duty trailer flasher 21b, as previously discussed. The embodiment in FIG. 29 shows such a case where a two part bulb resistance compensation circuit has been added. The compensation circuit shown consists of a heat sink resistor pack 100a mounted in the engine compartment, and a compensation switch-diode pack 100b mounted under the dash along with the daytime running light module 22. The heat sink resistor pack 100a consists of two bulb compensation resistors 104 and 106, and two thermostats 107 and 108, all mounted in an aluminum heat sink 101. The compensation switch-diode pack 100b consists of a compensation switch 102 (such as a relay), and two diodes 109 and 110. All connections between heat sink resistor pack 100a and compensation switch-diode pack 100b are made using four strand 18-gauge wire 23c.

One end of the coil 102a of compensation switch 102 is connected to circuit connector/output 99. The other side of coil 102a and the "normally open" terminal in contact set 102b of compensation switch 102 are both connected to ground 27. The "common" terminal of contact set 102b of compensation switch 102 is connected through diodes 109 and 110 to the one end of compensation resistors 104 and 106 inside the heat sink resistor pack 100a. The other end of first compensation resistor 104 is connected to parking light output connector 34 through thermostat 107. The other end of second compensation resistor 106 is connected to parking light output connector 54 through thermostat 108. The compensation resistors 104 and 106 operate to provide secondary bulb resistance to the turn signal circuitry in addition to the resistance offered to the same circuitry by the rerouted dimmer parking light filaments, provided three conditions exist: when the module 22 is "on", when compensation switch 102 is energized because of output from circuit connector/output 99, and when one of the turn signals are "on". When the module 22 is "off", compensation resistors 104, 106 cannot add resistance as described above because they are not able to receive a ground connection, since compensation switch 102 is not energized. Additionally, the diodes 109, 110 isolate the compensation resistors 104, 106 from connecting to each other and draining parking light energy when the vehicles parking lights are "on" and the module is "off". When energized, the byproduct of the compensation resistors 104, 106 is heat, and the aluminum heat sink 101 is utilized to dissipate this heat. The thermostats 107, 108 are present to break the compensation resistors 104, 106 respective circuit connection and prevent thermal runaway should the right or left turn signal be mistakenly be left on for a long time while the module 22 is "on".

Figure 30:
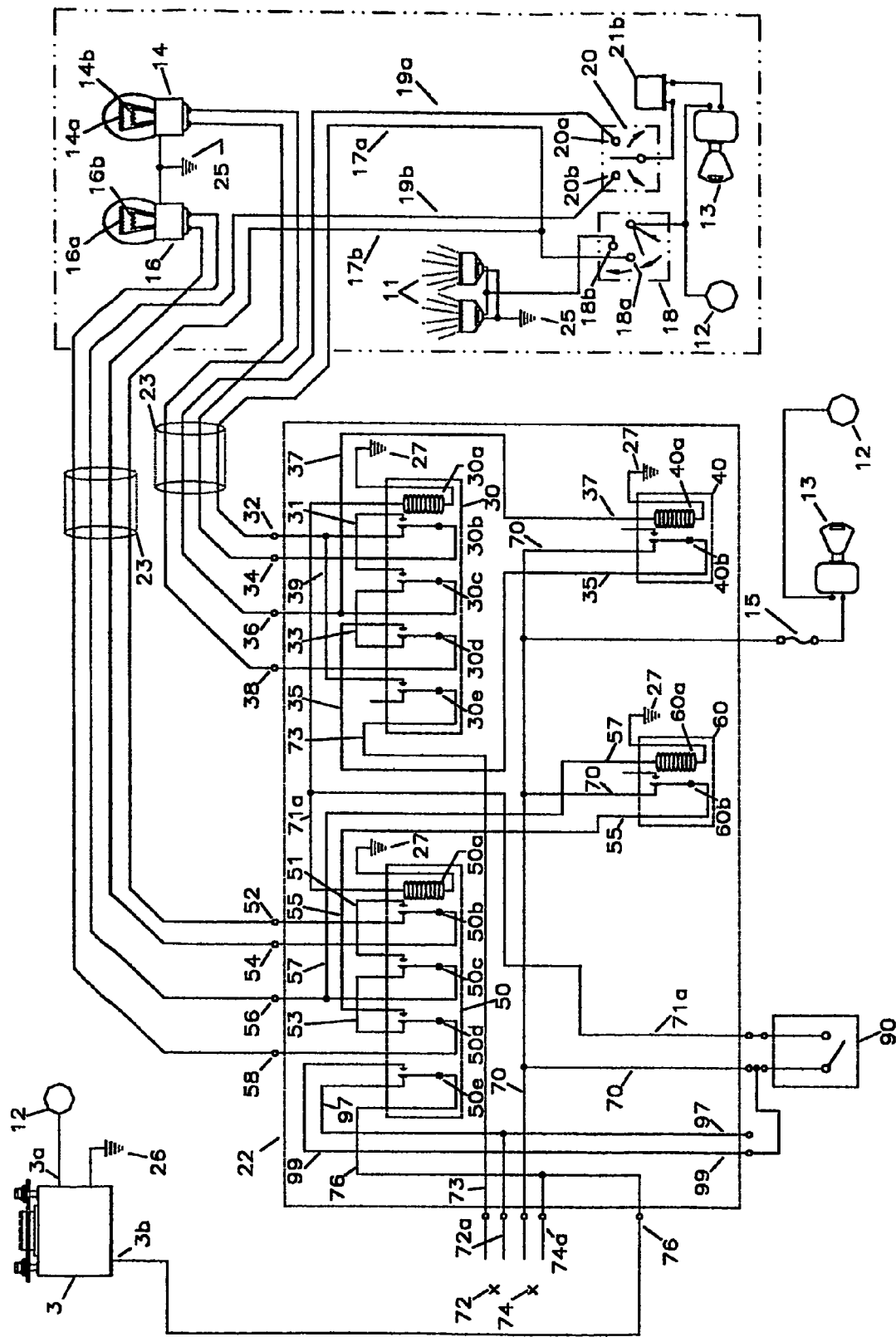
FIG. 30 is a schematic drawing of another embodiment of the manually operated daytime running light module of the present invention.

As mentioned previously, the module 22 has the ability for a major expandability event. An example of such expandability is shown in FIG. 30. For a major expandability event, the module has two expandability loops 72, 74 that when cut allow the entire contact set 50e in second intensity light switch 50 to be accessed by the system integrator/installer. This spare arrangement and utilization of a "normally closed", "normally open", and "common" internal contacts is typically referred to as called "dry contacts" in the burglar alarm industry. These contacts, which were previously "wet" with voltage, become "dry" or without voltage due to the cutting of the two expandability loops 72, 74. The module now has the ability to switch powers or grounds, provided the accessories or devices being switched draw less than or up to 6 amps, as the module is currently designed. The module 22 shown is the manual version as previously described in FIG. 22. Expandability loops 72 and 74 are cut, and power from main power circuit connector 70 that feeds main power switch 90 is also connected to circuit connector/output 99. In this example, the ignition keyed positive lead 3b from car stereo 3 is connected to expandability lead 76. Car stereo's battery positive lead 3a is connected to power source 12, and the same car stereo 3 is connected to vehicle chassis ground 26. When the module 22 is "off", power to ignition keyed positive lead 3b of car stereo 3 is not connected due to the contact set 50e in second intensity light switch 50 being relaxed, and car stereo 3 cannot turn "on". When the module is "on", power to ignition keyed positive lead 3b of car stereo 3 is connected due to the contact set 50e in second intensity light switch 50 because second intensity light switch 50 is energized. When expandability loops 72, 74 are cut, the formerly shown operational indicator 96 is not utilized. Such a configuration might be advantageous when the vehicle is taken to the car wash, and/or the car dealership service center. Turning the module 22 "off" at the car wash keeps the daytime running lights from operating while the vehicle is going through the wash, and keeps the car wash attendants from playing the stereo loudly while the vehicle is being cleaned. At the service center, turning the module "off" keeps the dealership from attempting to repair turn signal lights that are stuck "on" and therefore must be "damaged" and in need of repair. It also keeps service personnel from playing the stereo loudly, potentially damaging speakers. This is only one example of a major expandability event that is possible using module's "dry contacts".

It should further be noted that while the present invention discloses the use of relay switches, the switches of the present design could theoretically be replaced with electronic switching, such as solid state relays or their equivalent. As designed, relay switching is more robust and less subject to semi-conductor failure.

Thus, although there have been described particular embodiments of the present invention of a new and useful DIRECTIONAL LAMP DRL MODULE, FOG LIGHT SYSTEM, AND VEHICULAR TURN SIGNAL CONTROL SYSTEM, it is not intended that such references be construed as limitations upon the scope of this invention except as set forth in the following claims.

What is claimed is:

1. A vehicular light control system for controlling external vehicular directional signal lights, comprising:
   a light intensity switch connecting a brightest output circuit of at least one directional signal light and a turn signal switch,
   the light intensity switch connecting the brightest output circuit of the at least one directional signal light and a power supply,
   at least one turn signal rerouting switch, wherein the turn signal rerouting switch is connected to said power supply and said light intensity switch
   whereby the intensity of the at least one directional signal light is controlled between operational modes selected from the group consisting of signaling modes and visibility, utility, and safety modes.

2. The vehicular light control system as described in claim 1, wherein said light intensity switch further comprises a first signal routing device.

3. The vehicular light control system as described in claim 2, wherein the first signal routing device comprises a relay; and wherein the relay includes
   an energized state, wherein said brightest output circuit of said at least one directional signal light is connected to the power supply, and:
   a non-energized state, wherein said brightest output circuit of said at least one directional signal light is connected to the turn signal switch.

4. The vehicular light control system as described in claim 1, wherein said power supply is an ignition-keyed power source.

5. The vehicular light control system as described in claim 1, wherein said turn signal rerouting switch further comprising a second signal routing device.

6. The vehicular light control system as described in claim 5, wherein said second signal routing device comprises a relay; and wherein said relay includes
   an energized state, wherein said brightest output circuit of at least one directional signal light is connected to said turn signal switch through said light intensity switch, and:
   a non-energized state, wherein said brightest output circuit of at least one directional signal light is connected to said power supply through said light intensity switch.

7. The vehicular light control system as described in claim 1, further comprising at least one device for isolating a pulsed signal to energize said turn signal rerouting switch.

8. The vehicular light control system as described in claim 7, wherein said at least one device for an isolating pulsed signal is at least one first diode.

9. The vehicular light control system as described in claim 1 further comprising at least one device for storing an isolated pulsed signal to energize said turn signal rerouting switch.

10. The vehicular light control system as described in claim 9, wherein said at least one device for storing the isolated pulsed signal is at least one first capacitor.

11. A vehicular light control system for controlling external vehicular directional signal lights, comprising:
   at least one light intensity switch connecting a brightest output circuit of at least one directional signal light and a turn signal switch, and
   said at least one light intensity switch connecting the brightest output circuit of at least one directional signal light and a power supply, an automatic override switch connected to a parking/headlight switch of a vehicle, said power supply and said light intensity switch, wherein said automatic override switch further controls operation of said light intensity switch;

whereby the intensity of at least one directional signal light is controlled between an output mode for signaling and an constant illumination output mode for safety and for utility.

12. The vehicular light control system as described in claim 11, wherein said at least one light intensity switch further comprises means for controlling electrical current and voltage routing.

13. The vehicular light control system as described in claim 12, wherein said means for controlling electrical current and voltage routing includes a relay; and wherein said relay includes
an energized state, wherein said brightest output circuit of said at least one directional signal light is connected to said power supply, and:
a non-energized state, wherein said brightest output circuit of said at least one directional signal light is connected to said turn signal switch.

14. The vehicular light control system as described in claim 13, further comprising at least one said turn signal rerouting switch, wherein said turn signal rerouting switch is connected to said power supply and said light intensity switch, and wherein said turn signal rerouting switch is further connected to said turn signal switch and said directional signal light through said light intensity switch when said light intensity switch is in said energized state.

15. The vehicular light control system as described in claim 14, wherein said turn signal rerouting switch further comprises means for controlling electrical current and voltage routing.

16. The vehicular light control system as described in claim 15, wherein said means for controlling electrical current and voltage routing includes a relay; and wherein said relay includes
an energized state, wherein said brightest output circuit of at least one directional signal light is connected to said turn signal switch through said light intensity switch, and:
a non-energized state, wherein said brightest output circuit of at least one directional signal light is connected to said power source through said light intensity switch.

17. The vehicular light control system as described in claim 11, wherein said power supply is a vehicular power source.

18. The vehicular light control system as described in claim 11, further comprising at least one means for converting a pulsed signal to a constant non pulsed signal to energize said turn signal rerouting switch.

19. The vehicular light control system as described in claim 18, wherein at least one means for converting a pulsed signal to a constant non pulsed signal comprises a first diode and a first capacitor, wherein the first diode and the first capacitor are connected to said turn signal rerouting switch and said turn signal switch.

20. The vehicular light control system as described in claim 11, further comprising a main module power switch connected with said light intensity switch and said power supply, the main module power switch further controlling operation of said light intensity switch.

21. The vehicular light control system as described in claim 11, further comprising an operational indicator connected to said light intensity switch, the operational indicator providing feedback corresponding to the operational state of said vehicular light control system.

22. The vehicular light control system as described in claim 21, further comprising a night operation latching switch and a night operation momentary switch, wherein the night operation latching switch is connected to the automatic override switch, to said parking/headlight switch, and to said night operation momentary switch; said night operation momentary switch and said night operational latching switch further controlling operation of said light intensity switch.

23. A vehicular light control system for controlling pairs of external vehicular directional lights while allowing any onboard vehicular bulb-failure indication subsystems to continue to operate, comprising:
a first light intensity switch connecting the brightest output circuit of a first directional signal light and a first output of a turn signal switch, and a second light intensity switch connecting the brightest output circuit of a second directional signal light and a second output of said turn signal switch; and
the first intensity switch connecting the brightest output circuit of a first directional signal light and a power supply, and a second light intensity switch connecting the brightest output circuit of a second directional signal light and said power supply,
whereby the intensity of said first directional signal light and said second directional signal light are controlled between illumination output modes selected from the group consisting of pulse and flashing signaling modes and constant output safety and utility modes.

24. The vehicular light control system as described in claim 23, further comprising means to control dimmest output circuits of the first directional signal light and the second directional signal light from simultaneous operation with respect to the brightest output circuits of said directional lights, to control unnecessary heat in the areas surrounding said first directional signal light and said second directional signal light.

* * * * *